US009596390B2

(12) United States Patent
Uemura et al.

(10) Patent No.: US 9,596,390 B2
(45) Date of Patent: Mar. 14, 2017

(54) IMAGING APPARATUS, IMAGING METHOD, AND COMPUTER-READABLE RECORDING MEDIUM

(71) Applicant: OLYMPUS CORPORATION, Tokyo (JP)

(72) Inventors: Tatsuyuki Uemura, Hachioji (JP); Kunio Yamamiya, Sagamihara (JP); Osamu Nonaka, Sagamihara (JP); Ikko Mori, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 209 days.

(21) Appl. No.: 14/257,586

(22) Filed: Apr. 21, 2014

(65) Prior Publication Data
US 2014/0313390 A1 Oct. 23, 2014

(30) Foreign Application Priority Data

Apr. 23, 2013 (JP) .................. 2013-090759
May 15, 2013 (JP) .................. 2013-103285
(Continued)

(51) Int. Cl.
*H04N 5/225* (2006.01)
*H04N 5/232* (2006.01)
(Continued)

(52) U.S. Cl.
CPC ......... *H04N 5/2254* (2013.01); *G02B 23/105* (2013.01); *G02B 23/12* (2013.01);
(Continued)

(58) Field of Classification Search
CPC .. H04N 5/2254; H04N 5/2256; H04N 5/2259; H04N 5/23293; G02B 23/00;
(Continued)

(56) References Cited

U.S. PATENT DOCUMENTS 4,996,548 A * 2/1991 Schappler ............. G03B 13/04
396/178
5,598,238 A * 1/1997 Stephenson, III ..... G03B 13/04
396/178
(Continued)

FOREIGN PATENT DOCUMENTS

JP 2001-136499 5/2001
JP 2006-072187 3/2006

*Primary Examiner* — Twyler Haskins
*Assistant Examiner* — Akshay Trehan
(74) *Attorney, Agent, or Firm* — Volpe and Koenig, P.C.

(57) ABSTRACT

An imaging apparatus includes: an imaging unit configured to receive light collected from an object area through an imaging optical system provided at a front side facing an object, and to generate image data; a body unit including the imaging unit; an optical sight unit including a light source unit for emitting luminous flux, and a reflecting optical element for allowing light from the object area to transmit and reflecting the luminous flux toward a back side opposite to the front in order to produce a virtual image of the luminous flux in the object area or near the object area; and a leg unit that holds at least the reflecting optical element in a movable manner in a direction away from the body unit and in a direction perpendicular to an optical axis of the imaging optical system, at startup of the optical sight unit.

11 Claims, 44 Drawing Sheets

(30) Foreign Application Priority Data

May 15, 2013 (JP) .................................. 2013-103343
Jan. 21, 2014 (JP) .................................. 2014-008878

(51) Int. Cl.
| | |
|---|---|
| *G03B 13/00* | (2006.01) |
| *G02B 23/00* | (2006.01) |
| *G02B 23/10* | (2006.01) |
| *G02B 23/12* | (2006.01) |
| *G02B 23/14* | (2006.01) |

(52) U.S. Cl.
CPC ............ *G02B 23/14* (2013.01); *G02B 23/145* (2013.01); *G03B 13/00* (2013.01); *H04N 5/2256* (2013.01); *H04N 5/23293* (2013.01)

(58) Field of Classification Search
CPC ...... G02B 23/10; G02B 23/105; G02B 23/14; G02B 23/145; G02B 27/30; G02B 27/34; G02B 27/36; G02B 23/20; G03B 13/02; G03B 13/00
USPC ............... 348/333.09, 333.11, 333.12, 341
See application file for complete search history.

(56) References Cited

U.S. PATENT DOCUMENTS

| | | | |
|---|---|---|---|
| 6,044,227 A * | 3/2000 | Hata | G03B 7/16 396/202 |
| 6,259,863 B1 * | 7/2001 | Maruyama | G03B 17/48 348/64 |
| 6,549,237 B1 * | 4/2003 | Inuma | H04N 5/23293 348/333.03 |
| 7,705,907 B2 * | 4/2010 | Iwane | G02B 27/01 348/333.09 |
| 8,373,795 B2 * | 2/2013 | Shintani | G03B 13/02 348/371 |
| 2001/0034077 A1 * | 10/2001 | Wine | G02B 26/0833 438/52 |
| 2006/0153559 A1 * | 7/2006 | Kim | G03B 15/05 396/177 |
| 2008/0084484 A1 * | 4/2008 | Ochi | G03B 13/02 348/222.1 |
| 2012/0218481 A1 * | 8/2012 | Popovich | G02B 5/1819 349/11 |
| 2013/0093939 A1 * | 4/2013 | Takanashi | G02B 7/36 348/345 |

* cited by examiner

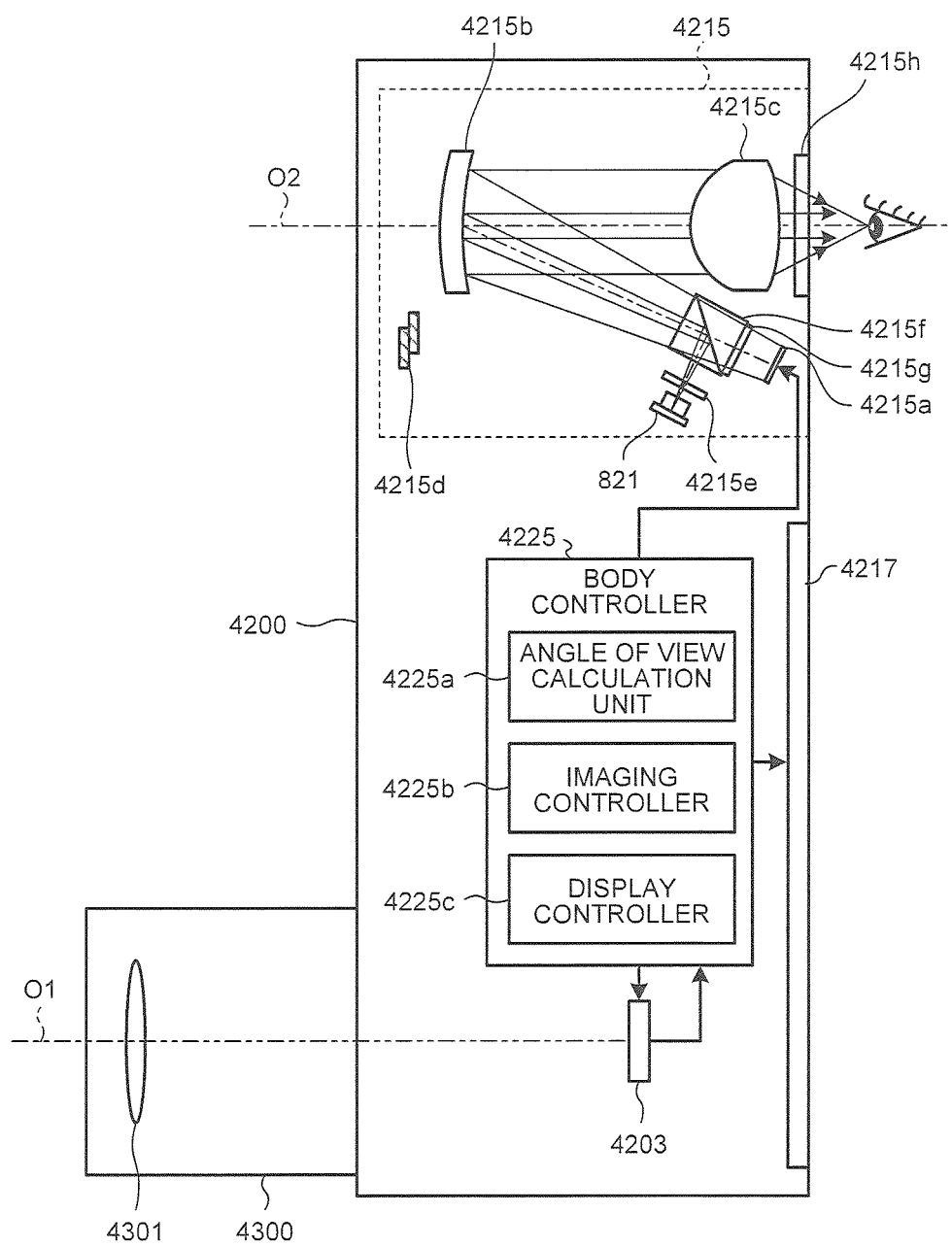

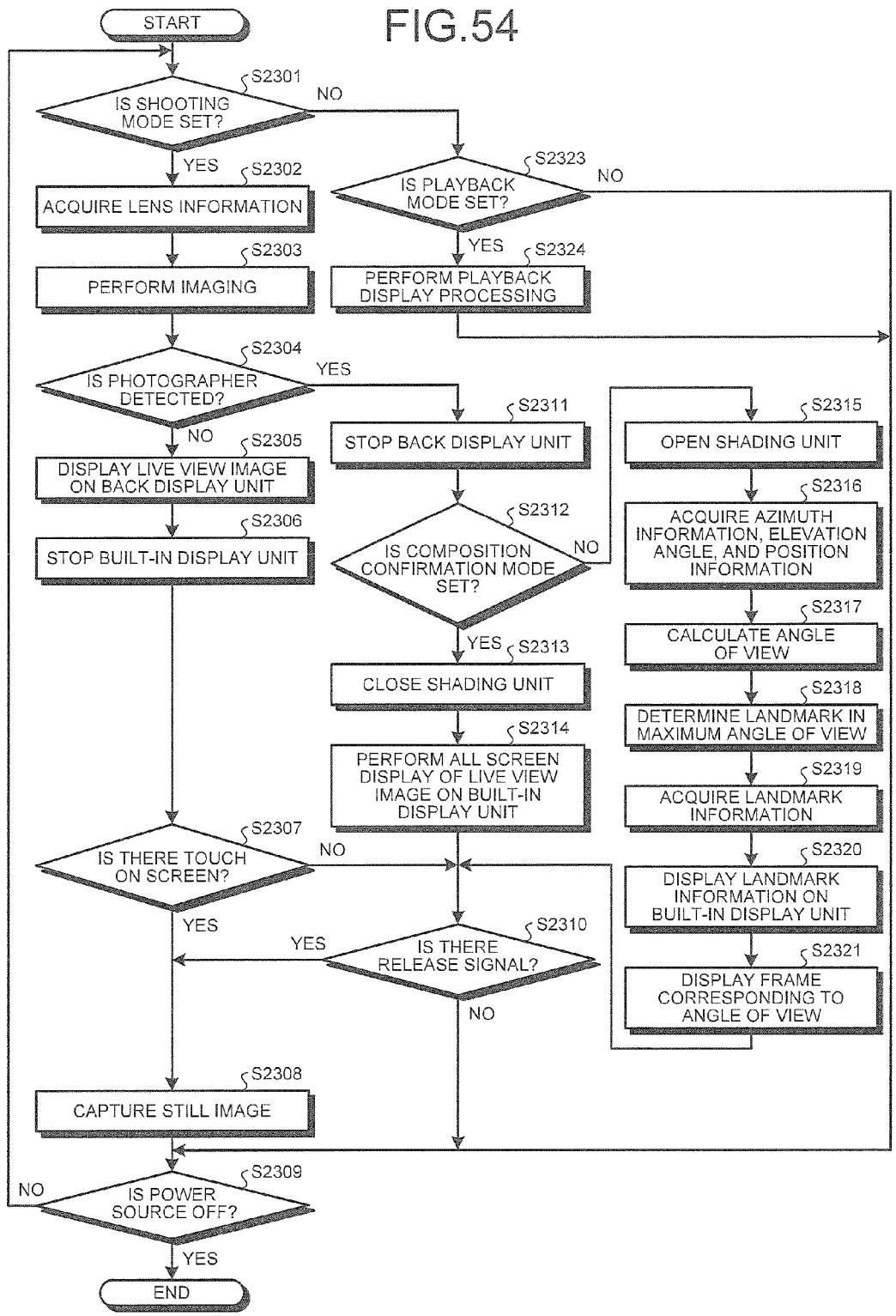

IMAGING APPARATUS, IMAGING METHOD, AND COMPUTER-READABLE RECORDING MEDIUM

CROSS-REFERENCE TO RELATED APPLICATIONS

This application is based upon and claims the benefit of priorities from Japanese Patent Application No. 2013-090759, filed on Apr. 23, 2013, Japanese Patent Application No. 2013-103285, filed on May 15, 2013, Japanese Patent Application No. 2013-103343, filed on May 15, 2013, and Japanese Patent Application No. 2014-008878, filed on Jan. 21, 2014, the entire contents of which are incorporated herein by reference.

BACKGROUND OF THE INVENTION

1. Technical Field

The disclosure relates to an imaging apparatus for capturing images of an object, generating image data of the object, and displaying the image data, and also relates to an imaging method and a computer-readable recording medium.

2. Related Art

Conventionally, a technology is known, which provides a sight for confirming an imaging range of a camera, and allows the photographer to know the imaging range of the camera according to sighting light emitted through the sight when the photographer performs self-photographing (for example, see Japanese Patent Application Laid-open No. 2001-136499).

SUMMARY

In some embodiments, an imaging apparatus includes: an imaging unit configured to receive light collected from an object area through an imaging optical system provided at a front side facing an object, and to generate image data; a body unit including the imaging unit; an optical sight unit including a light source unit for emitting luminous flux, and a reflecting optical element for allowing light from the object area to transmit and reflecting the luminous flux emitted by the light source unit toward a back side opposite to the front, the optical sight unit being configured to produce a virtual image of the luminous flux emitted by the light source unit in the object area or near the object area; and a leg unit that holds at least the reflecting optical element in a movable manner in a direction away from the body unit and in a direction perpendicular to an optical axis of the imaging optical system, at startup of the optical sight unit.

In some embodiments, an imaging method includes: receiving light collected from an object area through an imaging optical system provided at a front side facing an object to generate image data by an imaging unit; using an optical sight unit including a light source unit for emitting luminous flux, and a reflecting optical element for allowing light from the object area to transmit and reflecting the luminous flux emitted by the light source unit toward a back side opposite to the front side to produce a virtual image of the luminous flux emitted by the light source unit in the object area or near the object area; and moving at least the reflecting optical element in a direction away from a body unit and in a direction perpendicular to an optical axis of the imaging optical system, at startup of the optical sight unit.

In some embodiments, a non-transitory computer-readable recording medium is a recording medium in which an executable program is recorded. The program causes a processor included in an imaging apparatus including: an imaging unit configured to receive light collected from a visual field area through an imaging optical system provided at a front side facing an object, and to generate image data; an optical sight unit including a light source unit for emitting luminous flux, and a reflecting optical element for allowing light from the object area to transmit and reflecting the luminous flux emitted by the light source unit toward a back side opposite to the front, the optical sight unit being configured to produce a virtual image of the luminous flux emitted by the light source unit in the object area or near the object area; and a leg unit that holds at least the reflecting optical element in a movable manner in a direction away from a body unit and in a direction perpendicular to an optical axis of the imaging optical system, at startup of the optical sight unit, to perform: producing the virtual image of the luminous flux in the visual field area; detecting the object in an image corresponding to the image data generated by the imaging unit; determining whether all of the object are in an angle of view of the imaging optical system while producing the virtual image; and outputting a warning indicating that the object falls outside the angle of view when all of the object are not in the angle of view.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 44 is a diagram schematically illustrating a state when capturing an image of an object while confirming framing of the object by an eyepiece display unit of the imaging apparatus according to the eleventh embodiment of the present invention;

FIG. 54 is a flowchart illustrating an outline of processing executed by the imaging apparatus according to the thirteenth embodiment of the present invention;

DETAILED DESCRIPTION

Hereinafter, modes for carrying out the invention (hereinafter, referred to as "embodiments") will be described with reference to the drawings. Further, the present invention is not limited by the embodiments below. Further, in the description of the drawings, the same parts are denoted with the same reference sign. Further, the drawings are schematically illustrated, and it should be noted that the relationship between thicknesses and widths of members, ratios of members, and the like are different from reality. Further, among the drawings, portions in which mutual sizes and ratios are different are included.

First Embodiment

Figure 1:
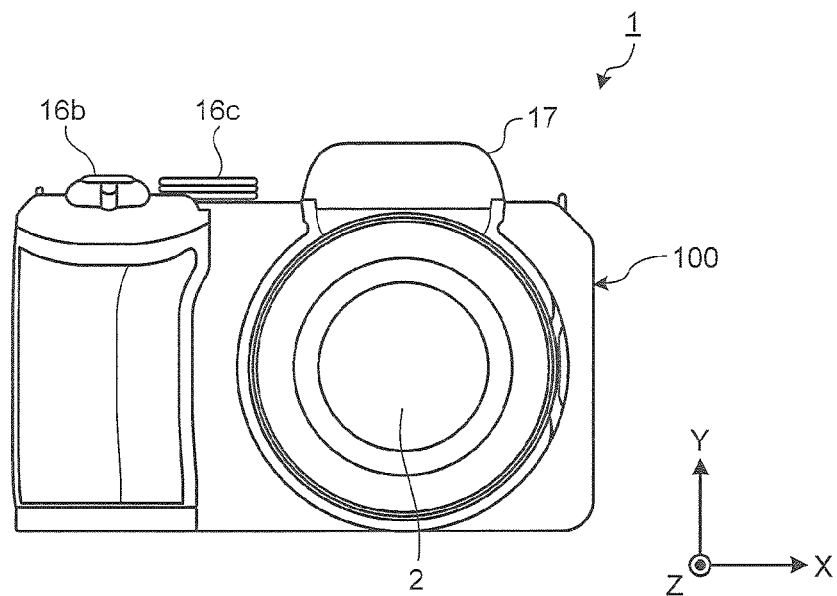
FIG. 1 is a front view of an imaging apparatus according to a first embodiment of the present invention.
Figure 2:
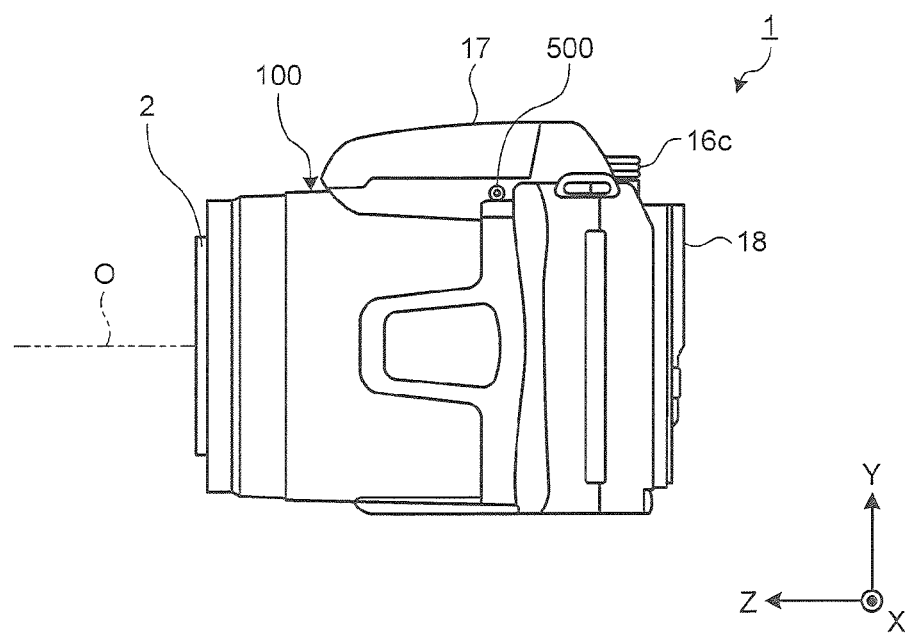
FIG. 2 is a side view of the imaging apparatus according to the first embodiment of the present invention.
Figure 3:
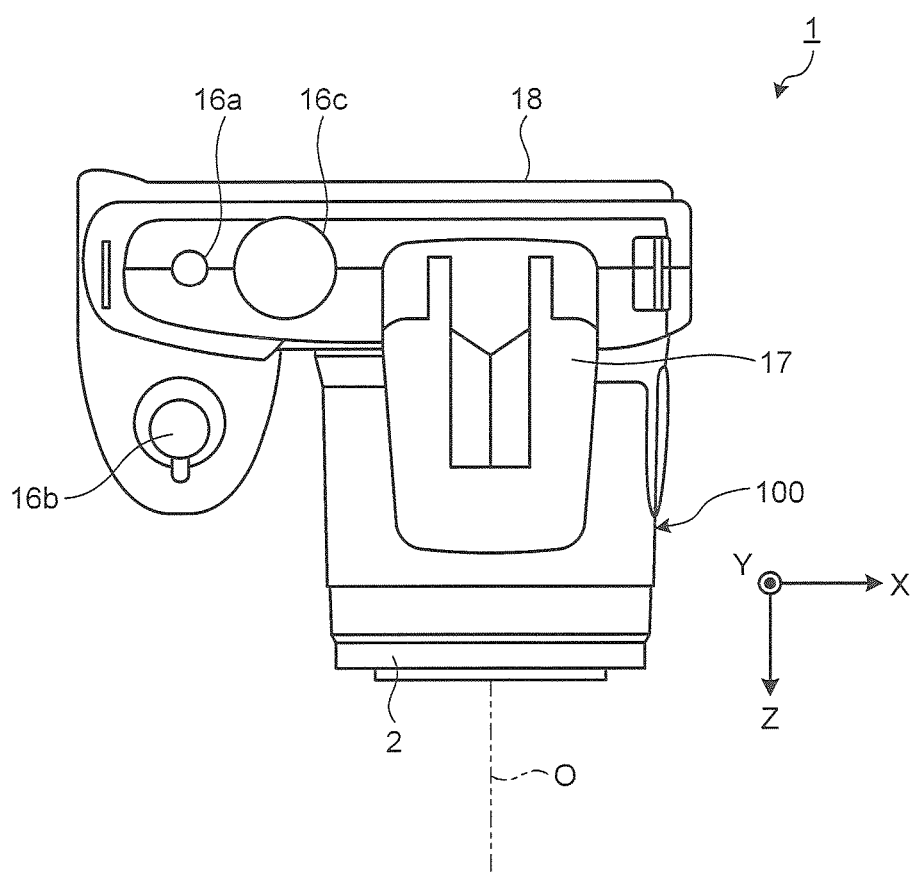
FIG. 3 is a top view of the imaging apparatus according to the first embodiment of the present invention.
Figure 4:
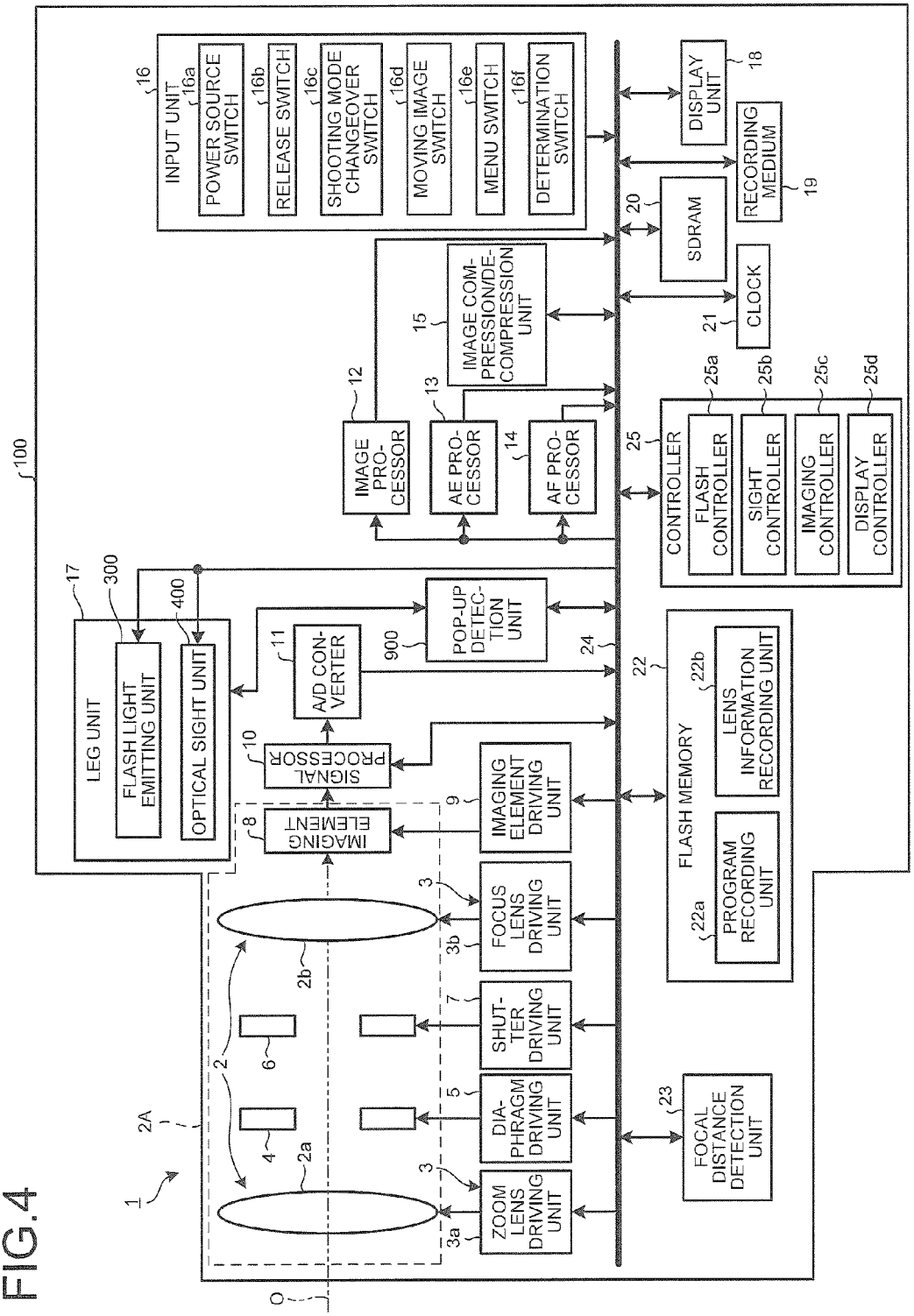
FIG. 4 is a block diagram illustrating a function configuration of the imaging apparatus according to the first embodiment of the present invention.

FIG. 1 is a front view of an imaging apparatus according to a first embodiment of the present invention. FIG. 2 is a side view of the imaging apparatus according to the first embodiment of the present invention. FIG. 3 is a top view of the imaging apparatus according to the first embodiment of the present invention. FIG. 4 is a block diagram illustrating a function configuration of the imaging apparatus according to the first embodiment of the present invention. Note that, in the description below, as a unique coordinate system of an imaging apparatus 1, a width direction perpendicular to an optical axis O of the imaging apparatus is an X-axis direction, a vertical direction perpendicular to the optical axis O of the imaging apparatus 1 is an Y-axis direction, and a thickness direction (imaging direction) parallel with the optical axis O of the imaging apparatus 1 is an Z-axis direction.

The imaging apparatus 1 illustrated in FIGS. 1 to 4 includes an imaging unit 2A and a body unit 100 having the imaging unit 2A. The imaging unit 2A includes an imaging optical system 2 and an imaging element 8 and receives, by the imaging element 8, light collected from a specified visual field area through the imaging optical system 2 provided at a front side facing an object, and performs photoelectric conversion to generate image data. The body unit 100 includes the imaging optical system 2, a lens driving unit 3, a diaphragm 4, a diaphragm driving unit 5, a shutter 6, a shutter driving unit 7, the imaging element 8, an imaging element driving unit 9, a signal processor 10, an A/D converter 11, an image processor 12, an AE processor 13, an AF processor 14, an image compression/decompression unit 15, an input unit 16, a leg unit 17, a display unit 18, a recording medium 19, a synchronous dynamic random access memory (SDRAM) 20, a clock 21, a flash memory 22, a focal distance detection unit 23, a bus 24, and a controller 25.

The imaging optical system 2 is provided at a front side facing an object. The imaging optical system 2 is configured from one or a plurality of lenses, and collects light from a specified visual field area. The imaging optical system 2 includes a zoom optical system 2a that changes a focal distance (angle of view), and a focus optical system 2b that adjusts a focus. The zoom optical system 2a changes the focal distance of the imaging apparatus 1 within 24 mm to 1200 mm (35 mm equivalent), for example. The imaging optical system 2 is provided at a front side of the body unit 100.

The lens driving unit 3 is configured from a DC motor, a stepping motor, or the like, under control of the controller 25, and changes a pint position or a focal distance of the imaging optical system 2 by moving the imaging optical system 2 along the optical axis O of the imaging optical system 2. The lens driving unit 3 includes a zoom lens driving unit 3a that moves the zoom optical system 2a along the optical axis O, and a focus lens driving unit 3b that moves the focus optical system 2b along the optical axis O.

The diaphragm 4 adjusts a light amount received by the imaging element 8 by limiting an incident amount of light collected by the imaging optical system 2.

The diaphragm driving unit 5 changes a diaphragm value (F value) of the imaging apparatus 1 by driving the diaphragm 4 under control of the controller 25. The diaphragm driving unit 5 is configured from a stepping motor, and the like.

The shutter 6 sets a state of the imaging element 8 to an exposure state or to a light-shading state. The shutter 6 is configured from a lens shutter or a focal plane shutter.

The shutter driving unit 7 drives the shutter 6 under control of the controller 25. The shutter driving unit 7 is configured from a stepping motor, and the like.

The imaging element 8 is configured from a charge coupled device (CCD) or a complementary metal oxide semiconductor (CMOS) that receives and converts the light collected by the imaging optical system 2 into an electrical signal. The imaging element 8 generates image data (an analog electrical signal) by receiving the light collected by the imaging optical system 2 and applies photoelectric conversion to the light, and outputs the image data to the signal processor 10.

The imaging element driving unit 9 causes the imaging element 8 to output the image data (analog signal) to the signal processor 10 at a specified timing under control of the controller 25. In this sense, the imaging element driving unit 9 functions as an electronic shutter. Further, the imaging element driving unit 9 causes the imaging element 8 to output the image data at a specified frame rate (for example, 30 fps or 60 fps) under control of the controller 25. Further, the imaging element driving unit 9 causes the imaging element 8 to output the image data to the signal processor 10 at a high-speed frame rate (for example, 120 fps) by thinning out specified lines, for example, even lines or odd lines of the imaging element 8 under control of the controller 25.

The signal processor 10 performs specified analog processing on the image data input from the imaging element 8, and outputs the converted image data to the A/D converter 11 under control of the controller 25. To be specific, the signal processor 10 performs waveform shaping of the image data after reducing a reset noise, and the like, and then performs gain up so as to obtain objective brightness.

The A/D converter 11 applies A/D conversion to the analog image data output from the signal processor 10 to convert the analog image data into digital image data, and outputs the digital image data (raw data) to the SDRAM 20 through the bus 24.

The image processor 12 acquires the image data (raw data) from the SDRAM 20 through the bus 24, and performs various types of image processing (developing processing) with respect to the acquired image data to generate processed image data. The processed image data is output to the SDRAM 20 through the bus 24. To be specific, the image processor 12 performs, with respect to the image data, basic image processing including at least optical black subtraction processing, white balance (WB) adjustment processing, color matric operation processing, gamma correction processing, color reproduction processing, and edge enhancement processing or the like. Note that the image processor 12 performs synchronization processing of the image data when the imaging element 8 is a Bayer array.

The AE processor 13 acquires the image data recorded in the SDRAM 20 through the bus 24, and sets an exposure condition of when capturing a still image or a moving image based on the acquired image data. To be specific, the AE processor 13 calculates a luminance from the image data, and performs automatic exposure of the imaging apparatus 1 by determining setting a diaphragm value, a shutter speed, an ISO speed, and the like, based on the calculated luminance.

The AF processor 14 acquires the image data recorded in the SDRAM 20 through the bus 24, and performs adjustment of automatic focusing of the imaging apparatus 1, based on the acquired image data. For example, the AF processor 14 performs adjustment of automatic focusing of the imaging apparatus 1 by determining focus evaluation of the imaging apparatus 1 by taking out a high frequency component signal from the image data, and performing auto focus (AF) operation processing with respect to the high frequency component signal. Note that the AF processor 14 may perform the adjustment of automatic focusing of the imaging apparatus 1 using a pupil division phase-contrast method. Further, the AF processor 14 may perform the adjustment of automatic focusing of the imaging apparatus 1 based on an output value of phase difference pixels provided in the imaging element 8.

The image compression/decompression unit 15 acquires either the image data or the processed image data from the SDRAM 20 through the bus 24, compresses the acquired image data according to a specified format, and outputs the compressed image data (compressed image data) to the SDRAM 20 or the recording medium 19. Here, the specified format is Joint Photographic Experts Group (JPEG) format, Motion JPEG format, MP4 (H.264) format, or the like. Further, the image compression/decompression unit 15 acquires the image data (processed image data) recorded in the recording medium 19 through the bus 24 and a memory I/F (not illustrated, decompresses (expands) the acquired image data, and outputs the image data to the SDRAM 20. Note that a recording unit may be separately provided inside the imaging apparatus 1 in place of the recording medium 19.

The input unit 16 includes a power source switch 16a that switches a power source state of the imaging apparatus 1 to an on state or to an off state, a release switch 16b that receives an input of a still image release signal that provides an instruction of capturing a still image, a shooting mode changeover switch 16c that switches various shooting modes set to the imaging apparatus 1, a moving image switch 16d that receives an input of a moving image release signal that provides an instruction of capturing a moving image, a menu switch 16e that receives an input of an instruction signal that instructs various types of setting of the imaging apparatus 1, and a determination switch 16f that receives an input of an instruction signal that determines content instructed on a menu screen. The release switch 16b is retractable by pressing from an outside. The release switch 16b receives an input of a first release signal that instructs a capturing preparation operation when being half pressed, while receiving an input of a second release signal that instructs capturing of a still image when being fully pressed.

The leg unit 17 is pivotally supported to the body unit 100 rotatably, and is provided to the body unit 100 in a movable manner (in a manner capable of popping up) in a direction away from the body unit 100 and in a direction perpendicular to the optical axis O of the imaging optical system 2. The leg unit 17 includes a flash light emitting unit 300 that irradiates a visual field area of the imaging apparatus 1 with illumination light, and an optical sight unit 400 that sets sights on a desired object within the visual field area of the imaging apparatus 1.

Figure 5:
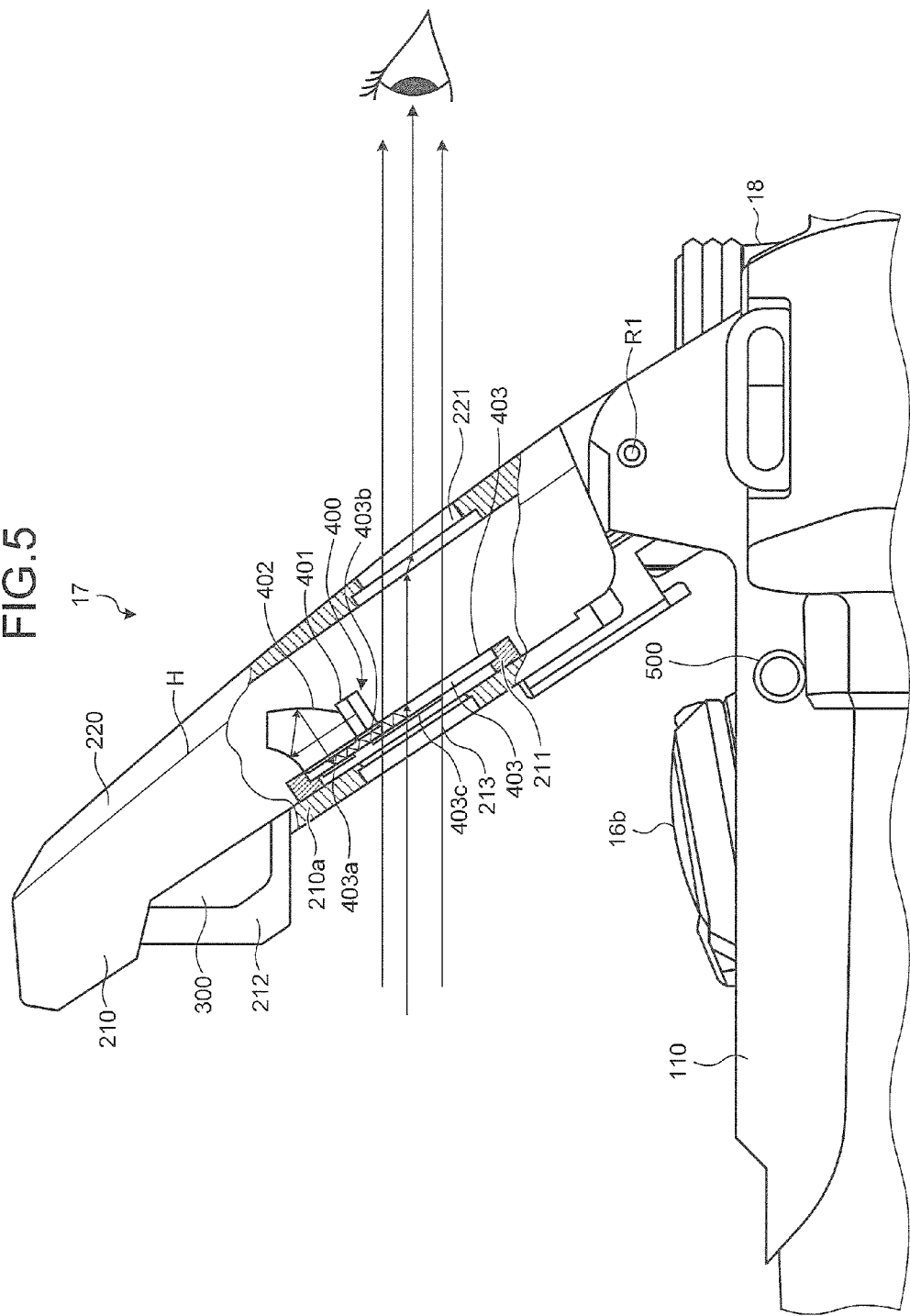
FIG. 5 is a partial cross sectional view of when a leg unit of the imaging apparatus according to the first embodiment of the present invention pops up from a body unit.

Here, a configuration of the leg unit 17 will be described in detail. FIG. 5 is a partial cross sectional view of when the leg unit 17 pops up from the body unit 100.

As illustrated in FIG. 5, a first shaft R1 (base end) is fixed to a shaft support unit (not illustrated) of the body unit 100 at an upper surface side of the body unit 100 where the release switch 16b and the like of the body unit 100 are arranged, and the leg unit 17 is pivotally supported to the body unit 100 rotatably using the first shaft R1 as a rotational axis.

The leg unit 17 includes a leg lower unit 210 that is fit into the first shaft R1 of the body unit 100, and revolvably forms a tray shape (ship bottom shape) with a bearing part (not illustrated) of the body unit 100 (not illustrated) to hold the optical sight unit 400 therein, and a leg upper unit 220 (cover part) that is joined to face an inner surface side of the leg lower unit 210 and forms an approximate casing together with the leg lower unit 210. Further, the leg unit 17 includes the flash light emitting unit 300 that irradiates an object area of the imaging apparatus 1 with illumination light, the optical sight unit 400 that produces a virtual image in the object area or in the vicinity of the object area of the imaging apparatus 1, and a pop-up mechanism 500 that locks the leg unit 17 in an accommodation unit 110 of the body unit 100, and causes the leg unit 17 to be separated from the accommodation unit 110 of the body unit 100 in response to force from an outside and moves the flash light emitting unit 300 to an illumination position. Further, the leg unit 17 includes a pop-up detection unit 900 (not illustrated) that detects the leg unit 17 is popped up.

The flash light emitting unit 300 is provided at a tip of the leg lower unit 210. Further, the leg lower unit 210 includes a light emitting window 212 that protects the flash light emitting unit 300 from an outside and a first window unit 213 that protects the optical sight unit 400 from an outside. Further, the leg lower unit 210 includes a base unit (that refers to a recess bottom face) 210a that supports the optical sight unit 400 in its inside, and a protruding step like transparent substrate support unit 211 in the base unit 210a. A joint surface H between the leg lower unit 210 and the leg upper unit 220 is a surface joined to the base unit 210a that supports the transparent substrate support unit 211 where the transparent substrate support unit 211 of the leg lower unit 210 is a reference.

The flash light emitting unit 300 is arranged at a separated position from the body unit 100 in a state where the leg unit 17 pops up from the body unit 100 (in a rising state). Here, the separated position is a position where an angle made by the leg unit 17 and the body unit 100 becomes a specified angle (for example, approximately 30 degrees). The flash light emitting unit 300 irradiates the visual field area of the imaging apparatus 1 with the illumination light (flash) under the controller 25 at the position where the leg unit 17 is separated from the body unit 100. The flash light emitting unit 300 is configured from an LED, an LED driver, and the like.

The first window unit 213 is provided at a tip side than the center of the leg lower unit 210. To be specific, the first window unit 213 is formed at a position intersecting with a luminous flux emitted from a light guiding unit 403 of the optical sight unit 400 described below. The first window unit 213 has an approximately rectangular shape. The first window unit 213 is formed of a transparent member such as glass or plastic.

The transparent substrate support unit 211 is provided at a back side center of the leg lower unit 210, and supports the optical sight unit 400. The transparent substrate support unit 211 and the leg lower unit 210 are integrally formed. The transparent substrate support unit 211 supports the optical sight unit 400 so as to sandwich both surfaces of a transparent substrate in which the light guiding unit 403 that configures the optical sight unit 400 is formed, or directly joins the transparent substrate by an adhesive and supports the optical sight unit 400. Note that the transparent substrate support unit 211 may support the light guiding unit 403 with a surface, a point, a corner, or a combination thereof of the light guiding unit 403.

The optical sight unit 400 includes a packaged light source unit 401, in which a laser chip or an LED chip that emits red sighting light (luminous flux) and a drive circuit are integrated, and a light emitting surface is sealed by the transparent substrate, a shaping optical element (hereinafter, referred to as "free curved surface prism") 402 that guides divergent light emitted from the light source unit 401 into the light guiding unit 403, and a light guiding unit 403 as a reflecting optical element provided with a holographic element that reflects monochromatic light to the transparent substrate. The optical sight unit 400 joins a light emitting surface of the light source unit 401 and the free curved surface prism 402 as a beam shaping element by an adhesive having high transmittance to form an integrated optical unit. This optical unit is joined to align with a desired position of the light guiding unit 403. In the optical sight unit 400 configured as described above, the luminous flux emitted by the light source unit 401 is reflected at the free curved surface prism 402 several times and is subjected to beam (luminous flux) shaping, and the shaped luminous flux is incident on the light guiding unit 403. The collimated luminous flux incident on the light guiding unit 403 is propagated to an area intersecting with the optical axis O of the imaging optical system 2 of the imaging apparatus 1 (in a direction parallel with the optical axis O).

In the light source unit 401, semiconductor lasers are integrated, and the packaged laser integrated unit may be formed with reference to Japanese Patent Application Laid-open No. 2006-78376. The semiconductor laser may be replaced with a surface light emitting element, or the semiconductor laser and the LED can be replaced with a laser array, an LED array, or the like arranged according to a specified rule. Accordingly, when LEDs that switch a color of colored light or multiple light emitting LEDs are arranged, the colors can be selected in accordance with a desired object or environment.

Note that the red sighting light of collimated light (line beam) having only one directivity may be emitted from the light guiding unit 403 by using a collimator lens, a cylindrical lens, or a reflection type holographic element (volume type hologram element) having lens functions of these lenses, in place of the free curved surface prism 402 of the beam shaping optical element. Further, to arrange the luminous flux emitted by the light source unit 401 to be approximately parallel with the optical axis of the light guiding unit 403, a dielectric multilayer film is formed on a reflecting prism or a parallel plate, and a mirror that reflects red is arranged between the light source unit 401 and the light guiding unit 403, so that the optical sight unit 400 becomes a flat optical element unit, and an assembly process to the leg unit 17 becomes easy. Further, in the first embodiment, in the leg lower unit 210, the light source unit 401 to which the free curved surface prism (one optical element) is coupled is joined to the transparent substrate of the light guiding unit 403. However, when a collimator lens, a cylindrical lens, a toric lens, a single rectangular prism, or the like, which is a single lens, is used as the one optical element, one optical component and the transparent substrate of the light guiding unit 403 may be fixed to the leg unit 17. The cover part is joined (connected) as a simple cover (in a state where no components are attached).

The light guiding unit 403 is configured from such as glass or plastic having high transparency. The light guiding unit 403 is the same as the free curved surface prism capable of beam shaping and the light guiding plate used in Japanese Patent Application Laid-open No. 2002-162598, and a first volume type holographic element (HOE) 403a that has a shaping function to shape the beam (luminous flux) as a diffractive optical element in an incident area and an emitting area, a second HOE 403b, and a third HOE 403c to which a dielectric multilayer film that reflects only a single color (red) is applied are formed on front and back surfaces of the transparent substrate. Accordingly, the collimated luminous flux incident from the free curved surface prism 402 is diffracted and reflected several times at the first HOE 403a that has a shaping function of the beam (luminous flux) and the second HOE 403b. The diffracted and reflected luminous flux is shaped into collimated light (for example, circular shape) at the third HOE 403c to which a dielectric multilayer film that reflects only a single color (red) is applied, and emitted to a back side. The emitted collimated light can be visually recognized by the user through a second window unit 221.

The leg upper unit 220 includes the second window unit 221 that protects the optical sight unit 400 from outside force.

The second window unit 221 is provided at a base end side than the center of the leg upper unit 220, and has an approximately rectangular shape. To be specific, the second window unit 221 is formed at a position intersecting with the luminous flux that transmits the first window unit 213 and the light guiding unit 403 of the leg lower unit 210. The second window unit 221 is formed of a transparent member such as glass or plastic. Accordingly, the user can visually recognize the visual field area of the imaging apparatus 1 through the first window unit 213, and the transparent substrate of the light guiding unit 403, and the second window unit 221 when the leg unit 17 pops up from the body unit 100.

Note that, while the first window unit 213 and the second window unit 221 are described to have a rectangular shape, the first window unit 213 and the second window unit 221 may have an elliptical shape, and making the second window unit 221 larger or smaller than the first window unit 213, and employing the same shape or different shapes can be selected.

The accommodation unit 110 provided at the upper surface side of the body unit 100 of the imaging apparatus 1, where the release button and the like are arranged, has a shape along the leg unit 17, and includes a shaft support part (not illustrated) that fixes the first shaft R1.

Referring back to FIGS. 1 to 4, description of the configuration of the imaging apparatus 1 will be continued.

The display unit 18 is provided at a back side of the body unit 100, and displays an image corresponding to the image data generated by the imaging element 8 under control of the controller 25. The display unit 18 is configured from a display panel made of liquid crystal or organic electro luminescence (EL), or the like. Further, the display unit 18 appropriately displays operation information of the imaging apparatus 1 and information related to capturing of an image. Here, the display of the image includes confirmation display that displays image data immediately after capturing only for a specified time (for example, three seconds), a playback display that plays back the image data recorded in the recording medium 19, and a live view image display that sequentially displays live view images in time series, which are corresponding to the image data continuously generated by the imaging element 8.

The recording medium 19 is configured from a memory card and the like mounted from an outside of the imaging apparatus 1. The recording medium 19 is mounted to the imaging apparatus 1 through a memory I/F (not illustrated) in a detachable manner. Image data to which the image processor 12 and the image compression/decompression unit 15 apply processing is recorded in the recording medium 19.

The SDRAM 20 is configured from a volatile memory. The SDRAM 20 has a function as a temporary storage unit that temporarily stores digital image data input from the A/D converter 11 through the bus 24, processed image data input from the image processor 12, and information of the imaging apparatus 1 under processing. For example, the SDRAM 20 temporarily stores image data sequentially output by the imaging element 8 for each frame, through the signal processor 10, the A/D converter 11, and the bus 24.

The clock 21 has a clocking function and a determination function of a date and time of capturing an image. To add date data to the image data, the clock 21 transmits the date data to the controller 25. The date data includes a date and a time.

The flash memory 22 includes a program recording unit 22a that records various programs for operating the imaging apparatus 1 and various data used during execution of the programs, and a lens information recording unit 22b that records a serial number for identifying the imaging apparatus 1, and lens characteristics of the imaging optical system 2, for example, a focal distance, a zoom magnification, and lens information such as brightness and aberration.

The focal distance detection unit 23 detects a current focal distance of the zoom optical system 2a, and outputs a detection result to the controller 25 through the bus 24. The focal distance detection unit 23 is configured from an optical photo interrupter, an encoder, and the like.

The bus 24 is configured from a transmission path that connects units of the imaging apparatus 1, and the like, and transmits various data generated inside the imaging apparatus 1 to the respective units of the imaging apparatus 1.

The controller 25 is configured from a CPU, and centrally controls the operation of the imaging apparatus 1 by transmitting various data and instruction signals to the respective units that configure the imaging apparatus 1 in response to instruction signals transmitted from the input unit 16 through the bus 24.

Here, a detailed configuration of the controller 25 will be described. The controller 25 includes a flash controller 25a, a sight controller 25b, an imaging controller 25c, and a display controller 25d.

The flash controller 25a causes the flash light emitting unit 300 to emit illumination light toward the visual field area of the imaging apparatus 1 based on a detection result of the pop-up detection unit 900. To be specific, the flash controller 25a detects whether the flash light emitting unit 300 is located at a usable position by result detection of the pop-up detection unit 900. When detecting that the flash light emitting unit 300 is located at the usable position, for example, the leg unit 17 is in a pop up state from the body unit 100, the flash controller 25a causes the flash light emitting unit 300 to emit the illumination light toward the visual field area of the imaging apparatus 1. Further, the flash controller 25a causes the flash light emitting unit 300 to emit the illumination light based on luminance components included in the image data generated by the imaging element 8 or the brightness of an object. Further, the flash controller 25a causes the flash light emitting unit 300 to emit the illumination light when a flash mode is set to the imaging apparatus 1.

The sight controller 25b controls the luminous flux emitted by the optical sight unit 400 and the light amount of the luminous flux by controlling driving of the optical sight unit 400. To be specific, the sight controller 25b causes the optical sight unit 400 to continuously or intermittently emit the luminous flux, or controls the light amount of the luminous flux. Further, the sight controller 25b controls the optical sight unit 400 by determining whether the mode of the imaging apparatus 1 is located in a usable position, whether the optical sight unit 400 is located at a usable position, whether the imaging apparatus 1 is in a preferable state of using the optical sight unit 400, and the like. For example, the sight controller 25b causes the optical sight unit 400 to emit the luminous flux according to a focal distance of the imaging optical system 2. Further, the sight controller 25b causes the optical sight unit 400 to emit the luminous flux based on a detection result of the pop-up detection unit 900. The sight controller 25b detects whether the optical sight unit 400 is located in a usable position by result detection of the pop-up detection unit 900, and causes the optical sight unit 400 to emit the luminous flux when detecting that the optical sight unit 400 is located at the usable position, for example, the leg unit 17 is in the pop up state from the body unit 100.

When a second release signal is input through the release switch 16b, the imaging controller 25c performs control of starting an operation of capturing a still image in the imaging apparatus 1. Here, the capturing operation in the imaging apparatus 1 means an operation in which the signal processor 10, the A/D converter 11, and the image processor 12 perform specified processing on the image data output by the imaging element 8, by driving of the shutter driving unit 7 and the imaging element driving unit 9. The image data to which the processing is applied is compressed in the image compression/decompression unit 15 under the control of the imaging controller 25c, and is recorded in the recording medium 19 through the bus 24 and the memory I/F (not illustrated). Further, when a release signal of capturing a moving image is input from the moving image switch 16d, the imaging controller 25c performs control of starting an operation of capturing a moving image in the imaging apparatus 1.

The display controller 25d controls a display mode of the display unit 18. To be specific, the display controller 25d causes the display unit 18 to display confirmation display that displays a captured image only for a specified time, playback display that plays back the image data recorded in the recording medium 19, live view image display that sequentially displays live view images in time series, which are corresponding to image data continuously generated by the imaging element 8, and the like, and performs various types of information display necessary for capturing by superimposing the information on the above display. Further, when the optical sight unit 400 is being driven, the display controller 25d superimposes an icon that indicates the optical sight unit 400 is being driven on the live view image, and causes the display unit 18 to display the icon.

Figure 6:
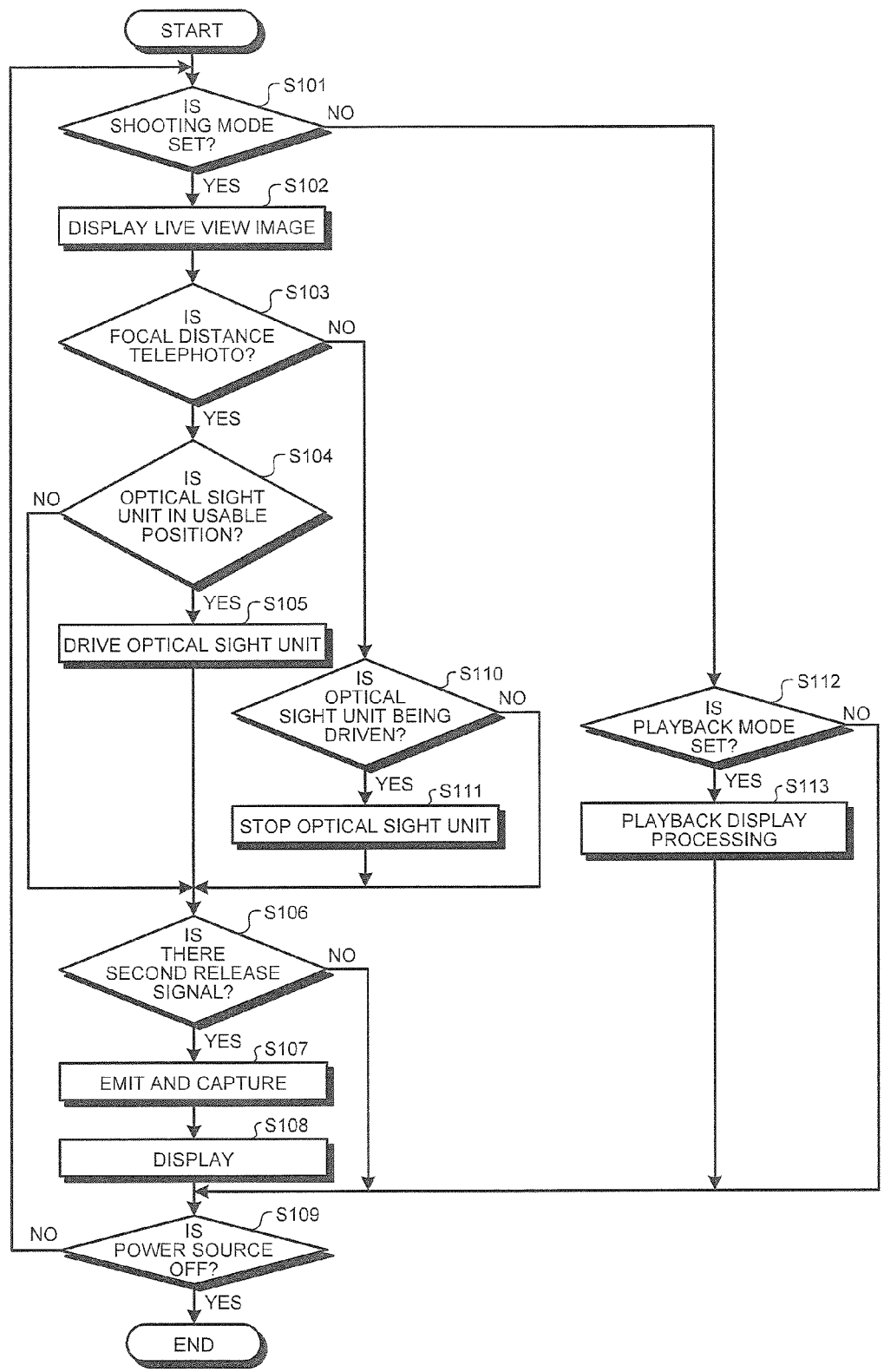
FIG. 6 is a flowchart illustrating an outline of processing executed by the imaging apparatus according to the first embodiment of the present invention.

Processing executed by the imaging apparatus 1 having the above configuration will be described. FIG. 6 is a flowchart illustrating an outline of the processing executed by the imaging apparatus 1.

As illustrated in FIG. 6, when the imaging apparatus 1 is set to a shooting mode (step S101: Yes), the display controller 25d causes the display unit 18 to display a live view image corresponding to the image data generated by the imaging element 8 (step S102).

Next, the controller 25 determines whether a focal distance of the zoom optical system 2a is telephoto (step S103). To be specific, the controller 25 determines whether the zoom optical system 2a is telephoto based on a current focal distance of the zoom optical system 2a detected by the focal distance detection unit 23. For example, when detecting that the current focal distance of the zoom optical system 2a detected by the focal distance detection unit 23 is 100 mm or more, the controller 25 determines that the zoom optical system 2a is telephoto. Note that the focal distance of when driving the optical sight unit 400 can be appropriately set by an operation of the menu switch 16e by a photographer. The focal distance is preferably set to 100 mm or more, and more preferably set to 70 mm or more. When the controller 25 determines that the focal distance of the zoom optical system 2a is telephoto (step S103: Yes), the imaging apparatus 1 proceeds to step S104. In contrast, when the controller 25 determines that the focal distance of the zoom optical system 2a is not telephoto (step S103: No), the imaging apparatus 1 proceeds to step S110 described below.

In step S104, the controller 25 determines whether the optical sight unit 400 is located in a usable position based on a detection result input from the pop-up detection unit 900. To be specific, the controller 25 determines whether the leg unit 17 is in a state of popping up from the body unit 100 based on a detection result input form the pop-up detection unit 900. When the controller 25 determines that the optical sight unit 400 is located in the usable position based on the detection result input from the pop-up detection unit 900 (step S104: Yes), the imaging apparatus 1 proceeds to step S105. In contrast, when the controller 25 determines that the optical sight unit 400 is not in a usable position based on a detection result input from the pop-up detection unit 900 (step S104: No), the imaging apparatus 1 proceeds to step S106 described below.

In step S105, the sight controller 25b drives the optical sight unit 400. Accordingly, the photographer can easily adjust framing of an image to a desired object even if the imaging optical system 2 of the imaging apparatus 1 is telephoto or super telephoto, by adjusting the luminous flux emitted from the optical sight unit 400 to the desired object in the visually recognizable visual field area of the imaging apparatus 1 through the first window unit 213, the light guiding unit 403, and the second window unit 221. In this case, when the leg unit 17 does not pop up from the body unit 100, the display controller 25d may superimpose an icon indicating the leg unit 17 is to pop up on the live view image and cause the display unit 18 to display the icon.

Next, when the second release signal is input from the release switch 16b (step S106: Yes), the imaging controller 25c causes the imaging element 8 to capture a still image (step S107).

Following that, the display controller 25d causes the display unit 18 to display an image corresponding to the image data generated by the imaging element 8 by performing capturing of a still image for a specified time, for example, only for three seconds (step S108).

Next, when the power source switch 16a is operated, and a power source of the imaging apparatus 1 is turned OFF (step S109: Yes), the imaging apparatus 1 terminates the present processing. In contrast, when the power source of the imaging apparatus 1 is not turned OFF (step S109: No), the imaging apparatus 1 returns to step S101.

In step S106, when the second release signal is not input from the release switch 16b (step S106: No), the imaging apparatus 1 proceeds to step S109.

In step S110, when the optical sight unit 400 is being driven (step S110: Yes), the sight controller 25b stops the optical sight unit 400 (step S111). After step S111, the imaging apparatus 1 proceeds to step S106.

In step S110, when the optical sight unit 400 is not being driven (step S110: No), the imaging apparatus 1 proceeds to step S106.

In step S101, when the imaging apparatus 1 is not set to the shooting mode (step S101: No), when the imaging apparatus 1 is set to a playback mode (step S112: Yes), the imaging apparatus 1 executes playback display processing of causing the display unit 18 to display an image corresponding to the image data recorded in the recording medium 19 (step S113). After step S113, the imaging apparatus 1 proceeds to step S109.

In step S101, when the imaging apparatus 1 is not set to the shooting mode (step S101: No), when the imaging apparatus 1 is not set to the playback mode (step S112: No), the imaging apparatus 1 proceeds to step S109.

According to the above-described first embodiment of the present invention, framing can be performed with respect to a desired object even at telephoto capturing or super telephoto capturing without increasing in size of the imaging apparatus 1.

Further, according to the first embodiment of the present invention, the photographer can confirm the live view image displayed by the display unit 18 by slightly shifting a visual line from a position where the optical sight unit 400 can sets sights on the object. As a result, the photographer can track a desired object appearing on the screen while confirming the image to be imaged.

Further, according to the first embodiment of the present invention, a configuration is employed, in which at least a part of the leg unit 17 or the body unit 100 is retracted outside the visual field area of the optical sight unit 400 at the driving of the optical sight unit 400. Therefore, a field of view through the optical sight unit 400 becomes wider, and the optical axis O of the imaging optical system 2 and the optical sight unit 400 can be arranged close, whereby the parallax of the image data to be captured and the optical sight unit 400 can be made smaller.

Note that, while, in the first embodiment of the present invention, the sight controller 25b drives the optical sight unit 400 at telephoto of the imaging apparatus 1, the optical sight unit 400 may be driven only during a period in which the first release signal is continuously input from the release switch 16b, for example. Accordingly, the power consumption can be reduced by the optical sight unit 400, and framing in the screen can be easily performed in a state where the desired object is focused.

Further, in the first embodiment of the present invention, the holographic element of the light guiding unit 403 may be configured from a holographic element that includes a toric lens or a cylindrical lens, and has a beam shaping function. This enables the circular luminous flux emitted from the light source unit 401 to be emitted with collimated light (line) having one directivity.

Further, while, in the first embodiment of the present invention, the sight controller 25b controls the driving of the optical sight unit 400 according to the focal distance of the imaging optical system 2, the sight controller 25b may control driving of the optical sight unit 400 according to the focal distance of the imaging optical system 2 in other modes of the imaging apparatus 1.

Second Embodiment

Next, a second embodiment of the present invention will be described. An imaging apparatus according to the second embodiment has a different configuration from the optical sight unit in the leg unit of the imaging apparatus according to the first embodiment. Therefore, hereinafter, a configuration of an optical sight unit in a leg unit of the imaging apparatus according to the second embodiment will be described. Note that the same configuration as the imaging apparatus 1 of the first embodiment is denoted with the same reference sign, and description is omitted.

Figure 7:
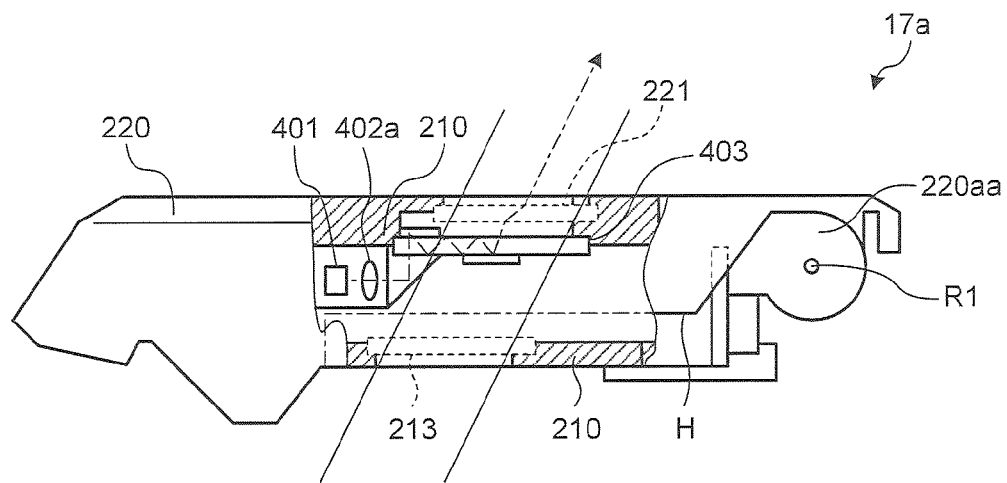
FIG. 7 is a partial cross sectional view of a leg unit of an imaging apparatus according to a second embodiment of the present invention.
Figure 8:
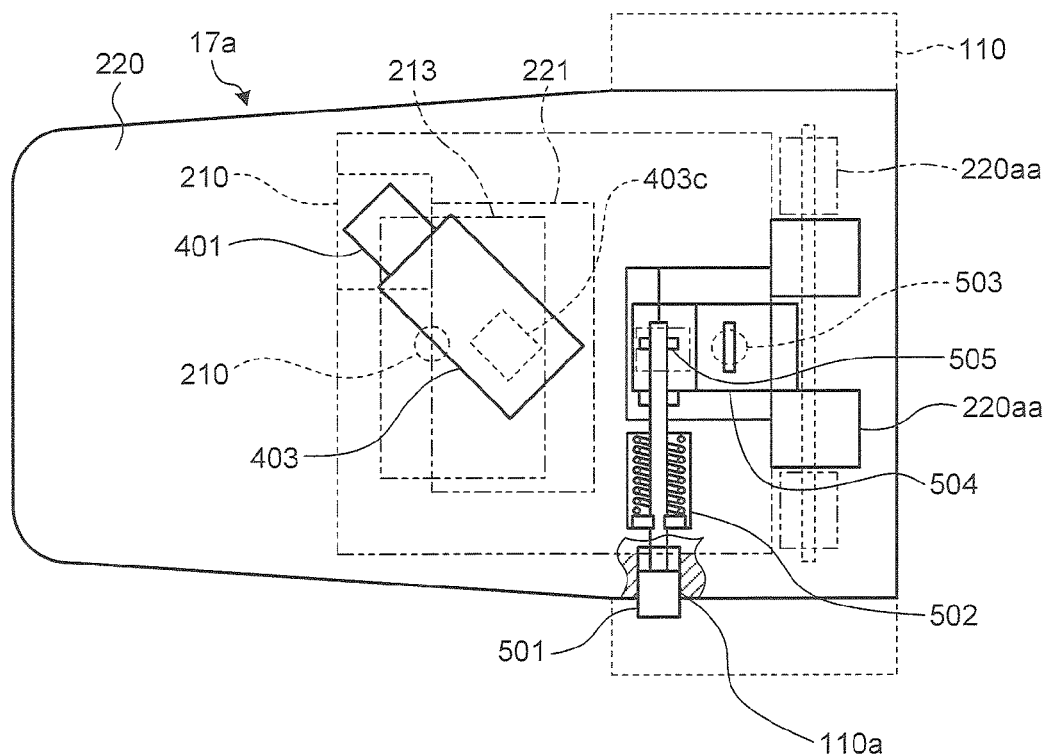
FIG. 8 is a top view of the leg unit of the imaging apparatus according to the second embodiment of the present invention.

FIG. 7 is a partial cross sectional view of a leg unit of an imaging apparatus according to the second embodiment of the present invention. FIG. 8 is a top view of a leg unit of an imaging apparatus according to the second embodiment of the present invention.

As illustrated in FIGS. 7 and 8, a leg unit 17a includes a leg lower unit 210 and a leg upper unit 220.

The leg lower unit 210 includes a first window unit 213. A joint surface (illustrated by the dashed line in the drawing) between the leg lower unit 210 and the leg upper unit 220 (cover part) is fixed by a small screw (not illustrated).

Further, the leg unit 17a includes a first shaft R1 that passes in a right and left direction at an upper surface side where a release switch 16b (see FIG. 3) is arranged, and is fixed to a shaft support unit 111. In the leg lower unit 210, a base end (one end) of the shaft support unit 111 is fit into the first shaft R1, and the base end is revolvable using the first shaft R1 as a rotational axis. A flash light emitting unit 300 provided at a tip (the other end) of the leg lower unit 210 is held inside the leg lower unit 210.

Further, the leg unit 17a includes a light source unit 401 that emits a luminous flux (for example, red light) for setting sights on a desired object in a visual field area of the imaging apparatus 1 toward a back side (photographer side) opposite to the front of a body unit 100, an optical sight unit 400 including a transparent substrate in which a light guiding unit 403 is formed, and the like, and a pop-up mechanism 500 that locks the leg unit 17a by a hook unit 504 of the leg upper unit 220 and a lock unit 505 provided in the body unit 100, and causes the leg unit 17 to be separated from the body unit 100 in response to force from an outside and moves the optical sight unit 400 to an illumination position.

The leg lower unit 210 includes a base unit 210a having a tray shape (ship bottom shape), and that holds the optical sight unit 400 in its inside, and a protruding step like transparent substrate support unit 211 in the base unit 210a. The leg lower unit 210 includes an accommodation unit (a base unit at a recess bottom face side) that accommodates the optical sight unit 400 in an arrangeable manner. Accordingly, in the leg lower unit 210, assembly of a flexible board in which drive signal lines to respective light emitting units are wired becomes easier.

Further, in the leg lower unit 210, the optical sight unit 400 that has a transparent substrate of a light guiding unit 403 is supported to the base unit 210a. The leg lower unit 210 includes a transparent substrate support unit 211 arranged at a desired angle as viewed from a top face of the light guiding unit 403 and supported to two places, and a first window unit 213 that protects the optical sight unit 400 from an outside.

The optical sight unit 400 is a laser light or a light-emitting diode (LED) that emits red sighting light, and is held to a lens frame that supports a collimator lens, and is fixed to the base unit 210a. A rectangular prism is joined to a surface to which the irradiation light is emitted through the holding frame. The divergent light emitted from the light source unit 401 of the optical sight unit 400 is collimated in a collimator lens 402a that guides the divergent light to the light guiding unit 403, and is reflected at the rectangular prism, and sighting light is incident on the transparent substrate in which the light guiding unit 403 is formed.

A reflection type holographic element is formed on the back of the light guiding unit 403, and the collimated sighting light is incident on the reflection type holographic element. The reflected irradiation light is propagated in the transparent substrate, and a luminous flux is emitted from an area intersecting with the optical axis O of the imaging optical system 2 of the imaging apparatus 1. Further, the light source unit 401 abuts a plurality of light emitting element arrays on the transparent case in which a micro lens is formed, and can integrate (unitize) the light emitting element arrays. Further, a galvano mirror (for example, MEMS-type two-dimensional drive reflection mirror) is arranged between the collimator lens 402a and the light guiding unit 403. Then, a correction signal of hand shaking of the imaging apparatus body (shaking in the horizontal or vertical direction in a plane perpendicular to the optical axis of a capturing lens) is added/subtracted to/from a galvano mirror drive circuit, so that a luminous flux deviation of the irradiation light due to the hand shake can be suppressed.

In the second embodiment, the leg unit 17a is employed, in which a base end 220aa is rotated around the first shaft R1 fixed to the shaft support unit 111 in the body unit 100. Alternatively, for example, the rotating movement can be replaced with vertical movement by arranging the leg unit 17a on the top face of the body unit 100 at the back of the imaging lens system as viewed from a surface.

The pop-up mechanism 500 provided at a top face of the body unit 100 of the imaging apparatus 1 includes an operation button 501, a second energization member 503 for pushing up the leg unit 17a to the top face, a first energization member 502 that returns the operation button 501 to an initial position, a hook unit 504 provided in the leg upper unit 220, and a lock unit 505 that causes the leg unit 17a to be accommodated and held in the body unit 100.

The operation button 501 has approximately a rod shape, and is set to a groove part 110a formed in the accommodation unit 110 in a retractable manner. The operation button 501 transfers pressing force from an outside to the lock unit 505. The operation button 501 transfers the force from an outside to release the lock by the lock unit 505. Note that, in the present embodiment, the operation button 501 functions as an operation unit.

The first energization member 502 is configured in an E ring using a compression coil spring, in which one end of the compression coil spring is connected to the body and the other end is connected to a shaft of the operation button 501. The first energization member 502 is locked by the hook unit 504 and the lock unit 505 provided in the leg upper unit 220, and outwardly energizes the operation button 501.

The second energization member 503 is configured from a torsion coil spring, and one end is provided to the accommodation unit 110 and connected to a shaft pin 110b, and the other end is connected to the hook unit 504 provided in the leg upper unit 220. The second energization member 503 energizes the leg unit 17a in a direction that the tip of the leg unit 17a is away from the body unit 100.

The hook unit 504 is provided to the leg upper unit 220 when the irradiation surface of the flash light emitting unit 300 is accommodated to as to be contact with the accommodation unit 110 of the body unit 100. The L-shaped plate-like hook unit 504 with a protrusion and the lock unit 505 that holds and fixes the hook unit 504 are inserted, so that the leg upper unit 220 is locked from lifting.

The lock unit 505 is directly coupled to the operation button 501, and moves from the hook unit 504 in accordance with the movement of the operation button 501.

In the pop-up mechanism 500 configured in this way, when the operation button 501 is pressed inward against the energizing force of the first energization member 502, one end of the operation button 501 presses the lock unit 505, so that the hook unit 504 and the lock unit 505 are released, and thus the lock by the lock unit 505 is released by the hook unit 504. Accordingly, the leg unit 17a rises from the accommodation unit 110 (in a pop up state) by the energizing force of the second energization member 503.

According to the above-described second embodiment of the present invention, framing can be easily performed with respect to a desired object even at telephoto shooting or super telephoto capturing without increasing in size of the imaging apparatus 1.

Third Embodiment

Next, a third embodiment of the present invention will be described. An imaging apparatus according to the third embodiment has a different configuration from the optical sight unit in the leg unit of the imaging apparatus according to the first embodiment. Therefore, hereinafter, a configuration of an optical sight unit of an imaging apparatus according to the third embodiment will be described. Note that the same configuration as the configuration of the imaging apparatus according to the first embodiment is denoted with the same reference sign, and description is omitted.

Figure 9:
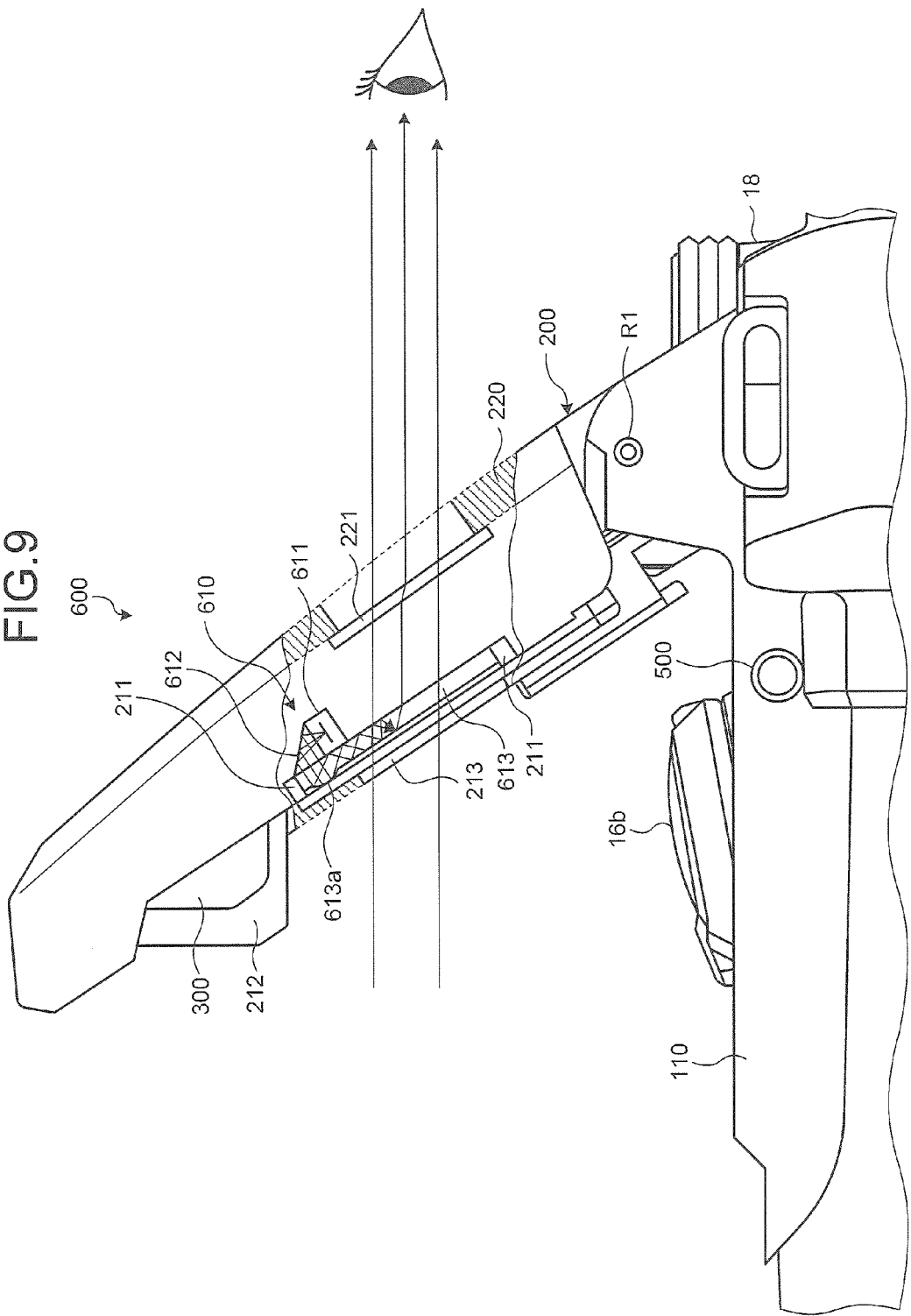
FIG. 9 is a partial cross sectional view of when a leg unit of an imaging apparatus according to a third embodiment of the present invention pops up from a body unit.

FIG. 9 is a partial cross sectional view of when a leg unit of an imaging apparatus 1 according to the third embodiment pops up from a body unit 100.

As illustrated in FIG. 9, a leg unit 600 includes an optical sight unit 610 in place of the optical sight unit 400. The optical sight unit 610 includes a light source unit 611, rectangular prism 612, and a light guiding unit 613.

The light source unit 611 is configured from a red LED, or an integrated chip in which red laser light sources are integrated on a single substrate, and emits sighting light to the rectangular prism 612.

The rectangular prism 612 reflects the sighting light emitted by the light source unit 611 toward the light guiding unit 613. An incident surface of the rectangular prism 612 is joined to the light source unit 611, and an emitting surface that emits the sighting light is joined to the light guiding unit 613.

The light guiding unit 613 is configured from a transparent substrate controlled by using glass, plastic, or the like. The light guiding unit 613 includes a recess part 613a in which a HOE is applied. Accordingly, the sighting light incident through the rectangular prism 612 is diffracted and reflected, and converted into collimated light in the recess part 613a, reflected in the light guiding unit 613 several times. The sighting light of a critical angle or less of the light guiding unit 613 is reflected on the HOE surface where a dielectric multilayer film is applied, and is emitted through a second window unit 221 to the back side of the imaging apparatus 1.

According to the above-described third embodiment of the present invention, framing can be easily performed with respect to a desired object even at telephoto capturing or super telephoto capturing without increasing in size of the imaging apparatus 1.

Further, according to the third embodiment of the present invention, the live view image displayed by the display unit 18 can be confirmed by slightly shifting a visual line from a position where the optical sight unit 610 can sets sights on the object. As a result, the photographer can track a desired object appearing on the screen while confirming the image to be imaged.

Note that, according to the third embodiment of the present invention, a single lens having a collimator function may be provided between the emitting surface of the rectangular prism 612 and the incident surface of the light guiding unit 613, in place of the recess part 613a of the light guiding unit 613, and the rectangular prism 612 and the light guiding unit 613 may be joined. This enables downsizing of the optical sight unit 610, and thus an increase in size of the imaging apparatus 1 can be prevented.

Fourth Embodiment

Next, a fourth embodiment of the present invention will be described. An imaging apparatus according to the fourth embodiment has a different configuration from the optical sight unit in the leg unit of the imaging apparatus according to the first embodiment. Therefore, hereinafter, a configuration of an optical sight unit of an imaging apparatus according to the fourth embodiment will be described. Note that the same configuration as the imaging apparatus 1 of the first embodiment is denoted with the same reference sign, and description is omitted.

Figure 10:
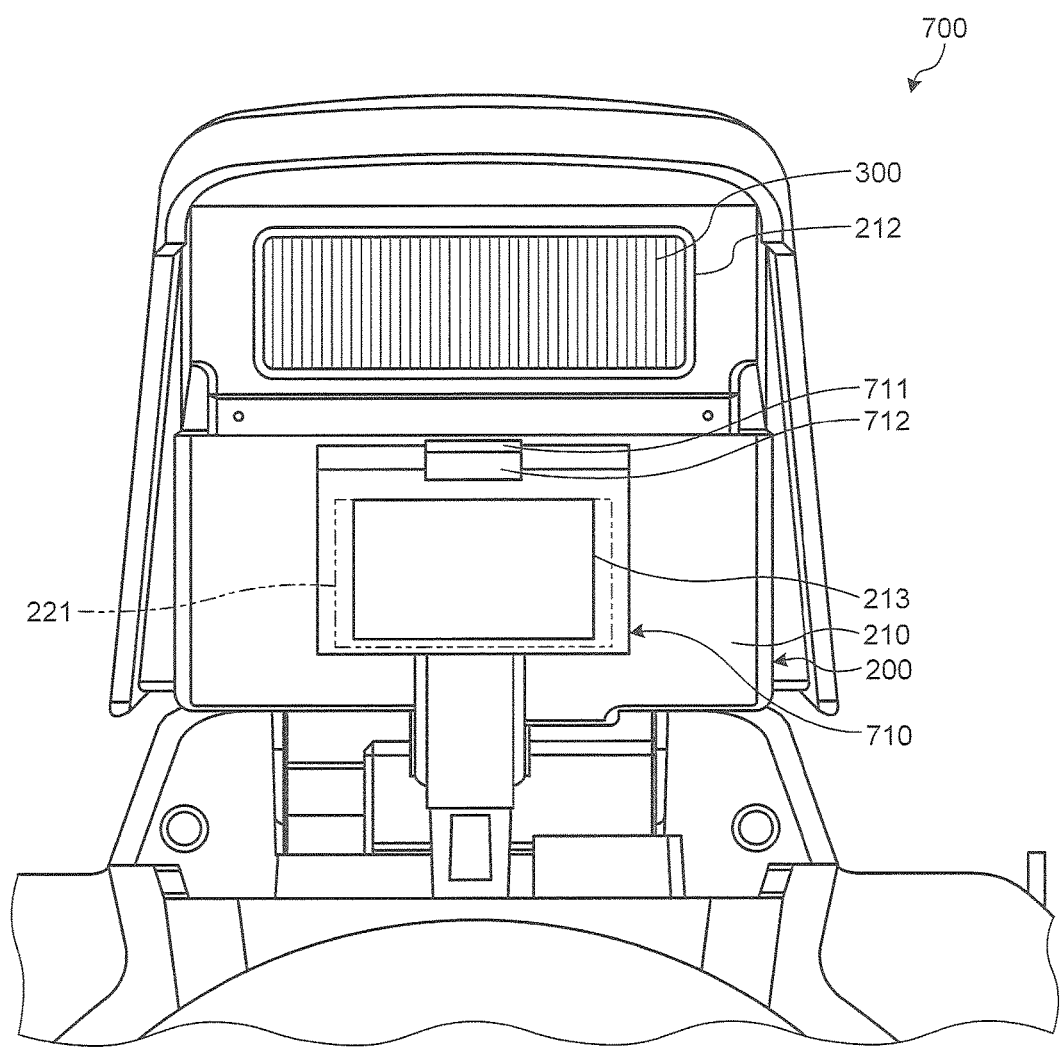
FIG. 10 is a front view of when a leg unit of an imaging apparatus according to a fourth embodiment of the present invention pops up from a body unit.
Figure 11:
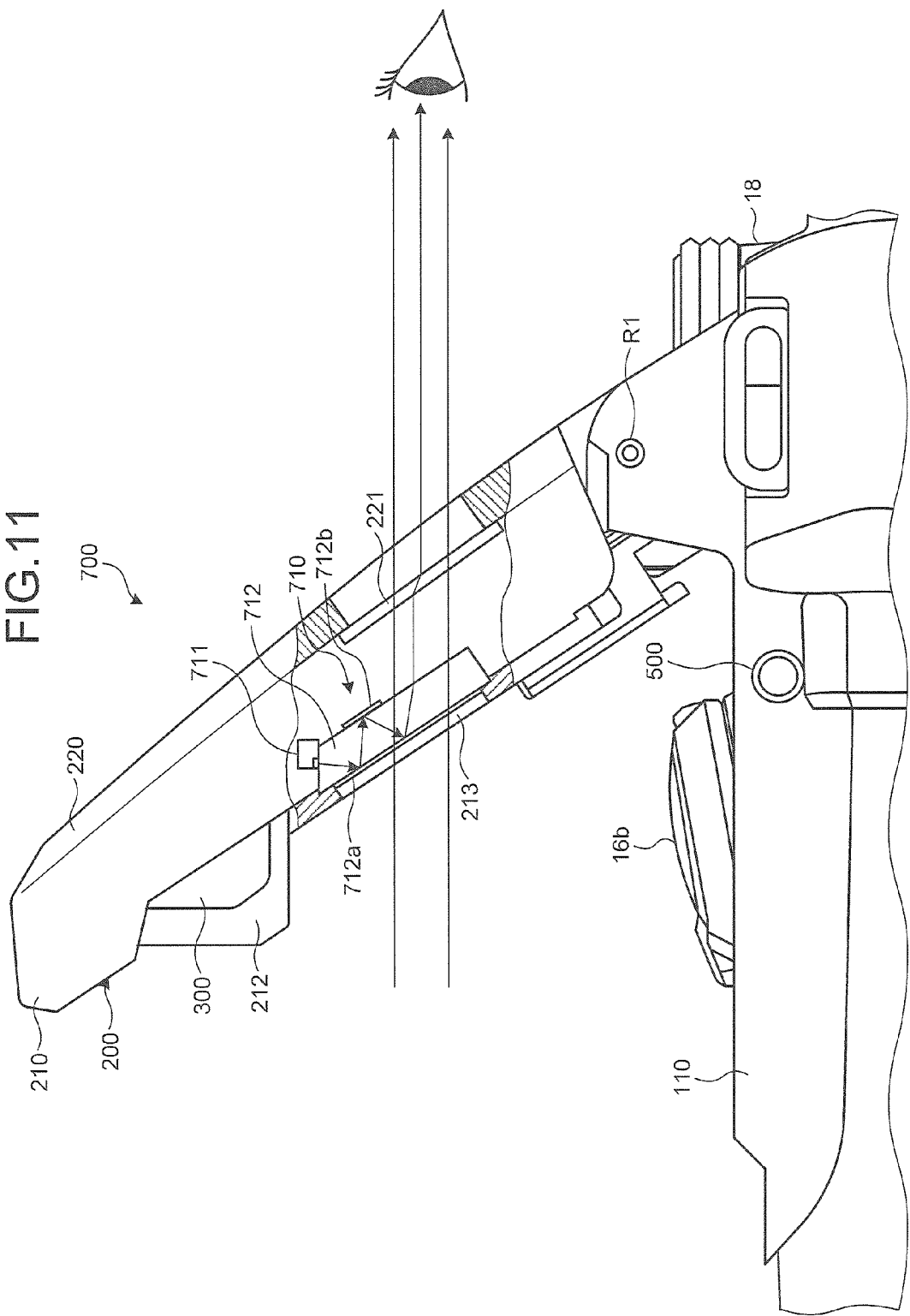
FIG. 11 is a partial cross sectional view of when the leg unit of the imaging apparatus according to the fourth embodiment of the present invention pops up from the body unit.

FIG. 10 is a front view of when a leg unit of an imaging apparatus 1 according to a fourth embodiment of the present invention pops up from a body unit 100. FIG. 11 is a partial cross sectional view of when the leg unit of the imaging apparatus 1 according to the fourth embodiment of the present invention pops up from the body unit 100.

As illustrated in FIGS. 10 and 11, a leg unit 700 includes an optical sight unit 710 in place of the optical sight unit 400. The optical sight unit 710 includes a light source unit 711, and a light guiding unit 712.

The light source unit 711 is configured from an integrated chip in which red laser light sources are integrated on a single substrate, and emits sighting light to the light guiding unit 712. The light source unit 711 is joined to a slope of the light guiding unit 712.

The light guiding unit 712 is configured from a plate transparent substrate formed of glass, plastic, or the like, and converts divergent light from the light source unit 711 into collimated light and emits irradiation light toward a photographer side (back side). Portions of four corners of the light guiding unit 712 are notched, and the light source unit 711 is joined to the portions. The light guiding unit 712 includes a reflection type first HOE 712a having a collimator lens function to convert the sighting light emitted by the light source unit 711 into collimated light, and a reflection type second HOE 712b having angular selectivity. Accordingly, the sighting light emitted from the light source unit 711 is converted into collimated light in the first HOE 712a and reflected. The light reflected at the first HOE 712a is reflected in the light guiding unit 712 several times. Red sighting light is reflected at the second HOE 712b to which a dielectric multilayer film that reflects only red is applied, emitted to the back side, and directed to the second window unit 221.

According to the above-described fourth embodiment of the present invention, framing can be easily performed with respect to a desired object even at telephoto capturing or super telephoto capturing without increasing in size of the imaging apparatus 1.

Further, according to the fourth embodiment of the present invention, the live view image displayed by the display unit 18 can be confirmed by slightly shifting a visual line from a position where the optical sight unit 710 can sets sights on the object. As a result, the photographer can track a desired object appearing on the screen while confirming the image to be imaged.

Further, according to the fourth embodiment of the present invention, a free curved surface prism or a rectangular prism need not to be provided, and thus downsizing can be further enhanced.

Fifth Embodiment

Next, a fifth embodiment of the present invention will be described. An imaging apparatus according to the fifth embodiment is different from the imaging apparatus 1 of the first embodiment in leg unit. Therefore, hereinafter, a leg unit of an imaging apparatus according to the fifth embodiment will be described. Note that the same configuration as the imaging apparatus 1 of the first embodiment is denoted with the same reference sign, and description is omitted.

Figure 12:
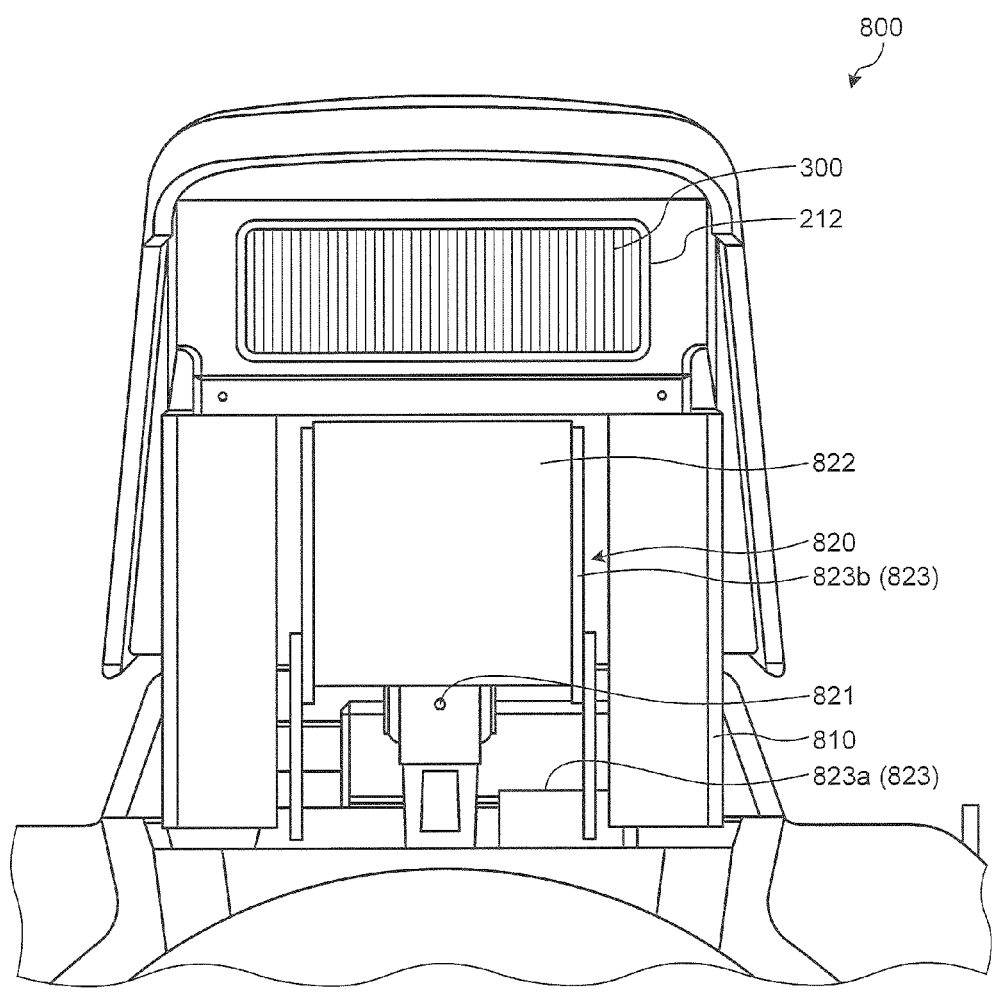
FIG. 12 is a front view of when a leg unit of an imaging apparatus according to a fifth embodiment of the present invention pops up from a body unit.
Figure 13:
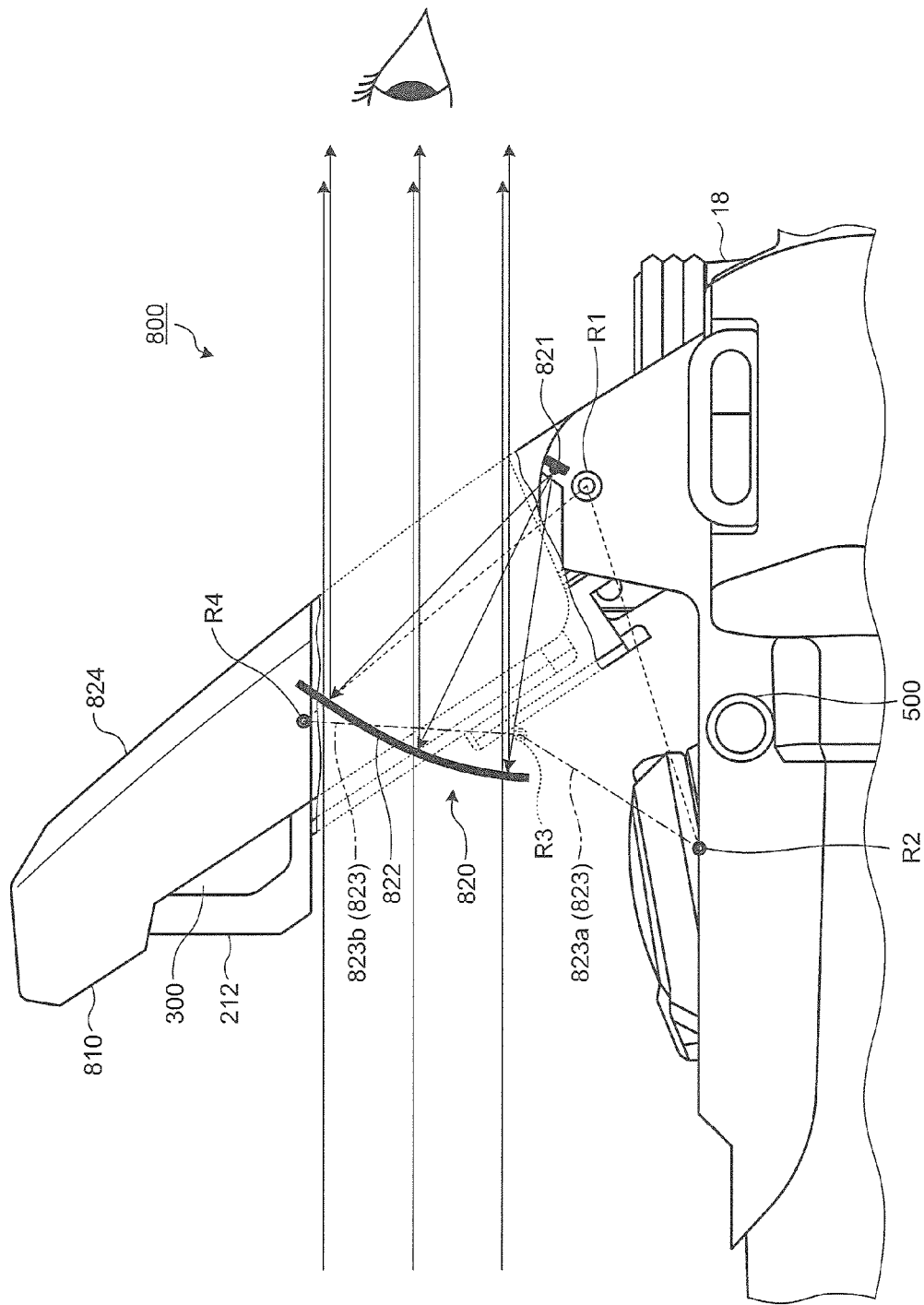
FIG. 13 is a partial cross sectional view of when the leg unit of the imaging apparatus according to the fifth embodiment of the present invention pops up from the body unit.
Figure 14:
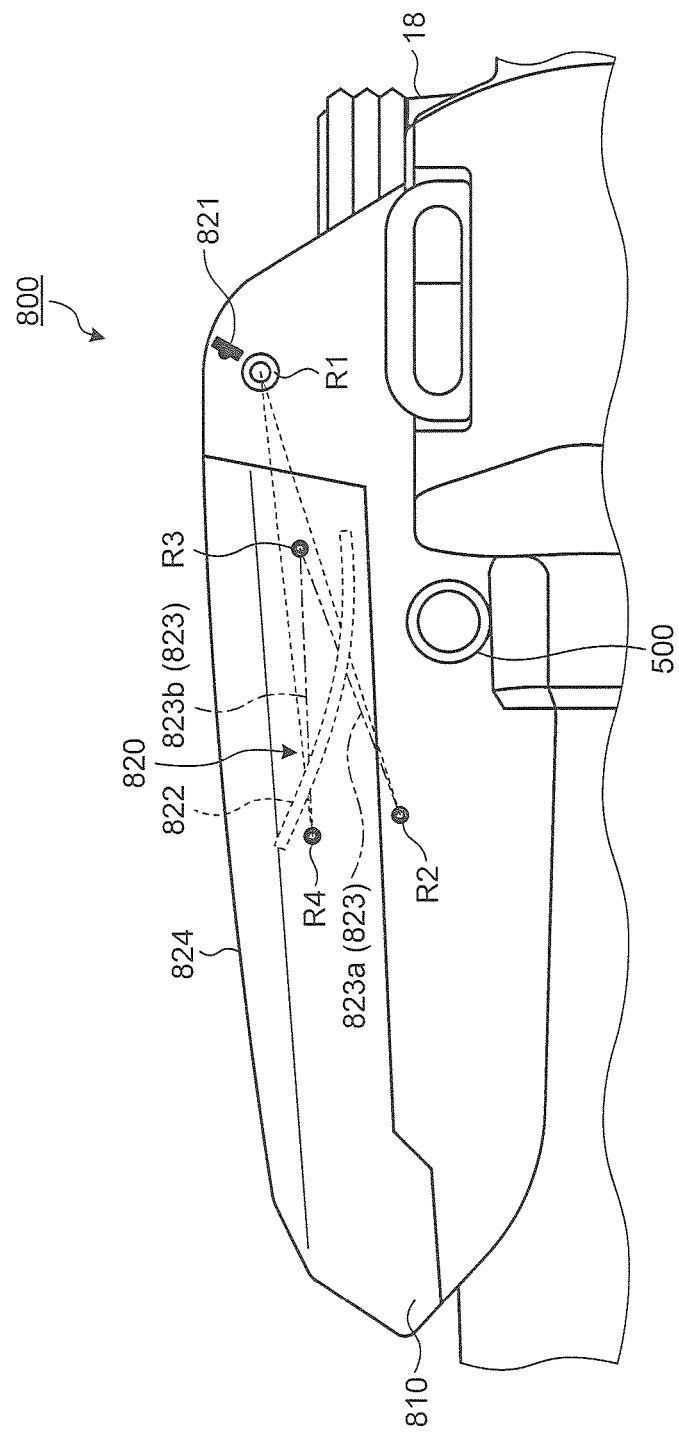
FIG. 14 is a partial cross sectional view of when the leg unit of the imaging apparatus according to the fifth embodiment of the present invention is accommodated in the body unit.

FIG. 12 is a front view of when a leg unit of an imaging apparatus according to the fifth embodiment of the present invention pops up from a body unit 100. FIG. 13 is a partial cross sectional view of when the leg unit of the imaging apparatus according to the fifth embodiment of the present invention pops up from the body unit 100. FIG. 14 is a partial cross sectional view of when the leg unit of the imaging apparatus according to the fifth embodiment of the present invention is accommodated in the body unit 100.

As illustrated in FIGS. 12 to 14, a lower end of a leg unit 800 is coupled to a first shaft R1 that passes a top face of the body unit 100 in a right and left direction, and the leg unit 800 is rotatably provided to the body unit 100 using the first shaft R1 as a rotational axis. To be specific, the leg unit 800 is pivotally supported to the body unit 100 rotatably. Further, the leg unit 800 includes a flash light emitting unit 300 provided at an upper end of the leg unit 800 and emits illumination light toward an object area of the imaging apparatus 1, an optical sight unit 820 provided in the leg unit 800, and emits luminous light to be sighted on a desired object in the object area of the imaging apparatus 1 toward a photographer side, and a pop-up mechanism 500 that separates the leg unit 800 form the body unit 100. Further, the leg unit 800 holds the flash light emitting unit 300 such that an irradiation surface irradiated by the flash light emitting unit 300 with the illumination light faces a visual field area (imaging direction).

The optical sight unit 820 includes a light source unit 821 that emits sighting light toward an object area of the imaging apparatus 1, a reflecting optical element 822 that allows light from the object area of the imaging apparatus 1 to transmit, and reflects luminous light emitted by the light source unit 821 toward a back side opposite to the front of the imaging apparatus 1, a support part 823 that rotatably supports the reflecting optical element 822 to the body unit 100, and an opening part 824 provided in a position intersecting with a line that passes through the reflecting optical element 822, and in which a cover member 824a that protects the reflecting optical element 822 is formed in an openable/closable manner toward the object side. Note that details of the cover member 824a will be described below.

The light source unit 821 is configured from a red LED, an LED drive circuit, or the like, and emits luminous flux toward the reflecting optical element 822. The light source unit 821 is provided at a lower part of an upper portion 810, and emits sighting light obliquely upward at the object side.

The reflecting optical element 822 is configured from a half mirror or a mirror in which a dielectric multilayer film is provided, which reflects light having a specific wavelength, that is, only red. The reflecting optical element 822 reflects the sighting light emitted by the light source unit 821 toward the back side, and transmits the light from the visual field area of the imaging apparatus 1. The reflecting optical element 822 has a parabolic curving toward the back side when the leg unit 800 pops up or a spherical surface approximating thereto.

The support part 823 includes a pair of first links 823a and a pair of second links 823b. Lower ends of the first links 823a are coupled to a second shaft R2 that passes through a top face of the body unit 100 in a right and left direction. The first links 823a are rotatable about the second shaft R2 as a rotational axis. The second links 823b are coupled to upper end portions of the first links 823a and are rotatable about a third shaft R3 as a rotational axis, which is parallel with the second shaft R2, with respect to the first links 823a. Lower ends of the second links 823b pass through a portion coupled to the first links 823a. The second links 823b pass through the upper portion 810 in the right and left direction, and are coupled to the second and third shafts R2 and R3, and are rotatable about a fourth shaft R4 as a rotational axis. The second links 823b support the reflecting optical element 822 at both ends inside. The first links 823a support the second link 823b at both ends inside.

The opening part 824 includes the cover member 824a openable/closable toward the object side, and is provided at a position intersecting with a line that passes through the reflecting optical element 822. To be specific, the opening part 824 is provided between a flash light emitting unit 300 and the body unit 100. The cover member 824a of the opening part 824 opens when the flash light emitting unit 300 is moved to an irradiation position where the flash light emitting unit 300 irradiates the illumination light (in a pop up state). Further, the cover member 824a of the opening part 824 protects the optical sight unit 820 from an outside when the upper portion 810 is accommodated in the body unit 100 (in a pop down state).

Figure 15:
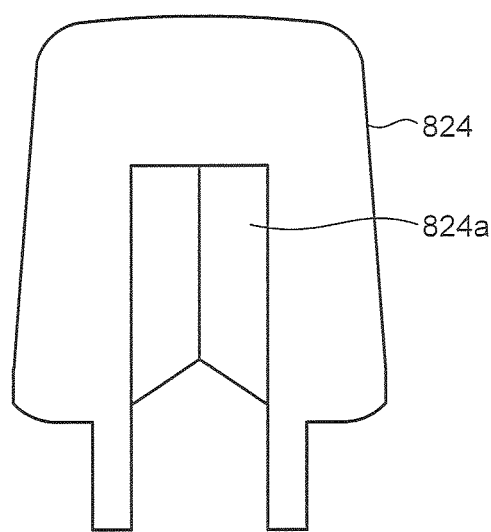
FIG. 15 is a top view schematically illustrating a state of an opening part of when the leg unit of the imaging apparatus according to the fifth embodiment of the present invention is accommodated in an accommodation unit.
Figure 16:
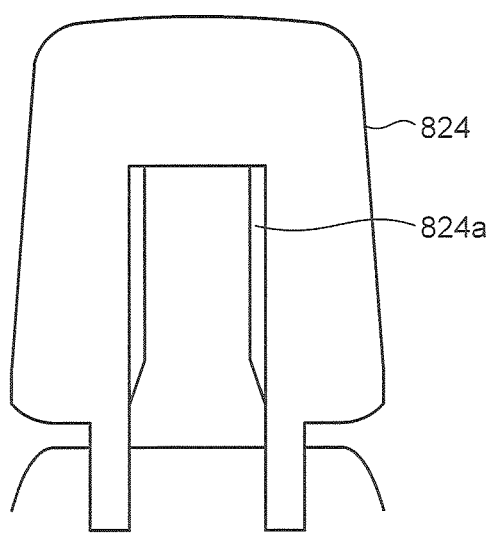
FIG. 16 is a top view schematically illustrating a state of an opening part of when the leg unit of the imaging apparatus according to the fifth embodiment of the present invention pops up from the accommodation part.

FIG. 15 is a top view schematically illustrating a state of the cover member 824a of when the upper portion 810 is accommodated in the accommodation unit 110. FIG. 16 is a top view schematically illustrating a state of the cover member 824a of when the upper portion 810 is separated from the accommodation unit 110.

As illustrated in FIGS. 15 and 16, the cover member 824a is provided in the opening part 824 in an openable/closable manner toward the object side, and opens toward the object side when the upper portion 810 is separated from the accommodation unit 110. Accordingly, the user can confirm the visual field area of the imaging apparatus 1 through the opening part 824 and the reflecting optical element 822, and can visually recognize the sighting light emitted by the optical sight unit 820.

In the optical sight unit 820 configured in this way, when the light source unit 821 is driven in a state where the leg unit 800 pops up from the body unit 100, the sighting light (sight point) is projected to the reflecting optical element 822. To be specific, the reflecting optical element 822 produces a virtual image of the sighting light emitted by the light source unit 821 within the object area or in the vicinity of the object area. In this case, the sighting light is projected to the reflecting optical element 822 at almost infinity (see the collimated light of FIG. 13). Therefore, if the imaging apparatus 1 is not moved with respect to the object, the photographer does not stray off the sighting light even if shifting the position of the eyes. Therefore, the photographer can frame the object to an approximate center in the visual field area (in the image) by adjusting the sighting light to a desired object. Further, the photographer can easily capture the object in the visual field area (in the image) of the imaging apparatus 1 by continuously adjusting the sighting light to the object even if the desired object is a moving object. Further, movement of the light source unit 821 does not need to be mechanically moved, and can be electrically performed by using an element having lineally or planarly divided light emitting units.

Figure 17:
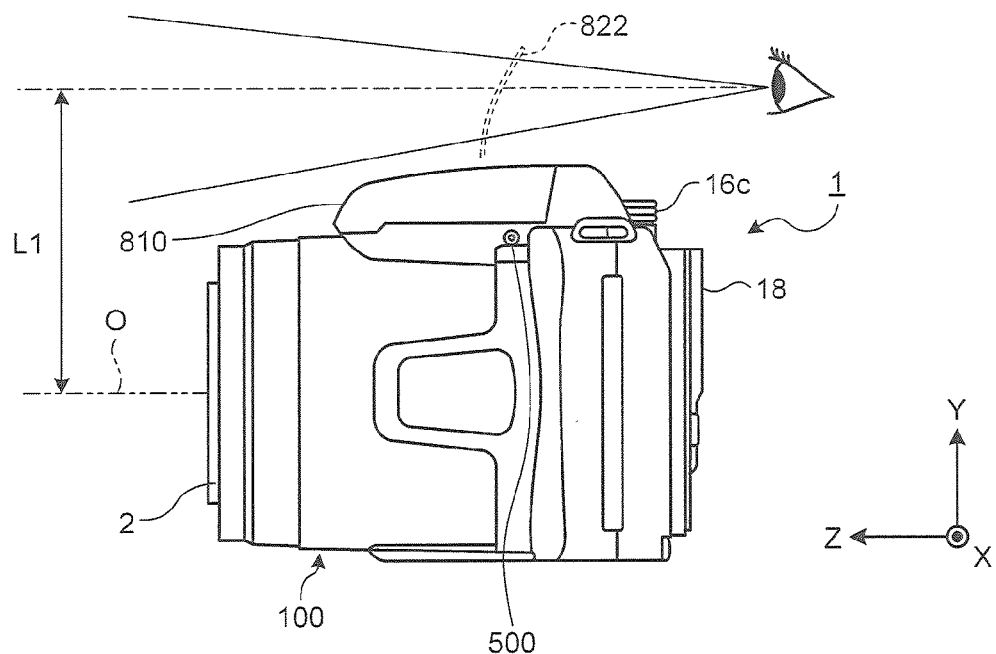
FIG. 17 is a side view schematically illustrating a state in which the leg unit of the imaging apparatus according to the fifth embodiment of the present invention is positioned in a visual field area of an optical sight when the optical sight is driven.
Figure 18:
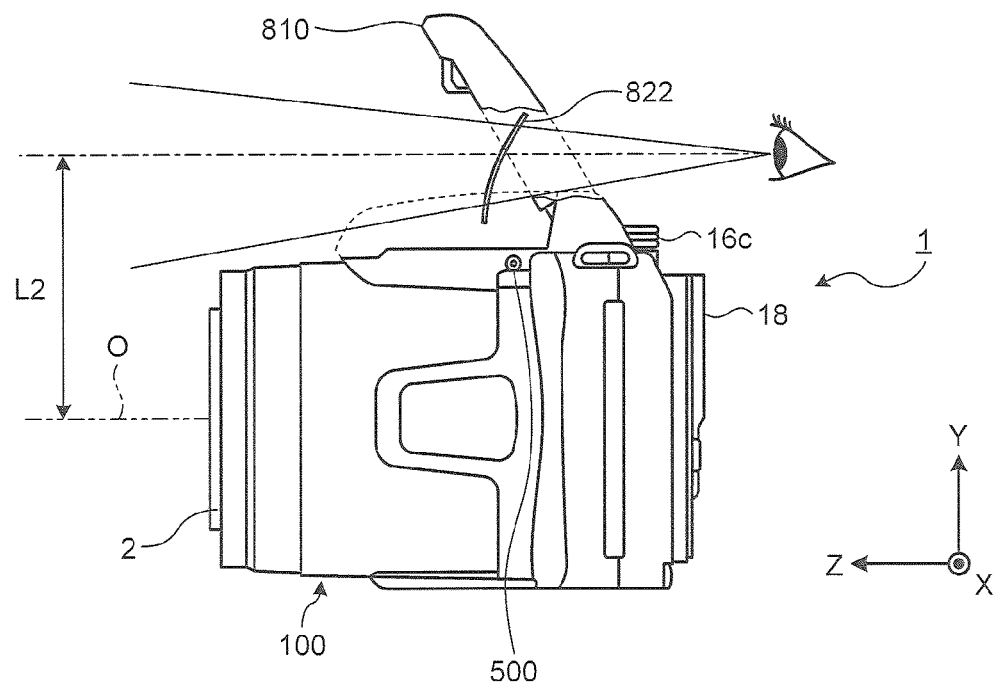
FIG. 18 is a side view schematically illustrating a state in which the leg unit of the imaging apparatus according to the fifth embodiment of the present invention is retracted outside the visual field area of the optical sight when the optical sight is driven.

Further, in the leg unit 800, at least a part of the upper portion 810, for example, a tip is retracted outside the visual field area of the optical sight unit 820 at the driving of the optical sight unit 820. Therefore, vignetting in the field of view of the optical sight unit 820 can be made smaller, and a parallax between the optical axis O of the imaging optical system 2 and the virtual image of the sighting light displayed in the reflecting optical element 822 of the optical sight unit 820 can be made smaller. For example, as illustrated in FIG. 17, the tip of the leg unit 800 is not retracted from the visual field area of the photographer, and thus a parallax L1 between the optical axis O of the imaging optical system 2 and the virtual image of the sighting light displayed in the reflecting optical element 822 of the optical sight unit 820 becomes larger. In contrast, as illustrated in FIG. 18, the tip of the leg unit 800 is retracted from the visual field area of the photographer, and thus a parallax L2 between the optical axis O of the imaging optical system 2 and the virtual image of the sighting light displayed in the reflecting optical element 822 of the optical sight unit 820 can be made smaller than the parallax L1 of FIG. 17 (parallax L2<parallax L1). Accordingly, even if the focal distance of the imaging optical system 2 is telephoto, a deviation of the sighting due to the distance to the object caused by the parallax between the optical axis O of the imaging optical system 2 and the virtual image of the sighting light displayed in the reflecting optical element 822 of the optical sight unit 820 can be made smaller, and the sighting light can be more reliably adjusted in a desired object area or in the vicinity of the object area.

Further, when the upper portion 810 is accommodated in the accommodation unit 110, the support part 823 is folded around the third shaft R3, and the first link 823a and the second link 823b are folded toward the photographer side, so that the leg unit 800 is accommodated in the accommodation unit 110 of the body unit 100 (see FIG. 14).

According to the above-described fifth embodiment of the present invention, framing can be easily performed with respect to a desired object even at telephoto capturing or super telephoto capturing without increasing in size of the imaging apparatus 1.

Further, according to the fifth embodiment of the present invention, even if the photographer slightly shifts the visual line from a position where the optical sight unit 820 can sets sights, the photographer can see the live view image displayed by the display unit 18. Therefore, the photographer can trace the object while confirming the image to be imaged.

Further, according to the fifth embodiment of the present invention, a configuration is employed, in which at least a part of the leg unit 800 or the body unit 100 is retracted outside the visual field area of the optical sight unit 820 at the driving of the optical sight unit 820. Therefore, a field of view through the optical sight unit 820 becomes wider, and the optical axis O of the imaging optical system 2 and the optical sight unit 820 can be arranged close, whereby the parallax of the image data to be captured and the optical sight unit 820 can be made smaller.

Further, according to the fifth embodiment of the present invention, as viewed along a direction parallel with the optical axis O of the imaging optical system 2, a tilt and shift mechanism in the up and down direction or a mechanism moving in a direction perpendicular to the optical axis O of the imaging optical system 2 can be provided to the light source unit 821 that constitutes the optical sight unit 400.

Sixth Embodiment

Next, a sixth embodiment of the present invention will be described. An imaging apparatus according to the sixth embodiment has a different configuration from the imaging apparatus 1 according to the first embodiment. Therefore, hereinafter, an imaging apparatus according to the sixth embodiment will be described. Note that the same configuration as the imaging apparatus 1 of the first embodiment is denoted with the same reference sign, and description is omitted.

Figure 19:
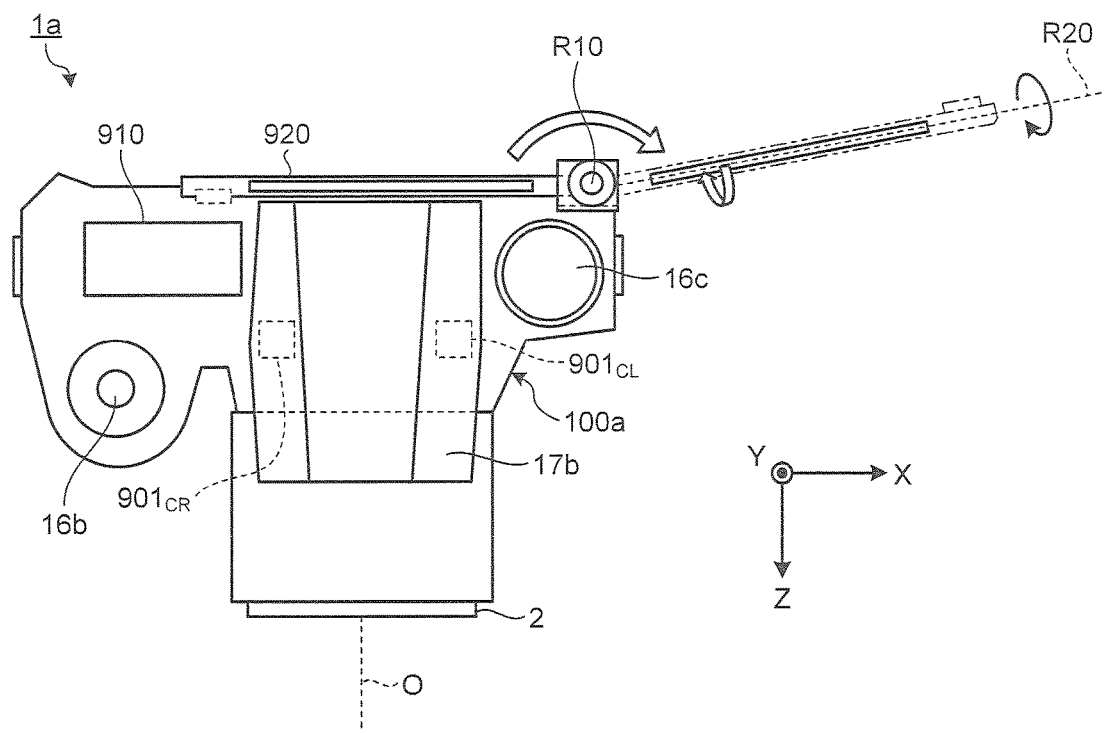
FIG. 19 is a top view of an imaging apparatus according to sixth embodiment of the present invention.
Figure 20:
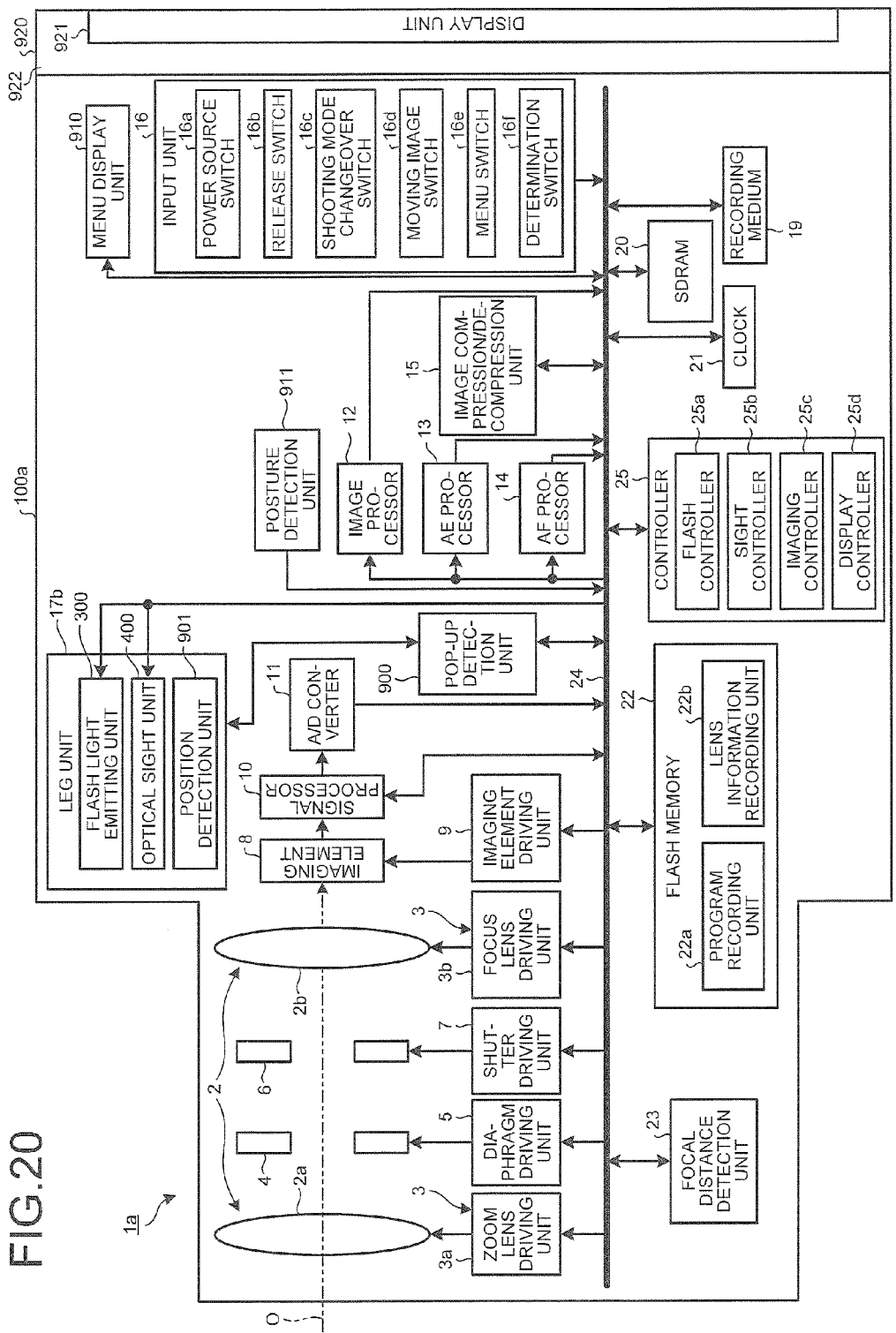
FIG. 20 is a block diagram illustrating a function configuration of the imaging apparatus according to the sixth embodiment of the present invention.

FIG. 19 is a top view of an imaging apparatus according to the sixth embodiment of the present invention. FIG. 20 is a block diagram illustrating a function configuration of the imaging apparatus according to the sixth embodiment of the present invention.

An imaging apparatus 1a illustrated in FIGS. 19 and 20 includes a body unit 100a that generates image data by receiving light collected from a specified visual area through an imaging optical system 2 provided at a front side facing an object, and performing photoelectric conversion.

The body unit 100a includes the imaging optical system 2, a lens driving unit 3, a diaphragm 4, a diaphragm driving unit 5, a shutter 6, a shutter driving unit 7, and an imaging element 8, an imaging element driving unit 9, a signal processor 10, an A/D converter 11, an image processor 12, an AE processor 13, an AF processor 14, an image compression/decompression unit 15, an input unit 16, a leg unit 17b, a recording medium 19, an SDRAM 20, a clock 21, a flash memory 22, a focal distance detection unit 23, a bus 24, a controller 25, a posture detection unit 911, a menu display unit 910, and a display unit 920.

The leg unit 17b is pivotally supported to the body unit 100a rotatably, and is provided to the body unit 100a in a movable manner (in a manner capable of popping up) in a direction away from the body unit 100a and in a direction perpendicular to an optical axis O of the imaging optical system 2. The leg unit 17b includes a flash light emitting unit 300, an optical sight unit 400, and a position detection unit 901 that receives orbit information of satellites transmitted from a plurality of GPS satellites that configures a global positioning system (GPS) as a measuring means to measure a position of an object on the ground, and acquires position information of the imaging apparatus 1a at the time of capturing based on the received orbit information. The position information includes longitude, latitude, and time information.

Figure 21:
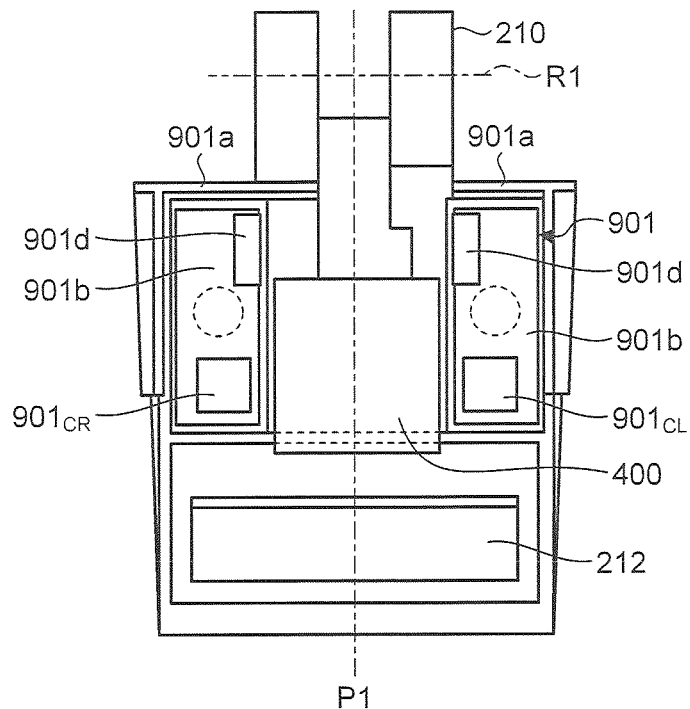
FIG. 21 is a top view of the leg unit of the imaging apparatus according to the sixth embodiment of the present invention.
Figure 22:
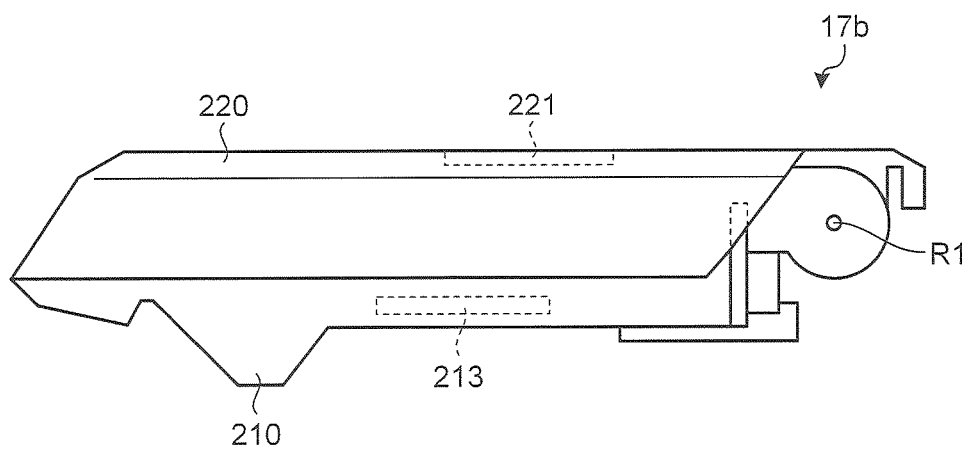
FIG. 22 is a side view of the leg unit of the imaging apparatus according to the sixth embodiment of the present invention.
Figure 23:
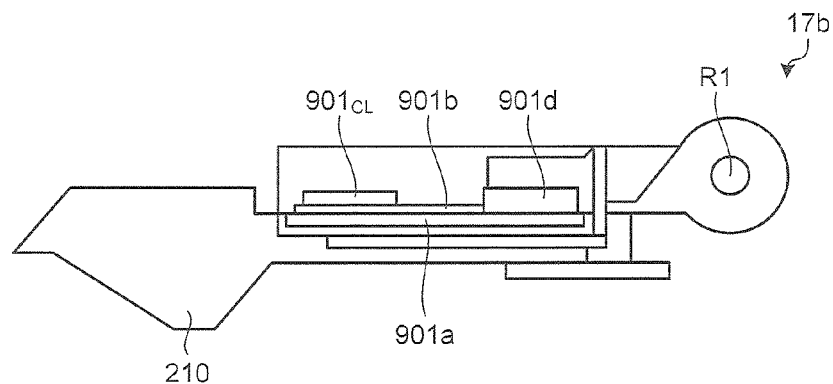
FIG. 23 is a partial cross sectional view of the imaging apparatus according to the sixth embodiment of the present invention as viewed from a side.
Figure 24:
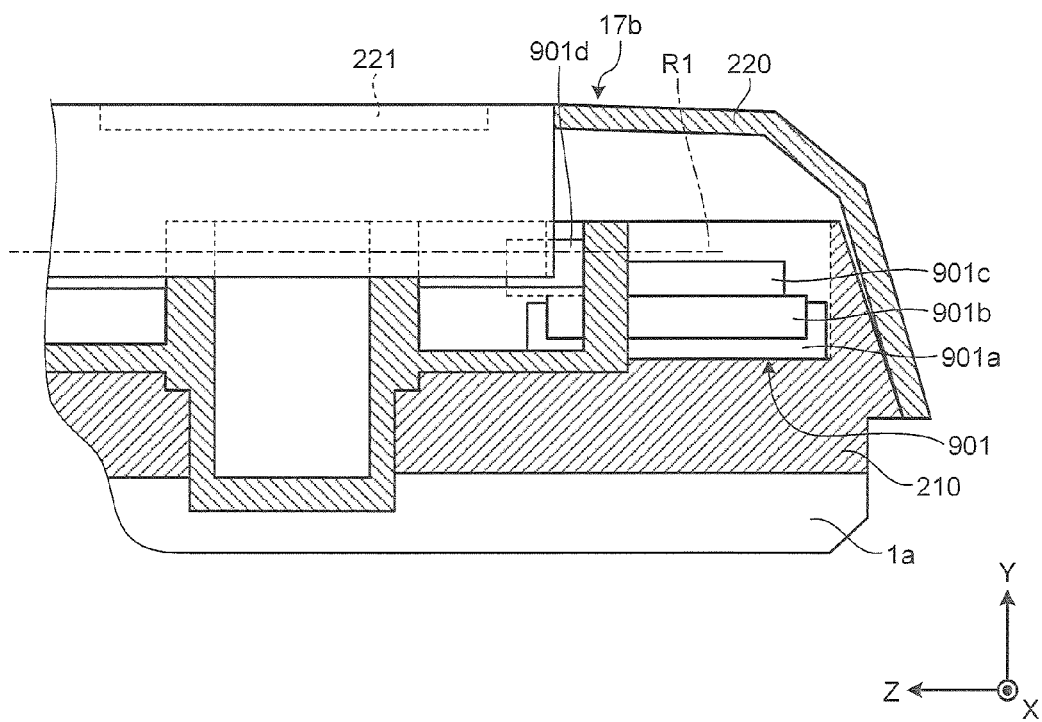
FIG. 24 is a partial cross sectional view of the leg unit of the imaging apparatus according to the sixth embodiment of the present invention as viewed from the back.

Here, the configuration of the leg unit 17b will be described in detail. FIG. 21 is a top view of the leg unit 17b, and is a top view, in which the leg upper unit 220 is removed. FIG. 22 is a side view of the leg unit 17b. FIG. 23 is a partial cross sectional view of the leg unit 17b as viewed from a side. FIG. 24 is a partial cross sectional view of the leg unit 17b as viewed from the back. Note that, in FIGS. 21 to 24, for simplification of the description, a state in which the flash light emitting unit 300 and the optical sight unit 400 are removed will be described.

As illustrated in FIGS. 21 to 24, the leg unit 17b is provided at an upper surface side of the body unit 100a where a release switch 16b of the body unit 100a and the like are arranged, a base end side of the leg unit 17b is fixed to a first shaft R1 (base end), and the leg unit 17b is pivotally supported to the body unit 100a rotatably using the first shaft R1 as a rotational axis. The leg unit 17b includes a leg lower unit 210 having a tray shape (ship bottom shape), and holding the flash light emitting unit 300, the optical sight unit 400, and the position detection unit 901 therein, and a leg upper unit 220 (cover part) joined to the leg lower unit 210 so as to face an inner surface side of the leg lower unit 210, and forming an approximate casing together with the leg lower unit 210.

The position detection unit 901 is provided in the leg lower unit 210. To be specific, the position detection units 901 are respectively provided in the right and left leg lower units 210 in a symmetrical manner with respect to the optical axis O. To be specific, the position detection units 901 are symmetrically provided in the right and left leg lower units 210 respectively with respect to the center of the leg unit 17b. The position detection unit 901 includes a shield plate 901a, a printed circuit board 901b, and a GPS unit 901c.

The shield plate 901a has an approximately c-shaped cross section, and is formed into a thin plate to cover the printed circuit board 901b. The shield plate 901a shields an electromagnetic field and a radio wave from an outside so that the GPS unit 901c does not receive unnecessary radio waves reflected on the ground or inside the imaging apparatus 1a among radio waves from the satellites. The shield plate 901a is fixed to the leg lower unit 210 with a screw and the like (not illustrated).

On the printed circuit board 901b, the GPS unit 901c and a connection connector 901d for connecting the printed circuit board 901b and the power source of the body unit 100a and the controller 25. The printed circuit board 901b is fixed to the shield plate 901a by an adhesive, or the like.

The GPS unit 901c is fixed to the printed circuit board 901b. The GPS unit 901c acquires position information of the imaging apparatus 1a. The GPS unit 901c is configured from an antenna integrated type module. Note that the two dashed lines (circles) illustrated in FIG. 21 indicate positions where the leg lower unit 210 is fixed to the leg upper unit 220 with screws.

Referring back to FIGS. 19 and 20, description of the configuration of the imaging apparatus 1a is continued.

The menu display unit 910 is provided on a top face (see FIG. 19) of the imaging apparatus 1a under control of the display controller 25d. The menu display unit 910 displays a capacity of the recording medium 19 of the imaging apparatus 1a, a residual amount of the battery, and the like. Further, the menu display unit 910 displays a reception state and an operation state of the position detection unit 901 under control of the display controller 25d. Further, the menu display unit 910 displays an operation state of the optical sight unit 400, for example, a mark and a letter indicating that the optical sight unit 400 is in operation, and the like, under control of the display controller 25d. The menu display unit 910 is configured from a display monitor such as liquid crystal or an organic EL.

The posture detection unit 911 detects a posture state of the imaging apparatus 1a. To be specific, the posture detection unit 911 detects a posture of the imaging apparatus 1a by detecting an acceleration and an angular velocity caused in the imaging apparatus 1a, and outputs a detection result thereof to the controller 25. For example, the posture detection unit 911 detects a case in which the imaging apparatus 1a is held to capture a horizontally long image (hereinafter, referred to as "horizontal position"), a case in which the imaging apparatus 1a is held to capture a vertically long image, and the shooting mode changeover switch 16c is switched to the upper side (hereinafter, referred to as "vertical position 1"), and a case in which the imaging apparatus 1a is held to capture a vertical and horizontal image, and the release switch 16b is switched to the upper side (hereinafter, referred to as "vertical position 2"), respectively, and outputs the states to the controller 25. The posture detection unit 911 is configured from a triaxial acceleration sensor that detects an acceleration component of each axis direction, a gyro sensor, and the like.

The display unit 920 is rotatably provided to the body unit 100a from the back side of the imaging apparatus 1a to the front side of the imaging apparatus 1a, and displays an image corresponding to the image data generated by the imaging element 8. The display unit 920 includes a display unit 921 that displays an image corresponding to the image data generated by the imaging element 8, and a display frame 922 that holds the display unit 921.

The display unit 921 displays an image corresponding to the image data generated by the imaging element 8. The display unit 921 is configured from a liquid crystal, an organic EL, or the like.

The display frame 922 is rotatably supported to the body unit 100a through a horizontal support shaft R10. The display frame 922 is rotatably supported approximately 180° in the horizontal direction, and is rotatably supported 180° around the vertical support shaft R10. Further, the display frame 922 is rotatably supported 180° around the horizontal support shaft R20, and is rotatably provided from the back side of the imaging apparatus 1a to the front side of the imaging apparatus 1a.

Figure 25:
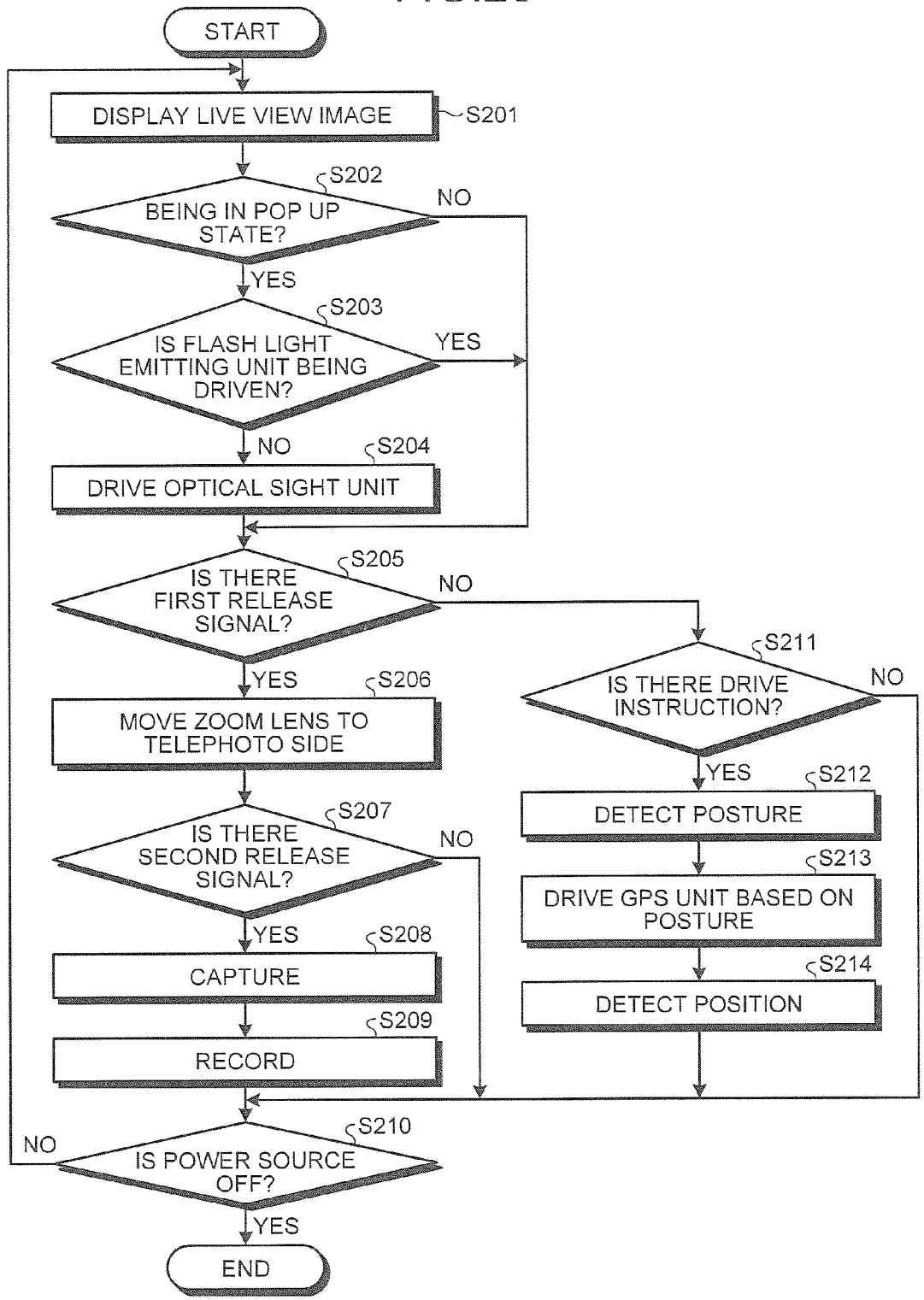
FIG. 25 is a flowchart illustrating an outline of processing executed by the imaging apparatus according to the sixth embodiment of the present invention.

Processing executed by the imaging apparatus 1a having the above configuration will be described. FIG. 25 is a flowchart illustrating an outline of the processing executed by the imaging apparatus 1a.

As illustrated in FIG. 25, the imaging controller 25c causes the imaging element 8 to generate a live view image (step S201).

Next, the controller 25 determines whether the leg unit 17b is being in a pop up state based on a determination result of the pop-up detection unit 900 (step S202). When the controller 25 determines that the leg unit 17b is being in a pop up state based on the determination result of the pop-up detection unit 900 (step S202: Yes), the imaging apparatus 1a proceeds to step 3203 described below. In contrast, when the controller 25 determines that the leg unit 17b is not being in a pop up state (step S202: No) based on a detection result of the pop-up detection unit 900, the imaging apparatus 1a proceeds to step S205 described below.

In step S203, when the flash light emitting unit 300 is not being driven (step S203: No), the sight controller 25b drives the optical sight unit 400 (step S204). After step S204, the imaging apparatus 1a proceeds to step S205.

In step S203, when the flash light emitting unit 300 is being driven (step S203: Yes), the imaging apparatus 1a proceeds to step S205.

Next, when the first release signal is input from the release switch 16b (step S205: Yes), the imaging controller 25c drives the zoom lens driving unit 3a to move the zoom optical system 2a to a Tel side (step S206).

Next, when the second release signal is input from the release switch 16b (step S207: Yes), the imaging controller 25c causes the imaging element 8 to capture an image (step S208).

Following that, the imaging controller 25c records the image data generated by the imaging element 8 and the position information detected by the position detection unit 901 in the recording medium 19 in association with each other (step S209).

Next, when the power source switch 16a is operated, and a power source of the imaging apparatus 1a is turned OFF (step S210: Yes), the imaging apparatus 1a terminates the present processing. In contrast, when the power source switch 16a is not operated, and the power source of the imaging apparatus 1a is not turned OFF (step S210: No), the imaging apparatus 1a returns to step S201.

In step S207, when the second release signal is not input from the release switch 16b (step S207: No), the imaging apparatus 1a proceeds to step S210.

In step S205, when the first release signal is not input form the release switch 16b (step S205: No), the imaging apparatus 1a proceeds to step S211.

Next, when the instruction signal to drive the GPS unit 901c of the position detection unit 901 is input from the input unit 16 (step S211: Yes), the posture detection unit 911 detects a posture of the imaging apparatus 1a (step S212).

Next, the controller 25 drives the GPS unit 901c based on the posture of the imaging apparatus 1a detected by the posture detection unit 911 (step S213). To be specific, when the posture detection unit 911 detects the posture of the imaging apparatus 1a as a vertical position 1, the controller 25 drives a GPS unit 901cR. When the posture detection unit 911 detects the posture of the imaging apparatus 1a as a vertical position 2, the controller 25 drives a GPS unit 901cL.

Following that, the position detection unit 901 detects the position of the imaging apparatus 1a (step S214). In this case, the position detection unit 901 outputs the position of the imaging apparatus 1a to the controller 25. After step S214, the imaging apparatus 1a proceeds to step S210.

In step S211, when the instruction signal to drive the GPS unit 901c is not input from the input unit 16 (step S211: No), the imaging apparatus 1a proceeds to step S210.

According to the sixth embodiment of the present invention described above, a pair of position detection units 901 is provided in the leg unit 17b, and the position detection units 901 are driven based on the posture of the imaging apparatus 1a. Therefore, the position of the imaging apparatus 1a can be detected in a highly sensitive state.

Further, according to the sixth embodiment of the present invention, the optical sight unit 400 can be used in a state where the display unit 921 is rotated approximately 180° in the horizontal direction. Therefore, it is possible to set sights on the desired object while viewing the luminous flux of the optical sight unit 400 and the live view image displayed by the display unit 921.

Seventh Embodiment

Next, a seventh embodiment of the present invention will be described. An imaging apparatus according to the seventh embodiment has a different configuration from the optical sight unit in the leg unit of the imaging apparatus according to the first embodiment. Therefore, hereinafter, an optical sight unit in a leg unit of an imaging apparatus according to the seventh embodiment of the seventh embodiment will be described. Note that the same configuration as the imaging apparatus 1 of the first embodiment is denoted with the same reference sign, and description is omitted.

Figure 26:
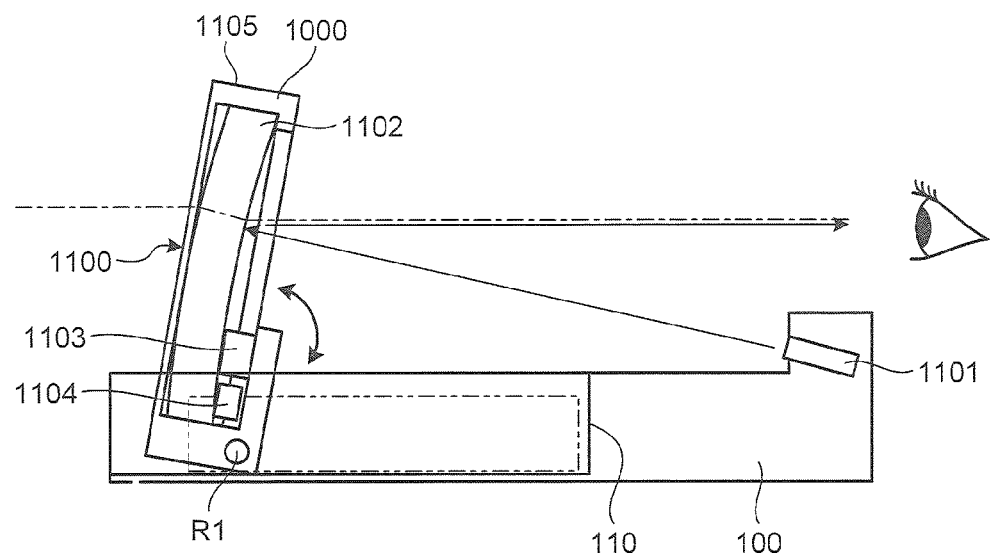
FIG. 26 is a partial cross section of when a leg unit of an imaging apparatus according to a seventh embodiment of the present invention pops up from a body unit.

FIG. 26 is a partial cross sectional view of when a leg unit of an imaging apparatus according to the seventh embodiment of the present invention pops up from a body unit.

As illustrated in FIG. 26, a lower end of a leg unit 1000 is connected to a first shaft R1 that passes through a top face of a body unit 100 in a right and left direction, and the leg unit 1000 is rotatably provided to the body unit 100 using the first shaft R1 as a rotational axis. Further, the leg unit 1000 includes an optical sight unit 1100 that emits luminous flux to be sighted on a specified object in an object area of the imaging apparatus 1.

The optical sight unit 1100 includes a light source unit 1101 that emits sighting light toward the object area of the imaging apparatus 1, a reflecting optical element 1102 that allows light from the object area of the imaging apparatus 1 to transmit, and reflects luminous flux emitted from the light source unit 1101 toward a back side opposite to the front of the imaging apparatus 1, a support part 1103 that supports the reflecting optical element 1102, a vibrator 1104 that adds vibrations to the reflecting optical element 1102, and a holding part 1105 that rotatably holds reflecting optical element 1102 to the body unit 100 through the a support part 1103.

The light source unit 1101 is configured from a red LED, an LED drive circuit, and the like, and emits luminous flux toward the reflecting optical element 1102.

The reflecting optical element 1102 is configured from a half mirror or a mirror in which a dielectric multilayer film is provided, which reflects light having a specific wavelength, that is, only red. The reflecting optical element 1102 reflects sighting light emitted by the light source unit 1101 toward the back side, and transmits the light from the visual field area of the imaging apparatus 1. The reflecting optical element 1102 has a paraboloid curving toward the back side when the leg unit 1000 pops up or a curved surface approximating thereto.

The support part 1103 has a rectangular shape, and supports the reflecting optical element 1102. The reflecting optical element 1102 is attached to the support part 1103 via an adhesive, or the like.

The vibrator 1104 is attached to the reflecting optical element 1102 via a silicon adhesive (for example, a gelatinous adhesive (hereinafter, referred to as "gel adhesive")), and adds vibrations to the reflecting optical element 1102. The vibrator 1104 is configured from a piezoelectric element, a driver, and the like. When the leg unit 1000 pops up (for example, immediately after the popping up or the sight is accommodated, or at the time of ON or OFF in a case of the imaging apparatus), the vibrator 1104 adds vibrations to the reflecting optical element 1102 to remove dust, dirt, and the like attached to the reflecting optical element 1102.

The holding part 1105 has an approximately c-shaped cross section. In the holding part 1105, the vibrator 1104 is attached in the vicinity of the first shaft R1 by the gel adhesive, and the reflecting optical element 1102 is attached to the other end side opposite to the first shaft R1. Further, the support part 1103 is attached to the holding part 1105 via an adhesive. The gel adhesive is applied to the whole are facing the reflecting optical element 1102, or at even intervals, for example, four places or six places.

According to the above-described seventh embodiment of the present invention, the vibrator 1104 vibrates the reflecting optical element 1102 every time the leg unit 1000 pops up. Therefore, dust and dirt or the like attached to the reflecting optical element 1102 can be removed.

Eighth Embodiment

Next, an eighth embodiment of the present invention will be described. An imaging apparatus according to the eighth embodiment has a different configuration from the optical sight unit in the leg unit of the imaging apparatus according to the first embodiment. Therefore, hereinafter, a configuration of an optical sight unit in a leg unit of an imaging apparatus according to the eighth embodiment will be described. Note that the same configuration as the imaging apparatus 1 of the first embodiment is denoted with the same reference sign, and description is omitted.

Figure 27:
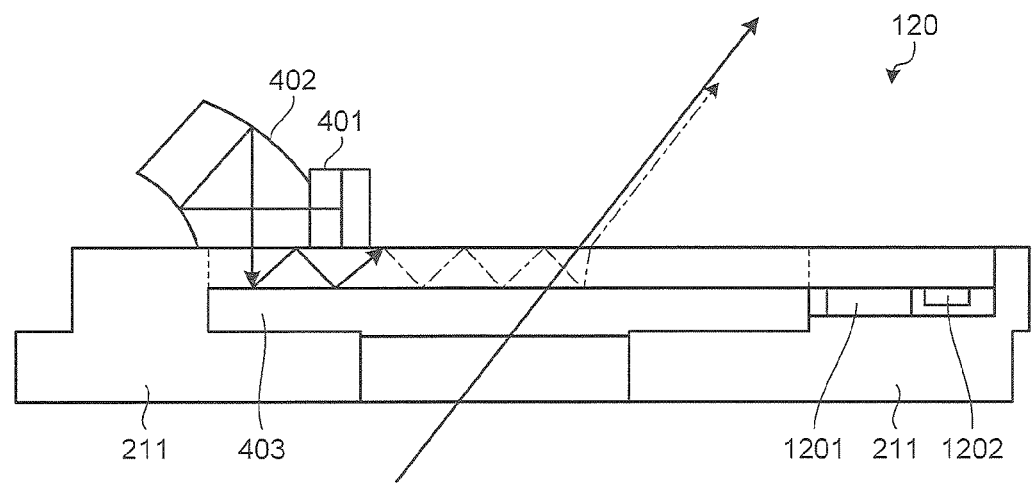
FIG. 27 is a partial cross sectional view of an optical sight unit according to an eighth embodiment of the present invention.

FIG. 27 is a partial cross sectional view of an optical sight unit according to the eighth embodiment of the present invention. An optical sight unit 1200 illustrated in FIG. 27 produces a virtual image of luminous flux in an object area of an imaging apparatus 1 or in the vicinity of the object area.

The optical sight unit 1200 includes a light source unit 401, a free curved surface prism 402, a light guiding unit 403, a rectangular support member 1201 that supports the light guiding unit 403, and a vibrator 1202 that adds vibrations to the light guiding unit 403. The light guiding unit 403 is fixed to a transparent substrate support unit 211 via a gel adhesive.

The vibrator 1202 is attached to the light guiding unit 403 via a gel adhesive, and adds vibration to the light guiding unit 403. The vibrator 1202 is configured from a piezoelectric element, a driver, and the like. The vibrator 1202 adds vibration to the light guiding unit 403 every time a leg unit 17 pops up to remove dust and dirt or the like attached to the light guiding unit 403.

As described above, according to the eighth embodiment of the present invention, the vibrator 1202 vibrates the light guiding unit 403 every time the leg unit 17 pops up, and thus dust and dirt or the like attached to the light guiding unit 403 can be removed.

Ninth Embodiment

Next, a ninth embodiment of the present invention will be described. While, in the above-described embodiments, the imaging apparatus includes the optical sight unit, in the ninth embodiment, a telescope (for example, a binocular type or a monocle) includes an optical sight unit. Therefore, hereinafter, a configuration of a pair of binoculars will be described. Note that the same configuration as the imaging apparatus 1 of the first embodiment is denoted with the same reference sign, and description is omitted.

Figure 28:
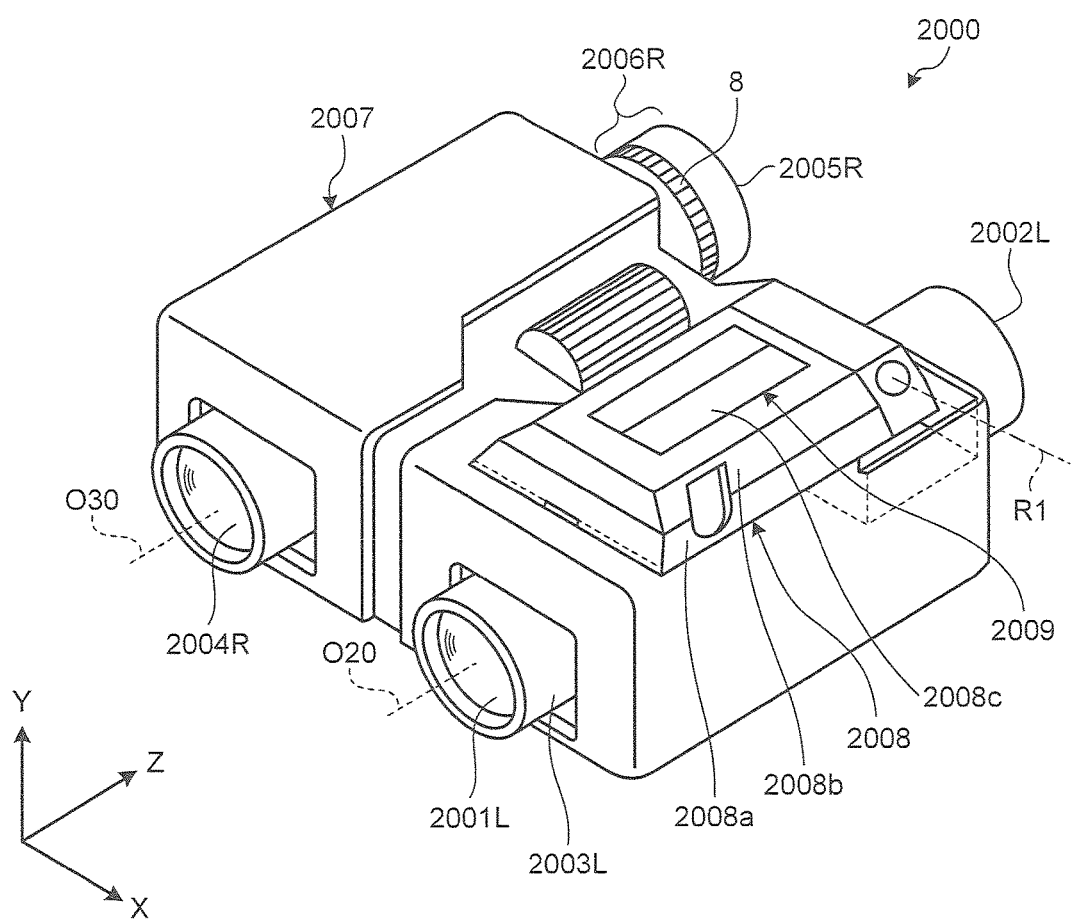
FIG. 28 is a perspective view illustrating an appearance of a telescope according to ninth embodiment of the present invention.
Figure 29:
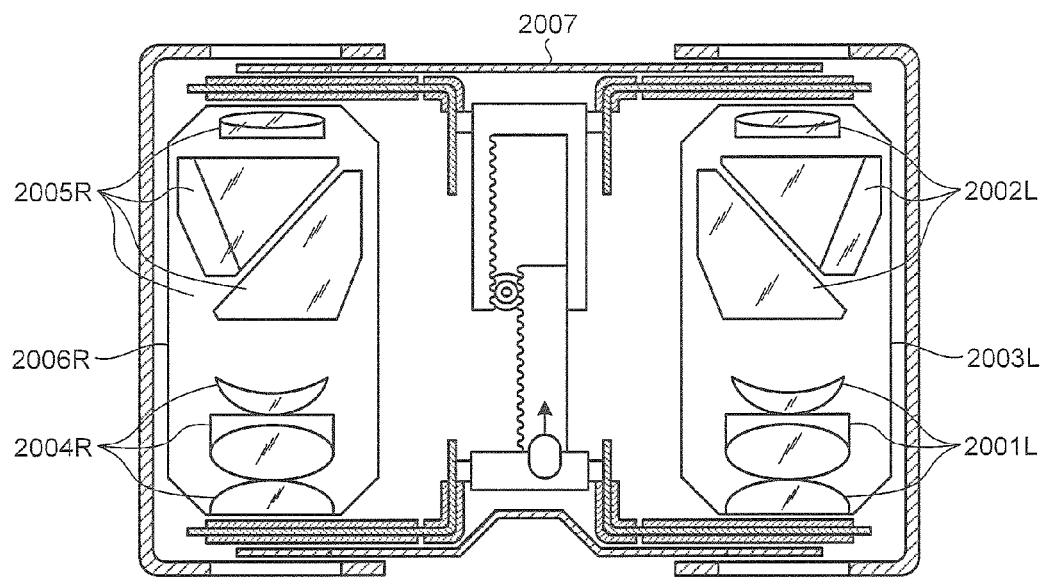
FIG. 29 is a cross sectional view of an internal configuration of the telescope according to the ninth embodiment of the present invention, which is cut off at an upper surface of a body.
Figure 30:
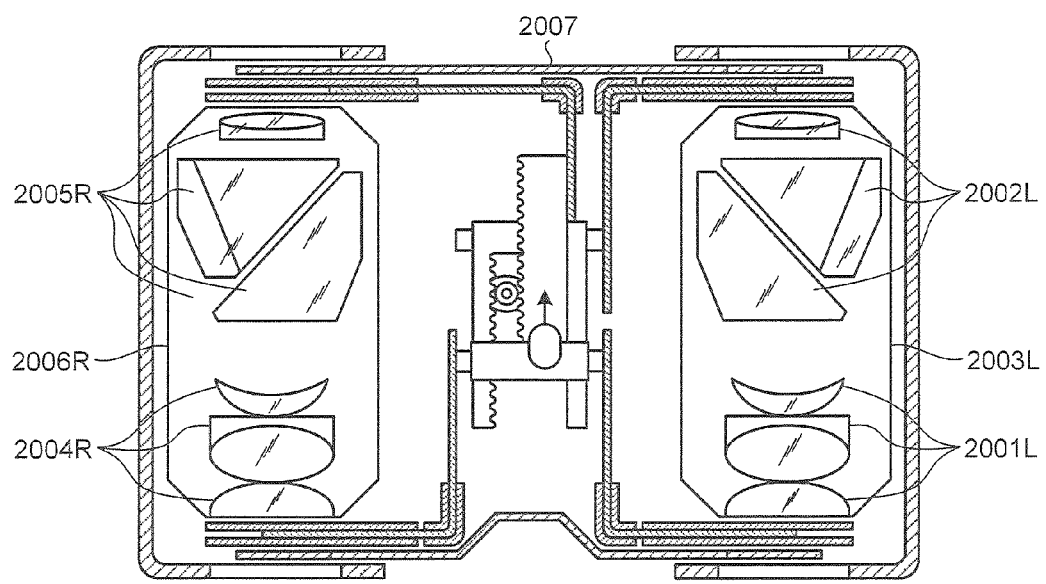
FIG. 30 is a cross sectional view of an internal configuration of the telescope according to the ninth embodiment of the present invention, which is cut off at an upper surface of a body.

FIG. 28 is a perspective view illustrating an appearance of a telescope according to the ninth embodiment of the present invention. FIG. 29 is a cross sectional view of an internal configuration of the telescope according to the ninth embodiment of the present invention, where a top face of the body of the telescope is cut off, and is a cross sectional view of the telescope in a state where the telescope is protected by a lens barrier and cannot be used. FIG. 30 is a cross sectional view of an internal configuration of the telescope according to the ninth embodiment of the present invention, where a top face of the body of the telescope is cut off, and is a cross sectional view of the telescope in a state where the lens barrier is opened, and the telescope can be used.

The telescope illustrated in FIG. 28 and a telescope 2000 illustrated in FIGS. 29 and 30 include a first lens-barrel 2003 configured from a left side eyepiece lens system 2001L and objective lens 2002L having the same first optical axis O20, a second lens-barrel 2006R configured from a right side eyepiece lens system 2004R and an objective lens 2005R having a second optical axis O30 parallel with the first optical axis O20, a body unit 2007 that accommodates a first lens-barrel 2003L and the second lens-barrel 2006R therein, a leg unit 2008 provided at a top face of the body unit 2007, pivotally supported to the body unit 2007 rotatably using a first shaft R1 as a rotational axis, and movable in a direction away from the body unit 2007 and in a direction perpendicular to the first optical axis O20 and the second optical axis O30, and an optical sight unit 2009 provided inside the leg unit 2008, and produces a virtual image of luminous flux in an object area of the telescope 2000 or in the vicinity of the object area.

The leg unit 2008 includes a leg lower unit 2008a provided in the body unit 2007, and a tray-shaped leg upper unit 2008b rotatable using the first shaft R1 provided in the leg lower unit 2008a as a rotational axis, and holding the optical sight unit 2009 therein. The leg unit 2008 pops up in a direction that the leg upper unit 2008b is away from the body unit 2007 when a pop-up mechanism (not illustrated) is operated. Further, the leg upper unit 2008b includes a cover member 2008c provided at a position intersecting with a line that passes through the optical sight unit 2009, protects the optical sight unit 2009, and opens and closes at the time of popping up of the leg upper unit 2008b.

The optical sight unit 2009 is configured from a light source unit that emits sighting light toward an object area of the telescope 2000, a reflection optical element that transmits the light from the object area of the telescope 2000, and reflects luminous light emitted by the light source unit toward the back side opposite to the front of the telescope 2000, and the like. Note that, as the optical sight unit 2009, any of the optical sight units described in the first to seventh embodiments is used. Especially, when the cover member 2008c is used, dust and dirt are easily attached to the reflecting optical element illustrated in FIG. 26, and thus, it is more preferable to have a vibrator configured from a piezoelectric element and a driver built in. Further, it is preferable to avoid dust, dirt, and the like to be accumulated in a dent made by the fingers of the user when the leg upper unit 2008b pops up, a portion where the contact between the rotational axis R1 and the body unit 2007 due to the revolution is prevented. Further, when the user uses the telescope, one eye can look through the eyepiece in the lens-barrel, and the other eye can see the sight. Therefore, convenience is enhanced. Further, when a synthetic resin material is used for the openable/closable leg unit and the body unit (telescope), elastic action works on the abutting portion provided in the body unit (not illustrated) where the leg unit abuts on, and thus reduction of sound become possible. Further, the body unit is configured from a detection switch for detecting open/close of the leg unit, a spring seat that supports an elastic spring, and a support portion that supports the rotational axis (not illustrated). In order to make the projection area as viewed from the top around the rotational axis smaller, a lock mechanism to lock the leg unit using a revolutional displacement detection sensor, a magnet, and an elastic member for the rotational axis may be integrally provided. Further, it is preferable to provide a separation line position between the leg unit and the body unit (a line parallel with the rotational axis as viewed from the top, and a line of the gap, through which the body unit and the leg unit can be seen separate when the leg unit is closed to the body unit) anterior to the position of the rotational axis (for example, a hinge structure as illustrated in FIG. 19 of the present application). With such a structure, dust and dirt are not accumulated in a gap around the rotational axis provided in the body unit.

The telescope 2000 illustrated in FIGS. 29 and 30 have a structure to protect the lenses from dust and scratches, in which lens barriers are advanced to the protection positions of a pair of eyepiece lens systems 2001L and 2004R, and a pair of objective lens systems 2002L and 2005R by an operation of a barrier operation knob. A movable plate on which a pair of rack members (not illustrated) is attached is arranged. Immediately under the movable plate, a battery chamber is provided in a gap positioned along the first lens-barrel 2003L and the second lens-barrel 2006R (not illustrated). The battery chamber is arranged between the first lens-barrel 2003L and the second lens-barrel 2006R as viewed from the top. A battery cover openable/closable to be attached/detached to/from the eyepiece lens side, a power source switch button, an emitting operation of the LED light source of the sight, a dustproof operation of the reflecting optical element are displayed. The circuit board id arranged to position in a space between the battery chamber and the movable plate. When the battery chamber is joined or close to the circuit board, the assembly can be simplified.

Further, in another embodiment, a circuit board is arranged in a direction perpendicular to the insertion direction of the battery. The circuit board is a single rectangular board that has a pair of opening parts open to the pair of eyepiece lenses side, and has a connection area where the pair of opening parts is connected. A piezoelectric element driver that has joined the reflecting optical element, and a control circuit (CPU) are arranged on the circuit board. Similarly, effective use of the gap is enhanced, and the entire device becomes smaller.

According to the above-described ninth embodiment of the present invention, framing can be performed with respect to a desired object even at telephoto capturing or super telephoto capturing.

Tenth Embodiment

Next, a tenth embodiment of the present invention will be described. An imaging apparatus according to the tenth embodiment has different processing executed by the imaging apparatus, in addition to a different configuration from the imaging apparatus 1 according to the first embodiment. Therefore, hereinafter, after description of a configuration of the imaging apparatus according to the tenth embodiment, processing executed by the imaging apparatus according to the tenth embodiment will be described. Note that the same configuration as the above embodiments is denoted with the same reference sign, and description is omitted.

Figure 31:
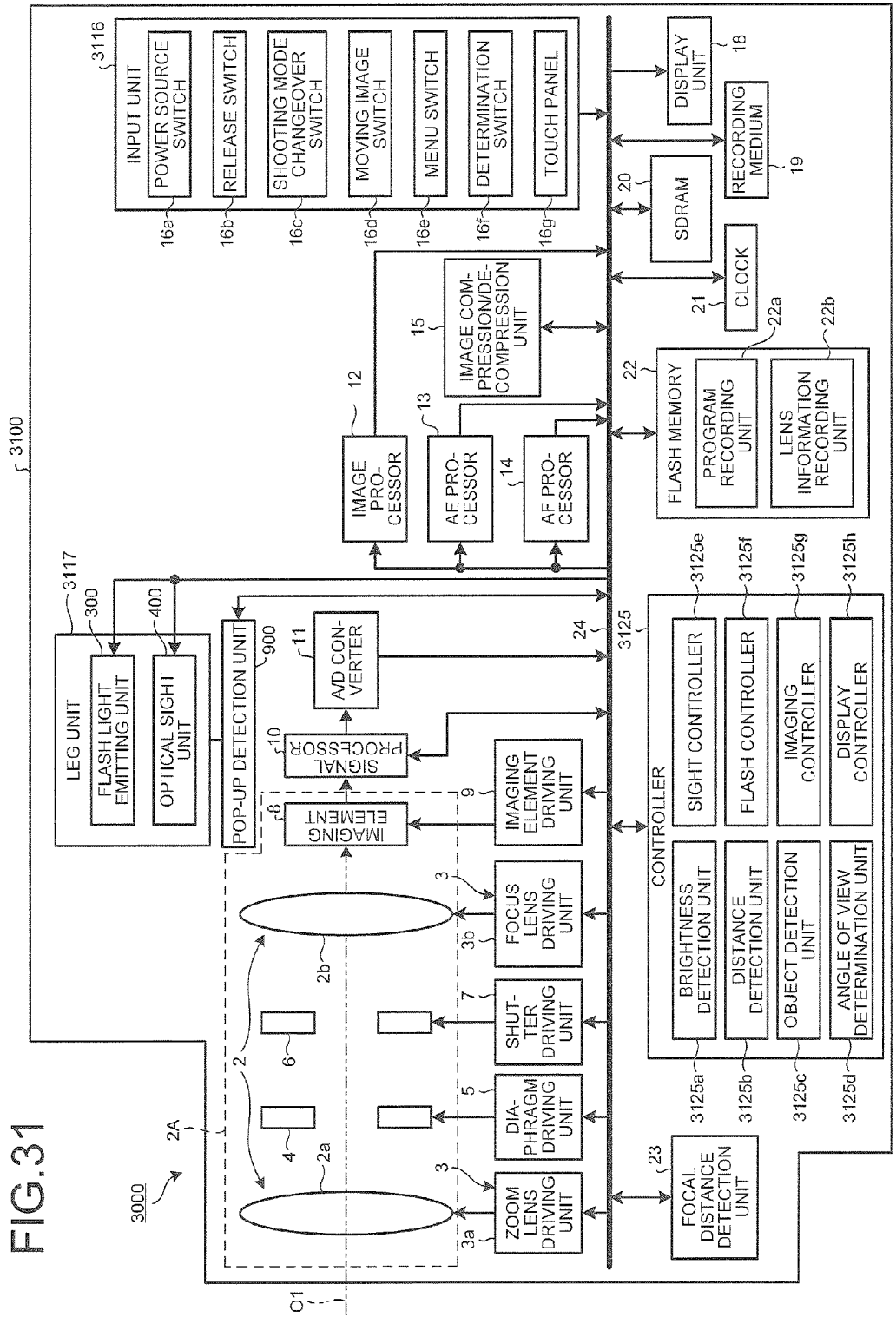
FIG. 31 is a block diagram illustrating a function configuration of an imaging apparatus according to a tenth embodiment of the present invention.

FIG. 31 is a block diagram illustrating a function configuration of an imaging apparatus according to the present embodiment. An imaging apparatus 3000 illustrated in FIG. 31 includes a body unit 3100 that generates image data by receiving light collected from a specified visual field area through an imaging optical system 2 provided at a front side facing an object and performing photoelectric conversion.

The body unit 3100 includes the imaging optical system 2, a lens driving unit 3, a diaphragm 4, a diaphragm driving unit 5, a shutter 6, a shutter driving unit 7, an imaging element 8, an imaging element driving unit 9, a signal processor 10, an A/D converter 11, an image processor 12, an AE processor 13, an AF processor 14, an image compression/decompression unit 15, an input unit 3116, a leg unit 3117, a display unit 18, a recording medium 19, an SDRAM 20, a clock 21, a flash memory 22, a focal distance detection unit 23, a bus 24, a pop-up detection unit 900, and a controller 3125.

The leg unit 3117 includes a flash light emitting unit 300 and an optical sight unit 400. Note that a detailed configuration of the leg unit 3117 is similar to those of FIGS. 12 to 16 above, and thus description is omitted.

The input unit 3116 includes a power source switch 16a, a release switch 16b, a shooting mode changeover switch 16c, a moving image switch 16d, a menu switch 16e, a determination switch 16f, and a touch panel 16g that is superimposed on a display screen of the display unit 18, and receives an input of a position signal from an outside according to a contact position.

The controller 3125 is configured from a CPU, and controls an operation of the imaging apparatus 3000 by transmitting various data and instruction signals to respective units that configure the imaging apparatus 3000 in response to an instruction signal transmitted from the input unit 3116 through the bus 24.

Here, a detailed configuration of the controller 3125 will be described. The controller 3125 includes a brightness detection unit 3125a, a distance detection unit 3125b, an object detection unit 3125c, an angle of view determination unit 3125*d*, a sight controller 3125*e*, a flash controller 3125*f*, an imaging controller 3125*g*, and a display controller 3125*h*.

The brightness detection unit 3125*a* detects brightness of the visual field area based on image data generated by the imaging element 8. To be specific, the brightness detection unit 3125*a* detects brightness of the visual field area or brightness of focus area of the imaging optical system 2 based on luminous components included in the image data generated by the imaging element 8.

The distance detection unit 3125*b* detects a distance from the imaging apparatus 3000 to an object based on the image data generated by the imaging element 8.

The object detection unit 3125*c* detects the object in an image corresponding to the image data generated by the imaging element 8. To be specific, the object detection unit 3125*c* detects a characteristic point in a detection range in which the object is detected in an image displayed by the display unit 18 through the touch panel 16*g*, and detects an area (outline) including the characteristic point as a main object. Here, the characteristic point includes a luminance, a contrast, and a color histogram. Note that the object detection unit 3125*c* may detect the object in the detection area in the image based on focus area information of the imaging optical system 2. Further, the object detection unit 3125*c* may detect the object based on brightness information of the object detected by the brightness detection unit 3125*a* or a distance to the object detected by the distance detection unit 3125*b*. Further, the object detection unit 3125*c* may detect a human (including a baby), an animal, for example, a bird, a cat, or a dog, a rolling ball, a running bicycle, or soup bubbles in the sky as an object using a well-known technology such as pattern matching.

The angle of view determination unit 3125*d* determines whether the object detected by the object detection unit 3125*c* is in the angle of view of the imaging optical system 2. To be specific, the angle of view determination unit 3125*d* determines whether the object is in the angle of view of the current imaging optical system 2 by determining whether continuity of the color or the contrast of the object is interrupted around the image, and whether a blank portion is included in a peripheral portion of the image. For example, when the contrast of the object continues to a periphery of the image, the angle of view determination unit 3125*d* determines that the object goes out of the angle of view of the current imaging optical system 2 (outside the angle of view).

The sight controller 3125*e* emits luminous flux to the optical sight unit 400 according to a focal distance of the imaging optical system 2 detected by the focal distance detection unit 23. To be specific, when detecting that the focal distance of the imaging optical system 2 detected by the focal distance detection unit 23 is telephoto, for example, 100 mm or more (35 mm equivalent), the sight controller 3125*e* emits the luminous flux to the optical sight unit 400. Further, when the angle of view determination unit 3125*d* determines that the object detected by the object detection unit 3125*c* is not in the angle of view of the imaging optical system 2, the sight controller 3125*e* controls driving of the optical sight unit 400, and gives warning notifying that the object goes out of the angle of view of the imaging optical system 2 by blinking the luminous flux emitted by the optical sight unit 400.

The flash controller 3125*f* causes the flash light emitting unit 300 to irradiate the visual field area of the imaging apparatus 3000 with illumination light. When the leg unit 3117 pops up from the body unit 3100, the flash controller 3125*f* causes the flash light emitting unit 300 to irradiate the visual field area with illumination light based on the brightness detected by the brightness detection unit 3125*a*.

When a second release signal is input through the release switch 16*b*, the imaging controller 3125*g* performs control of starting an operation of capturing a still image in the imaging apparatus 3000. Here, the capturing operation in the imaging apparatus 3000 means an operation in which the signal processor 10, the A/D converter 11, and the image processor 12 perform specified processing on the image data output by the imaging element 8, by driving of the shutter driving unit 7 and the imaging element driving unit 9. The image data to which the processing is applied is compressed in the image compression/decompression unit 15 according to a specified format under control of the imaging controller 3125*g*, and is recorded in the recording medium 19 through the bus 24 and a memory I/F (not illustrated). Further, when a release signal of capturing a moving image is input through the moving image switch 16*d*, the imaging controller 3125*g* performs control of starting an operation of capturing a moving image in the imaging apparatus 3000.

The display controller 3125*h* controls a display mode of the display unit 18. To be specific, when the optical sight unit 400 is emitting the luminous flux, where the imaging apparatus 3000 is capturing an image, the display controller 3125*h* superimposes an icon on the live view image displayed by the display unit 18, indicating the optical sight unit 400 is being driven, and causes the display unit 18 to display the icon.

In the imaging apparatus 3000 having the above configuration, when the light source unit 821 is driven in a state where the leg unit 3117 pops up from the body unit 3100, the luminous flux (sight point) is projected to the reflecting optical element 822. To be specific, the reflecting optical element 822 produces a virtual image of the luminous flux emitted by the light source unit 821 in the visual field area or in the vicinity of the visual field area. In this case, the luminous flux is projected to the reflecting optical element 822 at almost infinity (see the collimated light of FIG. 13). Therefore, if the imaging apparatus 3000 is not moved with respect to the object, the photographer does not stray off the luminous flux even if shifting the position of the eyes. Therefore, the photographer can frame the object to an approximate center in the visual field area (in the image) by adjusting the luminous flux to a desired object. Further, the photographer can easily capture the object in the visual field area (in the image) of the imaging apparatus 3000 by continuously adjusting the luminous flux to the object even if the desired object is a moving object.

Figure 32:
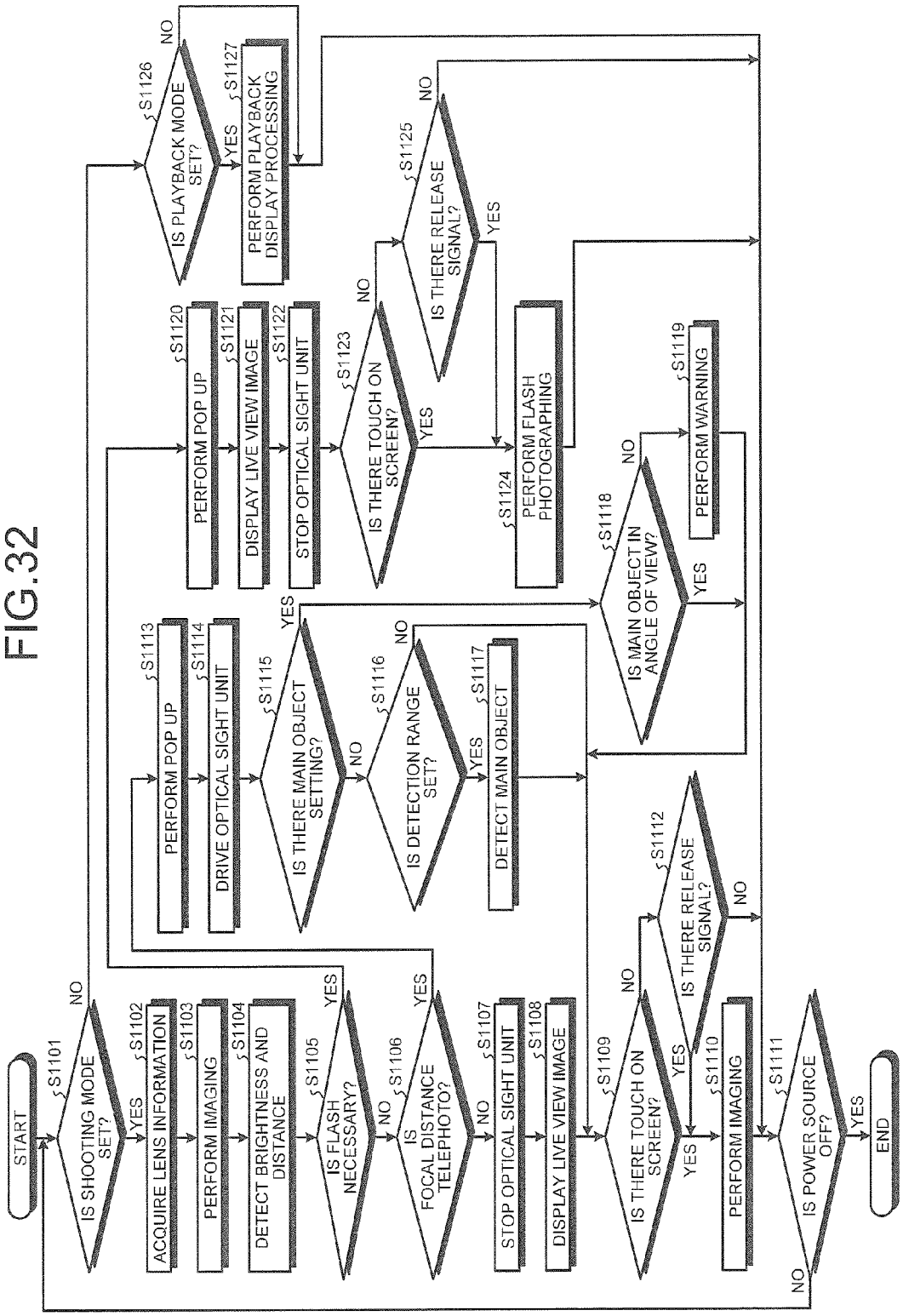
FIG. 32 is a flowchart illustrating an outline of processing executed by the imaging apparatus according to the tenth embodiment of the present invention.

Next, processing executed by the above-described imaging apparatus 3000 will be described. FIG. 32 is a flowchart illustrating an outline of the processing executed by the imaging apparatus 3000.

As illustrated in FIG. 32, when the imaging apparatus 3000 is set to a shooting mode (step S1101: Yes), the controller 3125 acquires the lens information of the imaging optical system 2 through the bus 24 (step S1102). To be specific, the controller 3125 detects a current focal distance of the zoom optical system 2*a* detected by the focal distance detection unit 23 through the bus 24. At this time, the controller 3125 may acquire a diaphragm value of the diaphragm 4.

Next, the imaging controller 3125*g* causes the imaging element 8 to perform imaging by driving the imaging element driving unit 9 (step S1103).

Following that, the imaging apparatus 3000 detects the brightness of the visual field area/a distance to the object based on an image corresponding to the image data generated by the imaging element 8 (step S1104). To be specific, the brightness detection unit 3125a detects the brightness of the visual field area based on the image corresponding to the image data generated by the imaging element 8. Further, the distance detection unit 3125b detects the distance to the object based on the image corresponding to the image data generated by the imaging element 8.

Next, the flash controller 3125f determines whether a flash by the flash light emitting unit 300 is necessary for the visual field area (step S1105). To be specific, when the brightness of the visual field area detected by the brightness detection unit 3125a is less than a specified brightness, the flash controller 3125f determines that the flash by the flash light emitting unit 300 is necessary. When the flash controller 3125f determines that the flash by the flash light emitting unit 300 is necessary for the visual field area (step S1105: Yes), the imaging apparatus 3000 proceeds to step S1120 described below. In contrast, when the flash controller 3125f determines that the flash by the flash light emitting unit 300 is not necessary for the visual field area (step S1105: No), the imaging apparatus 3000 proceeds to step S1106 described below.

In step S1106, the controller 3125 determines whether the focal distance of the imaging optical system 2 is telephoto. To be specific, the controller 3125 determines whether the imaging optical system 2 is telephoto based on the current focal distance of the zoom optical system 2a detected by the focal distance detection unit 23. For example, when the focal distance detection unit 23 detects that the current focal distance of the imaging optical system 2 is 100 mm or more (35 mm equivalent), the controller 3125 determines that the imaging optical system 2 is telephoto. When the controller 3125 determines that the focal distance of the imaging optical system 2 is telephoto (step S1106: Yes), the imaging apparatus 3000 proceeds to step S1113 described below. In contrast, when the controller 3125 determines that the focal distance of the imaging optical system 2 is not telephoto (step S1106: No), the imaging apparatus 3000 proceeds to step S1107 described below.

In step S1107, the sight controller 3125e stops the optical sight unit 400. Accordingly, when the imaging optical system 2 of the imaging apparatus 3000 performs imaging at a standard (for example, 24 mm to 70 mm) and a wide angle (12 mm to 24 mm) focal distance, the power consumption can be suppressed. Note that the sight controller 3125e may stop the driving of the optical sight unit 400 according to the focal distance in which the optical sight unit 400 is driven, which is set to the imaging apparatus 3000 by an operation of the menu switch 16e.

Next, the display controller 3125h causes the display unit 18 to display a live view image corresponding to the image data generated by the imaging element 8 (step S1108).

Following that, when the screen of the display unit 18 is touched through the touch panel 16g (step S1109: Yes), the imaging controller 3125g causes the imaging element 8 to capture a still image (step S1110).

Next, when the power source switch 16a is operated, and the power source of the imaging apparatus 3000 is turned OFF (step S1111: Yes), the imaging apparatus 3000 terminates the present processing. In contrast, when the power source switch 16a is not operated, and the power source of the imaging apparatus 3000 is not turned OFF (step S1111: No), the imaging apparatus 3000 returns to step S1101.

In step S1109, when the screen of the display unit 18 is not touched through the touch panel 16g (step S1109: No), when the release signal is input from the release switch 16b (step S1112: Yes), the imaging apparatus 3000 proceeds to step S1110.

In step S1109, when the screen of the display unit 18 is not touched through the touch panel 16g (step S1109: No), when the release signal is not input from the release switch 16b (step S1112: No), the imaging apparatus 3000 proceeds to step S1111.

In step S1113, the controller 3125 causes the leg unit 3117 to pop up from the body unit 3100.

Next, the sight controller 3125e drives the optical sight unit 400 (step S1114). Accordingly, the photographer can easily adjust framing of the image to the object even if the imaging optical system 2 of the imaging apparatus 3000 is telephoto or super telephoto by adjusting the virtual image of the sighting light emitted from the optical sight unit 400 to the desired object in the visually recognizable virtual field area of the imaging apparatus 3000 through the opening part 824 and the reflecting optical element 822. In this case, when the leg unit 3117 does not pop up from the body unit 3100, the display controller 3125h may superimpose an icon indicating the leg unit 3117 is to pop up on the live view image and cause the display unit 18 to display the icon.

Figure 38:
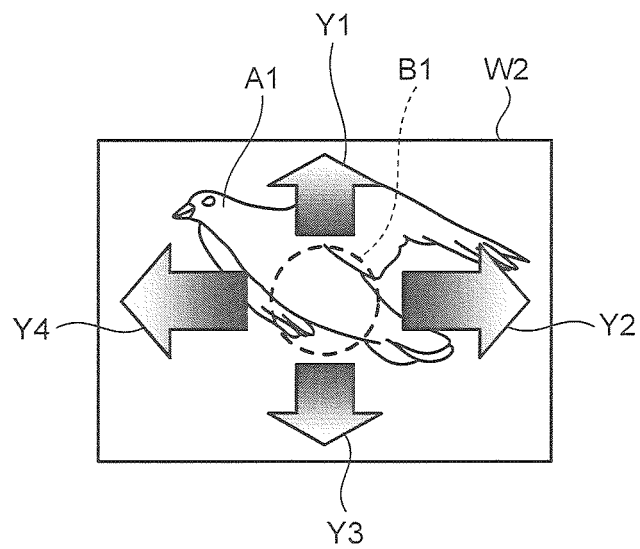
FIG. 38 is a diagram schematically illustrating a method of determining whether an object by an angle of view determination unit of the imaging apparatus according to the tenth embodiment of the present invention falls within the angle of view of the imaging optical system.

Following that, when a main object is set in the live view image displayed by the display unit 18 (step S1115: Yes), the imaging apparatus 3000 proceeds to step S1118 described below. In contrast, when the main object is not set in the live view image displayed by the display unit 18 (step S1115: No), the imaging apparatus 3000 proceeds to step S1116 described below. Note that, as the setting of the main object, a simple method may be employed such that, in a case of a flying bird, as illustrated in FIG. 38 below, the background is the sky, and a portion having a contrast with respect to a portion having no contrast, or a specific color with respect to the background having a specific color may be set as the main object. In this case, a portion having a specific contrast or color with respect to the background having no contrast is set as the main object. Of course, a shape pattern of a feather or a neck specific to the bird is detected, the pattern may be used as the main object. Further, a thing similar to an image dictionary may be set as the main object by a method of selecting one from images in an image database registered in advance. Further, a method of capturing an image of the bird while the bird perches on a branch or a roof, and storing the shapes and the colors of objects in the captured image so as to follow the objects. In any case, a characteristic of an image is compared with a specific pattern or color, and when there is a pattern or color that matches the characteristic of the image, the pattern or color may just be set as the main object. A changeover system may be employed, in which when the imaging apparatus faces upward, automatic setting based on the sky is performed, or when the imaging apparatus faces sideways, an image selected from a dictionary is set as a main object candidate. When an imaging unit capable of determining distance distribution is included, an object in a finite distance may be set as the main object (the sky is infinite). These patterns, colors, and distances may be considered as characteristics of an obtained image portion.

Figure 33:
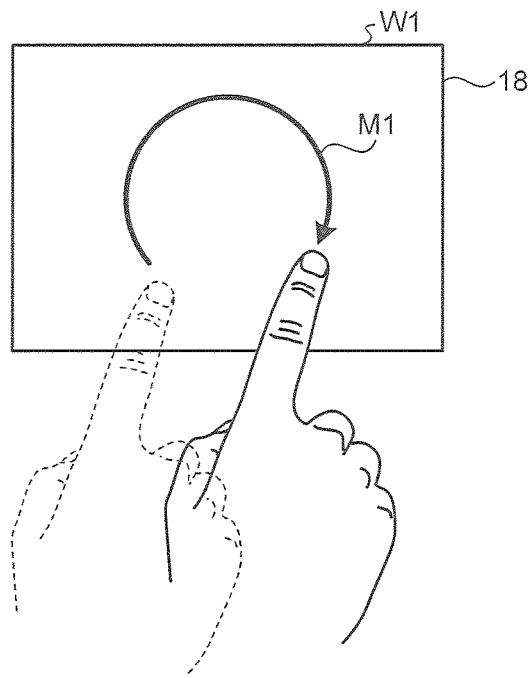
FIG. 33 is a diagram schematically illustrating a method of setting a detection area detected by an object detection unit of the imaging apparatus according to the tenth embodiment of the present invention.

In step S1116, the controller 3125 determines whether a detection range in which the main object is detected is set in the live view image displayed by the display unit 18 through the touch panel 16g. To be specific, as illustrated in FIG. 33, the controller 3125 determines whether a detection range M1 in which the main object is detected is set in a live view image W1 displayed by the display unit 18, in response to a locus of position signals continuously input from the touch panel 16g. When the controller 3125 determines that the detection range in which an object is detected is set to in the live view image displayed by the display unit 18 through the touch panel 16g (step S1116: Yes), the imaging apparatus 3000 proceeds to step S1117 described below. In contrast, when the controller 3125 determines that the detection range in which the main object is detected is not set in the live view image displayed by the display unit 18 through the touch panel 16g (step S1116: No), the imaging apparatus 3000 proceeds to step S1109.

In step S1117, the object detection unit 3125c detects the main object within the detection range of the live view image set through the touch panel 16g. To be specific, the object detection unit 3125c detects a characteristic point in a detection area of the live view image, and detects an area including the characteristic point as the main object. After step S1117, the imaging apparatus 3000 proceeds to step S1109. Note that the object detection unit 3125c detects whether an image portion similar to a specific image characteristic is located within a detection image range (a specific position in the screen) corresponding to the detection range, and when there is the image portion, the object detection unit 3125c considers the image portion as the main object and tracks the image portion. The object detection unit 3125c starts determination of whether the image portion is located in the screen, coordinates in the screen, and the like. Determination of whether the image portion fully falls within the detection range may be performed, or when only a specific pattern is not detected, determination of similarity to a target pattern may be performed. That is, perfect matching is one, completely not matching is zero, and in-between cases may be determined by analogue values.

Figure 34:
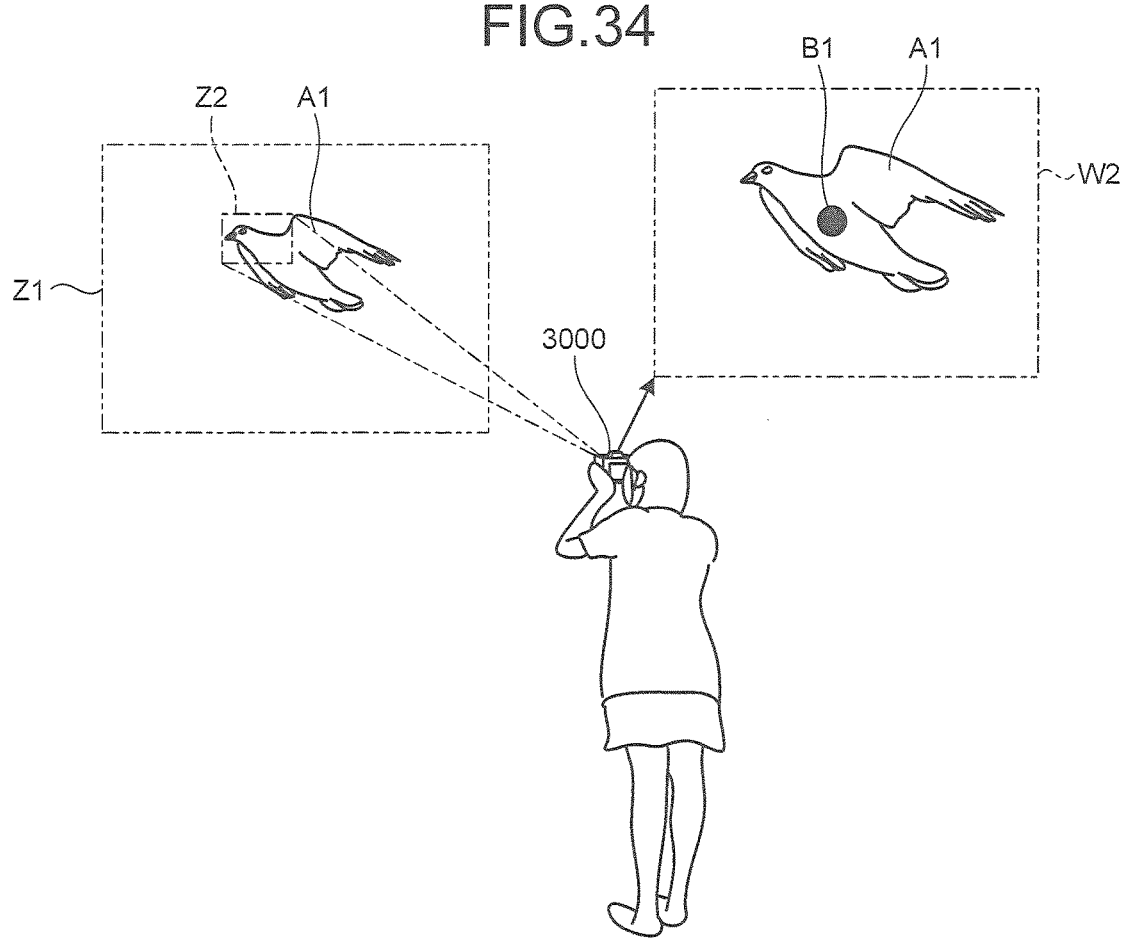
FIG. 34 is a diagram illustrating a state when the photographer captures an object using an optical sight unit of the imaging apparatus according to the tenth embodiment of the present invention.
Figure 35:
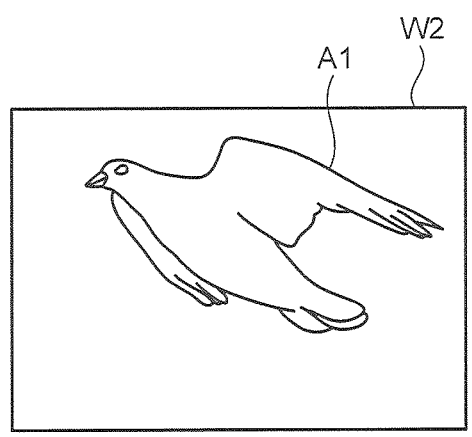
FIG. 35 is a diagram illustrating an example of an image imagined by the photographer under the state illustrated in FIG. 34.
Figure 36:
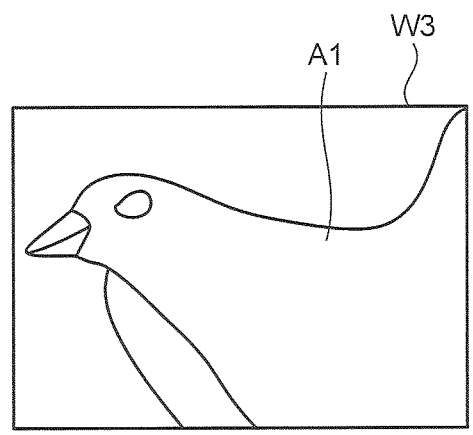
FIG. 36 is a diagram illustrating an example of an image imaged by the imaging apparatus under the state illustrated in FIG. 34.
Figure 37:
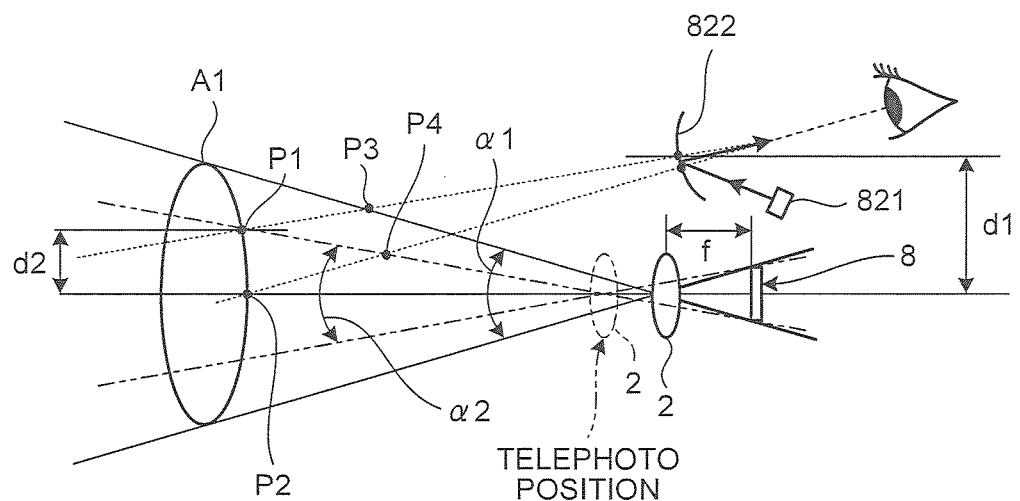
FIG. 37 is a diagram schematically illustrating a relationship between a distance from an object to the imaging optical system and an angle of view of the imaging optical system.

FIG. 34 is a diagram illustrating a state when the photographer images an object using the optical sight unit 400 of the imaging apparatus 3000. FIG. 35 illustrates an example of an image imagined by the photographer under the state illustrated in FIG. 34. FIG. 36 is a diagram illustrating an image imaged by the imaging apparatus 3000 under the state illustrated in FIG. 34. FIG. 37 is a diagram schematically illustrating a relationship between a distance from an object A1 to the imaging optical system 2 and an angle of view of the imaging optical system 2. Note that, in FIG. 34, the maximum angle of view Z1 of the imaging optical system 2 is indicated by the two-dot chain line, and a current angle of view Z2 of the imaging optical system 2 is indicated by the dashed line.

As illustrated in FIG. 34, the photographer can easily adjust framing to the object A1 by adjusting the luminous flux B1 emitted by the optical sight unit 400 to the object A1 even if the imaging optical system 2 is telephoto (see the image W2 of FIG. 34). When the photographer capture an image using the imaging apparatus 3000 under this state, there is a case in which an image W3 in which a part of the object A1 illustrated in FIG. 36 goes out of the angle of view of the imaging optical system 2 may sometimes be captured even if the photographer expects to capture the image W2 in which the object A1 appears in the center, like FIG. 35. To be specific, as illustrated in FIG. 37, a parallax is caused between the optical axis O2 of the optical sight unit 400 and the optical axis O1 of the imaging optical system 2 because of the distance from the object A2 to the imaging optical system 2 and the angle of view of the imaging optical system 2. Therefore, even if the photographer adjusts the luminous flux B1 (sighting light) of the optical sight unit 400 to the object A2, the image imaged by the imaging apparatus 3000 does not have desired framing, and the object A2 may sometimes go out of the angle of view of the imaging optical system 2.

Here, the parallax is a distance d between the center of the imaging optical system 2 and the center of the optical sight unit 400 (reflection spherical surface mirror). The visual line (eye), the point P2 that transmits the reflection spherical surface mirror and is viewed as if irradiating the object, and the red light irradiated from the light source unit 821 of the LED are reflected on the spherical surface mirror of the reflecting optical element 822, and collimated light beam can be observed by the eye. The extended line (dashed line) of the optical beam can be seen as if irradiating the object. When the focal distance of the imaging optical system 2 is f, the distance between the imaging optical system 2 and the imaging element 8 is f. The angle of view of the imaging optical system 2 at this time is an angle of view a1. When the imaging optical system 2 is moved toward the telephoto side and stopped at the telephoto position, the angle of view of the imaging optical system 2 of this time is an angle of view α2. At this time, in reality, the light source unit 821 (LED) has a tilt and shift mechanism with respect to the optical axis, the position of the light beam can be moved from the point P2 to the point P1 or from the point P1 to the point P2. The point P1 is the center of the object and an intersection point intersecting with the optical axis of the imaging optical system. The point P3 is an intersection point of a line connecting the point P1 and the visual line position, and the angle of view α1. Further, the point P4 is an intersection point of a line connecting the center of the object and the visual line position, and the angle of view α2. Here, the invention is about "making warning when an object is framed out", and thus no further description will be given, which will complicate explanation. As described above, in the points P1 and P4, there is no problem in the case of the angle of view α1, while in the case of the angle of view α2, the LED irradiation position goes outside the angle of view α2, and thus the object deviates from the imaging element 8 and frame out is caused.

Referring back to FIG. 32, description of step S1118 and subsequent steps is continued.

In step S1118, the angle of view determination unit 3125d determines whether the main object detected by the object detection unit 3125c is in the angle of view of the imaging optical system 2.

FIG. 38 is a diagram schematically illustrating a method of determining whether an object A1 by the angle of view determination unit 3125d is in the angle of view of the imaging optical system 2.

As illustrated in FIG. 38, the angle of view determination unit 3125d determines whether the object A1 detected by the object detection unit 3125c is in the angle of view of the current imaging optical system 2. To be specific, the angle of view determination unit 3125d determines whether an amount of change of contrast from a center of the object A1 (for example, B1) to a periphery of the image falls within a specified range. For example, as illustrated in FIG. 38, the angle of view determination unit 3125d determines whether the amount of change of contrast of the object A1 toward the periphery of an image W2 (arrows Y1 to Y4) falls within a specified range. Note that, in FIG. 38, the angle of view determination unit 3125d scans the amount of change of contrast of the object A1 in the horizontal direction and in the vertical direction. However, for example, the amount of change of contrast of the object A1 may be scanned in an oblique direction or in each specified angle (for example, five degrees) from the center of the object A1. Note that the angle of view determination unit 3125*d* may determine whether the object A1 is in the angle of view of the current imaging optical system 2 by performing binarization processing with respect to the image data generated by the imaging element 8, and then performing edge extraction. Further, the angle of view determination unit 3125*d* may determine whether the object A1 is in the angle of view of the imaging optical system 2 according to a change of color. Note that, as the setting of the main object, various methods can be considered other than a simple method such that, in a case of a flying bird, as illustrated in FIG. 38 below, the background is the sky, and a portion having a contrast with respect to a portion having no contrast, or a specific color with respect to the background having a specific color may be set as the main object. Of course, a shape pattern of a feather or a neck specific to the bird is detected, the pattern may be used as the main object. Further, a thing similar to an image dictionary may be set as the main object by a method of selecting one from images in an image database registered in advance. Further, a method of capturing an image of the bird while the bird perches on a branch or a roof, and storing the shapes and the colors of objects in the captured image so as to follow the objects. In any case, a characteristic of an image is compared with a specific pattern or color, and when there is a pattern or color that matches the characteristic of the image, the pattern or color may just be set as the main object. A changeover system may be employed, in which when the imaging apparatus faces upward, automatic setting based on the sky is performed, or when the imaging apparatus faces sideways, an image selected from a dictionary is set as a main object candidate. When an imaging unit capable of determining distance distribution is included, an object in a finite distance may be set as the main object (the sky is infinite). These patterns, colors, and distances may be considered as characteristics of an obtained image portion.

In step S1118, when the angle of view determination unit 3125*d* determines that the object detected by the object detection unit 3125*c* is in the angle of view of the imaging optical system 2 (step S1118: Yes), the imaging apparatus 3000 proceeds to step S1109. In contrast, when the angle of view determination unit 3125*d* determines that the object detected by the object detection unit 3125*c* is not in the angle of view of the imaging optical system 2 (step S1118: No), the imaging apparatus 3000 proceeds to step S1119. Here, description is given, in which the angle of view determination unit 3125*d* determines whether the object is in the screen. However, the degree of coincidence may be determined in an analog manner, and when approximately coincident, the processing may proceeds to Y. The angle of view determination unit 3125*d* may determine it is when the entire bird falls in the screen as illustrated in FIG. 38. Further, the angle of view determination unit 3125*d* may determine it is 0.9 when only a tip portion of the shape of the bird cannot be detected, and may consider this is approximately coincident and proceed to Y. Which numerical value is employed to proceed to Y may be arbitrarily changed by the user. In this way, the position of the main object actual captured or how much the object lies in the screen can be determined according to liking of the user using the optical sight, which is a separate body from the imaging element 8 of the imaging apparatus 3000. Further, the warning level may be changed according to a determination result of the angle of view determination unit 3125*d*. However, here, the simple flow is employed, for simplification of description.

In step S1119, the sight controller 3125*e* performs warning notifying the object A1 falls outside the angle of view of the imaging optical system 2 by intermittently emitting the luminous light emitted by the light source unit 821. By the blinking of the luminous flux of the optical sight unit 400, the photographer can intuitively recognize that the object A1 falls outside the angle of view. At this time, the display controller 3125*h* may perform the warning by superimposing a message, an icon, or the like on the live view image displayed by the display unit 18, indicating the object A1 falls outside the angle of view of the imaging optical system 2. After step S1119, the imaging apparatus 3000 proceeds to step S1109. Note that the sight controller 3125*e* may change the pattern or color of the warning depending on how conditions are satisfied. When a sound is used for the warning, a tone or a sound pattern may be changed so that the user can easily recognize the warning.

In step S1120, the controller 3125 drives the pop-up mechanism 500, and causes the leg unit 3117 to pop up from the body unit 3100.

Next, the display controller 3125*h* causes the display unit 18 to display a live view image corresponding to the image data generated by the imaging element 8 (step S1121).

Following that, the sight controller 3125*e* stops the driving of the optical sight unit 400 (step S1122). Accordingly, the power consumption can be suppressed when the imaging optical system 2 of the imaging apparatus 3000 performs capturing an image with standard and wide angle focal distances.

Next, when the screen of the display unit 18 is touched through the touch panel 16*g* (step S1123: Yes), the imaging apparatus 3000 executes flash photographing (step S1124). To be specific, the flash controller 3125*f* causes the flash light emitting unit 300 to irradiate the visual field area with illumination light, and the imaging controller 3125*g* causes the imaging element 8 to capture a still image, and records the image data in the recording medium 19. After step S1124, the imaging apparatus 3000 proceeds to step S1111.

In step S1123, when the screen of the display unit 18 is not touched through the touch panel 16*g* (step S1123: No), the imaging apparatus 3000 proceeds to step S1125.

Next, when a release signal is input from the release switch 16*b* (step S1125: Yes), the imaging apparatus 3000 proceeds to step S1124. In contrast, when the release signal is not input form the release switch 16*b* (step S1125: No), the imaging apparatus 3000 proceeds to step S1111.

In step S1101, when a shooting mode is not set to the imaging apparatus 3000 (step S1101: No), when a playback mode is set to the imaging apparatus 3000 (step S1126: Yes), the imaging apparatus 3000 executes playback display processing of playing back the image data recorded in the recording medium 19 in the display unit 18 (step S1127). After step S1127, the imaging apparatus 3000 proceeds to step S1111.

In step S1101, when a shooting mode is not set to the imaging apparatus 3000 (step S1101: No), when the playback mode is not set to the imaging apparatus 3000 (step S1126: No), the imaging apparatus 3000 proceeds to step S1111.

According to the above-described tenth embodiment of the present invention, when the angle of view determination unit 3125*d* determines that the entire object detected by the object detection unit 3125*c* is not in the angle of view of the imaging optical system 2, the sight controller 3125*e* performs warning notifying that the object falls outside the angle of view by controlling the driving of the optical sight unit 400, and causing the optical sight unit 400 to intermittently emit the luminous flux. Therefore, the main object can be prevented from falling outside the angle of view of the imaging optical system 2 while the optical sight unit 400 is emitting the luminous flux.

Further, according to the tenth embodiment of the present invention, when the angle of view determination unit 3125*d* determines that the object detected by the object detection unit 3125*c* is not in the angle of view of the imaging optical system 2, the display controller 3125*h* superimposes a message, an icon, or the like of the warning on the live view image displayed by the display unit 18, indicating the object detection unit 3125*c* goes out of the angle of view of the imaging optical system 2. Therefore, when the photographer captures an image while viewing the luminous flux of the optical sight unit 400 and the live view image of the display unit 18, the object can be prevented from going out of the angle of view of the imaging optical system 2.

Further, according to the tenth embodiment of the present invention, when the leg unit 3117 pops up from the body unit 3100, the sight controller 3125*e* drives the optical sight unit 400 based on the focal distance of the imaging optical system 2 detected by the focal distance detection unit 23. Therefore, even if the imaging optical system 2 is telephoto or super telephoto, framing can be performed with respect to a desired object.

Further, according to the tenth embodiment of the present invention, the live view image displayed by the display unit 18 can be confirmed by slightly shifting a visual line from a position where the optical sight unit 400 can sets sights on the object. As a result, a desired object appearing on the screen can be tracked while confirming an image to be imaged.

Note that, in the tenth embodiment of the present invention, the sight controller 3125*e* may adjusts the brightness or the shape of the luminous flux emitted by the light source unit 821 based on the brightness of the visual field area of the imaging apparatus 3000 detected by the brightness detection unit 3125*a*. Accordingly, the object can be sighted with luminous flux of optimum brightness for the environment of the imaging apparatus 3000.

Further, in the tenth embodiment of the present invention, the angle of view determination unit 3125*d* determines whether all of the object detected by the object detection unit 3125*c* is in the angle of view of the imaging optical system 2. However, for example, the angle of view determination unit 3125*d* may determine whether a part of the object is in the angle of view of the imaging optical system 2. Further, the angle of view determination unit 3125*d* may determine whether the area of the object detected by the object detection unit 3125*c* is a specified ratio or more in the angle of view of the imaging optical system 2 (for example, 80% or more).

Further, in the tenth embodiment of the present invention, the sight controller 3125*e* may change the position of the luminous flux to be caused by the light source unit 821 on the reflecting optical element 822 by changing the angle or the position of light emitted by the light source unit 821 based on the distance of the object in the imaging apparatus 3000 detected by the distance detection unit 3125*b*. Accordingly, the parallax between the imaging apparatus 3000 and the optical sight unit 400 can be corrected.

Further, in the tenth embodiment of the present invention, the sight controller 3125*e* may change the color or the shape of the luminous flux emitted by the optical sight unit 400 for each type of object, for example, a face or an animal detected by the object detection unit 3125*c*.

Further, in the tenth embodiment of the present invention, the sight controller 3125*e* may adjust the angle and the position of light emitted by the light source unit 821 so as to adjust the light the AF region of the imaging apparatus 3000 or the position of the luminous flux caused by the light source unit 821 on the reflecting optical element 822 in the AE region. Further, when an object tracking mode is specified in the imaging apparatus 3000, the position of the luminous flux of the optical sight unit 400 according to the tracking. In this case, when the object to be tracked cannot be tracked, the sight controller 3125*e* performs warning display by blinking the luminous flux emitted by the light source unit 821, and the like.

Further, in the tenth embodiment of the present invention, when the imaging apparatus 3000 is in an unphotographable state, for example, when the number of photographable pictures becomes zero, when auto-focusing of the imaging apparatus 3000 becomes unavailable, or the like, the sight controller 3125*e* may perform warning display by performing blinking in the light source unit 821 of the optical sight unit 400. In contrast, when it becomes in a recommendable state to recommend the photographer to capture an image, for example, when the auto-focusing of the imaging apparatus 3000 becomes in a focused state, the sight controller 3125*e* may cause the light source unit 821 of the optical sight unit 400 to perform blinking, and the like.

Further, in the tenth embodiment of the present invention, the operation and/or setting of the optical sight unit 400 may be changed in conjunction with the mode of the imaging apparatus 3000 selected by the photographer. For example, when an instruction signal that instructs a wild bird exclusive mode is input from the shooting mode changeover switch 16*c* by the shooting mode changeover switch 16*c* being operated by the photographer, the sight controller 3125*e* may cause the optical sight unit 400 to automatically pop up from the body unit 3100, and cause the light source unit 821 to emit the luminous flux.

Further, in the tenth embodiment of the present invention, the light source unit 821 of the optical sight unit 400 is configured from a liquid crystal panel or an organic EL, and not only the center position of the optical sight unit 400, but also the distance of the imaging range of the imaging optical system 2 is displayed, and may be changed and displayed in conjunction with the zoom of the imaging apparatus 3000.

Note that, while, in the tenth embodiment of the present invention, the sight controller 3125*e* drives the optical sight unit 400 when the focal distance of the imaging optical system 2 is telephoto, the optical sight unit 400 may be driven only during a period in which the first release signal is continuously input from the release switch 16*b*, for example. Accordingly, the power consumption can be reduced by the optical sight unit 400, and framing in the screen can be easily performed in a state where the desired object is focused.

In the tenth embodiment of the present invention, a half mirror is used as the reflecting optical element 822. However, for example, a light guiding plate configured from a holographic element in which a dielectric multilayer film is provided, a prism, and the like may be combined to configure the reflecting optical element 822.

Eleventh Embodiment

Figure 39:
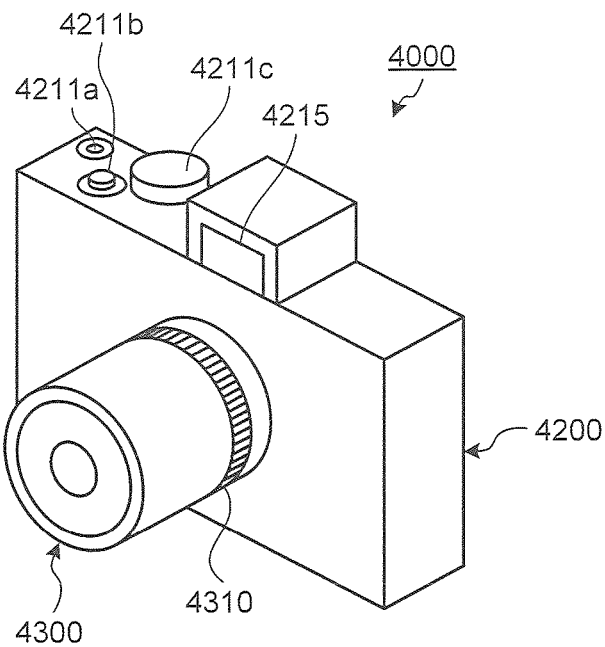
FIG. 39 is a diagram illustrating a configuration of the imaging apparatus at a side facing an object according to an eleventh embodiment of the present invention.
Figure 40:
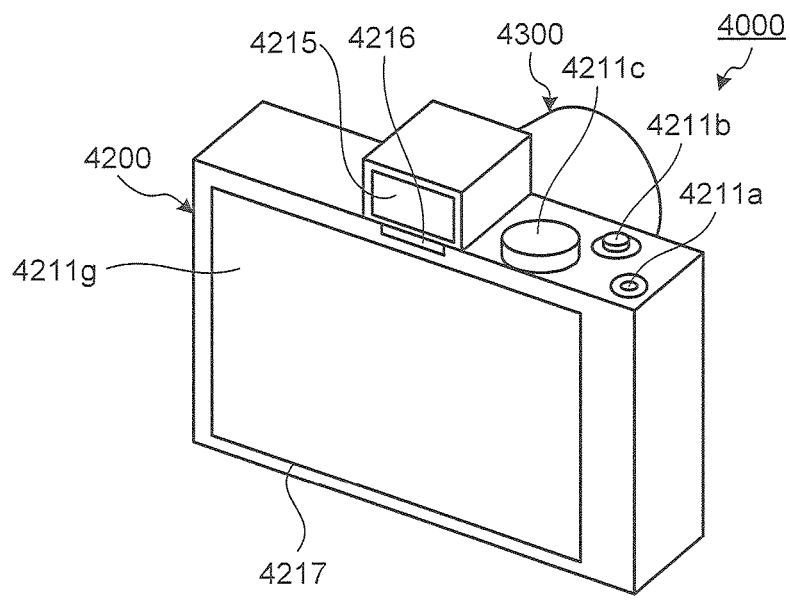
FIG. 40 is a diagram illustrating a configuration of the imaging apparatus at a side facing the user according to the eleventh embodiment of the present invention.
Figure 41:
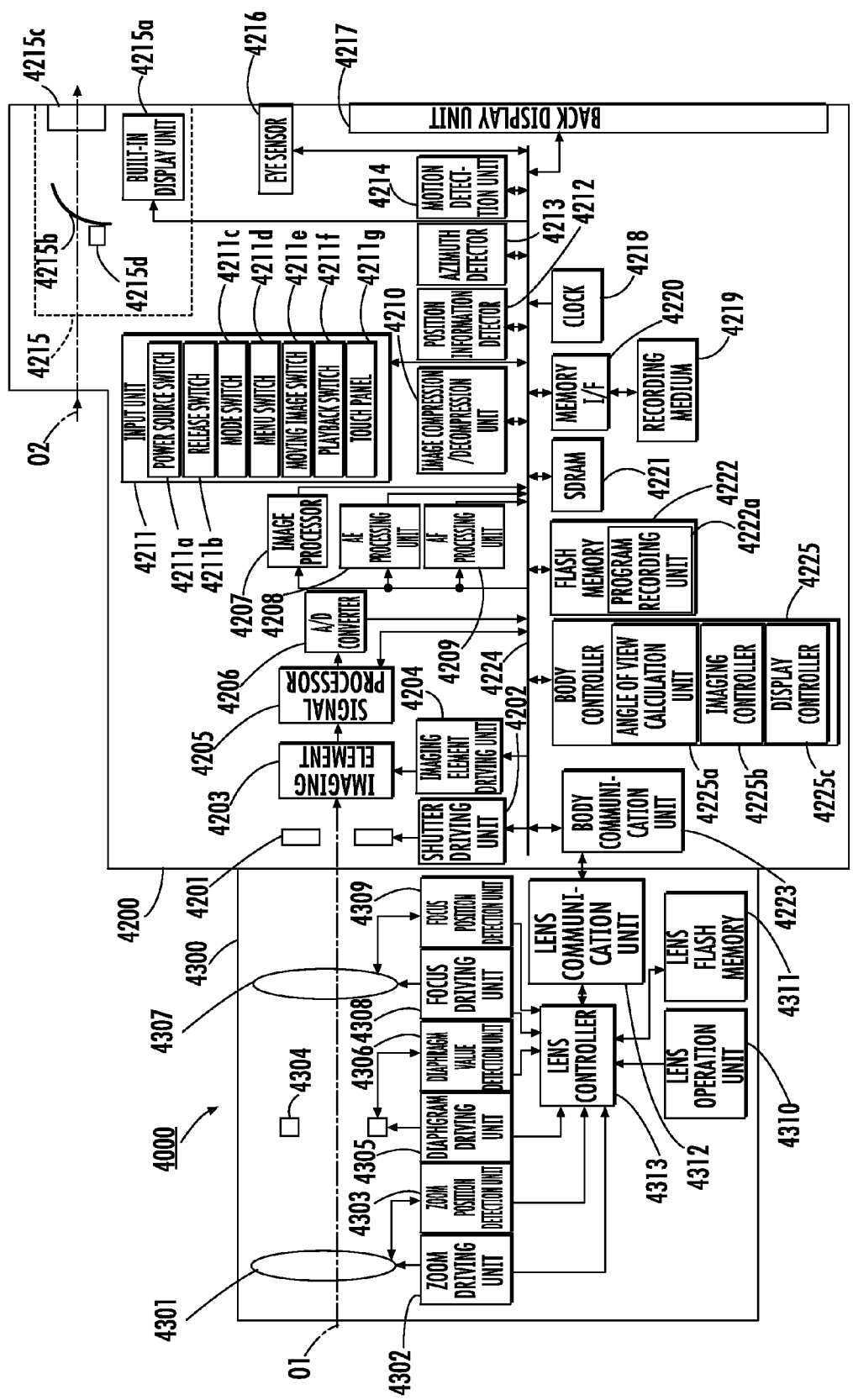
FIG. 41 is a block diagram illustrating a function configuration of the imaging apparatus according to the eleventh embodiment of the present invention.

FIG. 39 is a diagram illustrating a configuration of the imaging apparatus at a side facing an object (front side) according to an eleventh embodiment of the present invention. FIG. 40 is a diagram illustrating a configuration of the imaging apparatus at a side facing the user (back side) according to the eleventh embodiment of the present invention. FIG. 41 is a block diagram illustrating a function configuration of the imaging apparatus according to the eleventh embodiment of the present invention.

An imaging apparatus 4000 illustrated in FIGS. 39 to 41 includes a body unit 4200, and a lens unit 4300 that is detachable to the body unit 4200, collects light from a specified visual field area, and is capable of optical zoom. Note that, in the eleventh embodiment, the lens unit 4300 functions as an imaging optical system.

First, the body unit 4200 will be described. The body unit 4200 includes a shutter 4201, a shutter driving unit 4202, an imaging element 4203, an imaging element driving unit 4204, a signal processor 4205, an A/D converter 4206, an image processor 4207, an AE processing unit 4208, an AF processing unit 4209, an image compression/decompression unit 4210, an input unit 4211, a position information detector 4212, an azimuth detector 4213, a motion detection unit 4214, an eyepiece display unit 4215, an eye sensor 4216, a back display unit 4217, a clock 4218, a recording medium 4219, a memory I/F 4220, an SDRAM 4221, a flash memory 4222, a body communication unit 4223, a bus 4224, and a body controller 4225. Here, the imaging unit is made of the lens unit 4300, the shutter 4201, and the imaging element 4203. Further, only the shutter 4201 and the imaging element 4203 may be detachable, or the lens unit 4300, the shutter 4201, and the imaging element 4203 may be integrally structured.

The shutter 4201 sets the state of the imaging element 4203 to an exposure state or to a light-shading state. The shutter 4201 is configured from a lens shutter or a focal plane shutter.

The shutter driving unit 4202 drives the shutter 4201 in response to an instruction signal input from the body controller 4225. The shutter driving unit 4202 is configured from a stepping motor, a DC motor, and the like.

The imaging element 4203 generates electronic image data by receiving the light collected by the lens unit 4300 and performing photoelectric conversion. To be specific, the imaging element 4203 is configured from a CCD, a CMOS, or the like, which receives the light collected by the lens unit 4300, and converts the light into an electrical signal, and generates image data of the object. The imaging element driving unit 4204 outputs the image data (analog signal) from the imaging element 4203 to the signal processor 4205 at a specified timing. In this sense, the imaging element driving unit 4204 functions as an electronic shutter. Further, the imaging element driving unit 4204 outputs the image data to the imaging element 4203 at a specified frame rate (for example, 30 fps or 60 fps) under control of the body controller 4225. Further, the imaging element driving unit 4204 causes the imaging element 4203 to output the image data to the signal processor 4205 at a high-speed frame rate (for example, 120 fps) by thinning out specified lines of the imaging element 4203, for example, even lines or odd lines, under control of the body controller 4225.

The signal processor 4205 applies analog processing such as reset noise reduction processing, waveform shaping processing, and gain up processing to the image data input from the imaging element 4203, and output the image data to the A/D converter 4206.

The A/D converter 4206 generates digital image data (raw data) by performing A/D conversion to the analog image data input from the signal processor 4205, and outputs the image data to the SDRAM 4221 through the bus 4224.

The image processor 4207 acquires the image data (raw data) from the SDRAM 4221 through the bus 4224, applies various types of image processing to the acquired image data, and outputs the image data to the SDRAM 4221. Here, examples of the image processing include optical black reduction processing, white balance adjustment processing, color matric operation processing, gamma correction processing, color reproduction processing, edge enhancement processing, composition processing to compose a plurality of image data, and synchronization processing of image data when the imaging element 4203 is a Bayer array.

The AE processing unit 4208 acquires the image data recorded in the SDRAM 4221 through the bus 4224, and sets an exposure condition of when the imaging apparatus 4000 captures a still image or captures a moving image based on the acquired image data. To be specific, the AE processing unit 4208 calculates luminance from the image data, and performs automatic exposure of the imaging apparatus 4000 by determining a diaphragm value, a shutter speed, an ISO speed, and the like, based on the calculated luminance.

The AF processing unit 4209 acquires the image data recorded in the SDRAM 4221 through the bus 4224, and automatically adjusts the focal point of the imaging apparatus 4000 based on the acquired image data. For example, the AF processing unit 4209 automatically adjusts the focal point of the imaging apparatus 4000 by determining focus evaluation of the imaging apparatus 4000 by taking out a signal of a high frequency component from the image data, and performing auto focus (AF) processing to the signal of the high frequency component. Note that the AF processing unit 4209 may automatically adjust the focal point of the imaging apparatus 4000 using a pupil division phase-contrast method.

The image compression/decompression unit 4210 acquires the image data from the SDRAM 4221 through the bus 4224, compresses the acquired image data according to a specified format, and outputs the compressed image data to the recording medium 4219 through the memory I/F 4220. Here, the specified format is JPEG format, Motion JPEG format, MP4 (H.264) format, or the like. Further, the image compression/decompression unit 4210 acquires the image data (compressed image data) recorded in the recording medium 4219 through the bus 4224 and a memory I/F 4220, decompresses (expands) the acquired image data, and outputs the image data to the SDRAM 4221.

The input unit 4211 includes a power source switch 4211a that switches a power source state of the imaging apparatus 4000 to an on state or an off state, a release switch 4211b that receives an input of a still image release signal that provides an instruction to capture a still image, a mode switch 4211c that switches various types of setting of the imaging apparatus 4000, a menu switch 4211d that allows the various types of setting of the imaging apparatus 4000 to be displayed in the back display unit 4217, a moving image switch 4211e that receives an input of a moving image release signal that provides an instruction to capture a moving image, a playback switch 4211f that plays back the image data recorded in the recording medium 4219, and a touch panel 4211g superimposed on a display screen of the back display unit 4217, and receives an input of a position signal according to a contact position from an outside. The release switch 4211b is retractable by pressing from an outside. The release switch 4211b receives an input of a first release signal that instructs a capturing preparation operation when being half pressed, while receiving an input of a second release signal that instructs capturing of a still image when being fully pressed.

The position information detector 4212 receives orbit information of satellites transmitted from a plurality of GPS satellites that configures a global positioning system (GPS)

as a measuring means to measure a position of an object on the ground, and acquires position information of the imaging apparatus 4000 based on the received orbit information. The position information includes longitude, latitude, and time information.

The azimuth detector 4213 detects azimuth information of the imaging apparatus 4000 where a direction that the optical axis O1 of the lens unit 4300 faces the visual field area is a reference azimuth, when the optical axis O1 of the lens unit 4300 becomes approximately horizontal. To be specific, the azimuth detector 4213 detects components of terrestrial magnetism of the vertical and horizontal directions, and detects the azimuth of the imaging apparatus 4000 by detecting an angle made by the reference azimuth and the optical axis O1 of the imaging apparatus 4000 where north is the reference. The azimuth detector 4213 is configured from a magnetic azimuth sensor, and the like.

The motion detection unit 4214 detects an inclination angle of the imaging apparatus 4000 with respect to the horizontal plane by detecting an acceleration caused in the imaging apparatus 4000, and outputs a detection result thereof to the body controller 4225. To be specific, when the user performs a tilt operation (tilt and shift operation) to the imaging apparatus 4000, the motion detection unit 4214 detects polar coordinates of the imaging apparatus 4000 with respect to the horizontal plane as the inclination angle. The motion detection unit 4214 is configured from a triaxial acceleration sensor that detects an acceleration component of each axis direction, a gyro sensor, and the like.

The eyepiece display unit 4215 displays an image corresponding to the image data recorded in the SDRAM 4221 through the bus 4224, and transmits the light from the visual field area of the imaging apparatus 4000, under control of the body controller 4225. Note that, in the eleventh embodiment of the present invention, the eyepiece display unit 4215 functions as a display device.

Here, a detailed configuration of the eyepiece display unit 4215 will be described. The eyepiece display unit 4215 includes a built-in display unit 4215a, an optical element 4215b, an eyepiece part 4215c, and a shading part 4215d.

The built-in display unit 4215a displays the image corresponding to the image data recorded in the SDRAM 4221 through the bus 4224, or the live view image corresponding to the image data continuously generated by the imaging element 4203, under control of the body controller 4225. Further, the built-in display unit 4215a displays information related to the lens unit 4300. To be specific, the built-in display unit 4215a displays angle of view information related to the angle of view of the lens unit 4300 and/or center information including the center of the angle of view of the lens unit 4300. For example, the built-in display unit 4215a displays the image information corresponding to the angle of view of the lens unit 4300 by a frame. The built-in display unit 4215a is configured from a display panel made of liquid crystal or an organic EL, a driver, and the like. Note that, in the eleventh embodiment, the built-in display unit 4215a functions as a display unit.

The optical element 4215b transmits the light from the visual field area collected by the lens unit 4300, and produces a virtual image of information displayed on the built-in display unit 4215a in an area where the light from the visual field area transmits. To be specific, the optical element 4215b transmits the light from the visual field area of the spherically shaped optical element 4215b, and produces a virtual image of the image displayed on the built-in display unit 4215a in the visual field area of the imaging apparatus 4000 by reflecting the image displayed by the built-in display unit 4215a toward the eyepiece part 4215c. Further, the optical element 4215b generates a frame corresponding to the angle of view of the lens unit 4300 displayed by the built-in display unit 4215a and/or a virtual image of the luminous flux indicating the center of the angle of view of the lens unit 4300 in the visual field area of the imaging apparatus 4000 or near the visual field area. The optical element 4215b is configured from a half mirror formed to curve toward the back side, or a mirror provided with a dielectric multilayer film.

The eyepiece part 4215c transmits the light from the optical element 4215b. To be specific, the eyepiece part 4215c is configured from a parallel lens, glass, plastic, or the like.

The shading part 4215d is provided at a front side of the optical element 4215b and shades a part of the light from the visual field area of the imaging apparatus 4000. The shading part 4215d is configured from a shading member that cut off light from an outside.

The eyepiece display unit 4215 configured in this way functions as an electronic view finder (EVF), and also functions as a sight.

The eye sensor 4216 detects proximity of the user to the eyepiece display unit 4215, and output this detection result to the body controller 4225. The eye sensor 4216 is configured from a contact sensor, an infrared sensor, and the like. Note that, in the eleventh embodiment, the eye sensor 4216 functions as a detection unit.

The back display unit 4217 displays an image corresponding to the image data, under control of the body controller 4225. The back display unit 4217 is configured from a display panel made of a liquid crystal or an organic EL, a driver, and the like. Here, the display of the image includes confirmation display that displays image data immediately after capturing only for a specified time (for example, three seconds), a playback display that plays back the image data recorded in the recording medium 4219, and a live view image display that sequentially displays live view images in time series, which are corresponding to the image data continuously generated by the imaging element 4203. Further, the back display unit 4217 appropriately displays operation information of the imaging apparatus 4000 and information related to capturing of an image.

The clock 4218 has a clocking function and a determination function of date and time of capturing of an image. The clock 4218 outputs the date and time data to the body controller 4225 in order to add the date and time data to the image data imaged by the imaging element 4203.

The recording medium 4219 is configured from a memory card, or the like mounted from an outside of the imaging apparatus 4000. The recording medium 4219 is detachably mounted to the imaging apparatus 4000 through the memory I/F 4220. In the recording medium 4219, raw data, and the image data to which the image processor 4207 and the image compression/decompression unit 4210 applies processing are written. Further, the image data recorded in the recording medium 4219 by the body controller 4225 is read out.

The SDRAM 4221 temporarily records the image data input from the A/D converter 4206 through the bus 4224, the image data input from the image processor 4207, and information of the imaging apparatus 4000 during processing. For example, the SDRAM 4221 temporarily stores the image data sequentially output by the imaging element 4203 for each frame through the signal processor 4205, the A/D converter 4206, and the bus 4224.

The flash memory 4222 includes a program recording unit 4222a. The program recording unit 4222a records various programs for operating the imaging apparatus 4000, various data used during execution of the programs, and parameters of each image processing necessary for the operation of the image processor by the image processor 4207.

The body communication unit 4223 is a communication interface for performing communication with the lens unit 4300 mounted to the body unit 4200. The body communication unit 4223 includes an electric contact with the lens unit 4300.

The bus 4224 is configured from a transmission path that connects configuration units of the imaging apparatus 4000, and the like. The bus 4224 transfers various data generated inside the imaging apparatus 4000 to the respective configuration units of the imaging apparatus 4000.

The body controller 4225 centrally control the operation of the imaging apparatus 4000 by transferring instructions and data to the units that configures the imaging apparatus 4000 in response to an instruction signal from the input unit 4211. The body controller 4225 is configured from a CPU, and the like.

Here, a detailed configuration of the body controller 4225 will be described. The body controller 4225 includes an angle of view calculation unit 4225a, an imaging controller 4225b, and a display controller 4225c.

The angle of view calculation unit 4225a calculates the angle of view of the imaging apparatus 4000 based on the lens information of the lens unit 4300 connected to the body unit 4200 through the body communication unit 4223 and the bus 4224. To be specific, the angle of view calculation unit 4225a calculates the current angle of view of the lens unit 4300 based on the current focal distance included in the lens information of the lens unit 4300.

When a second release signal is input from the release switch 4211b, the imaging controller 4225b performs control of staring an operation of capturing a still image in the imaging apparatus 4000. Here, the operation of capturing a still image in the imaging apparatus 4000 is an operation in which specified processing is applied by the signal processor 4205, the A/D converter 4206, and the image processor 4207 to the image data output by the imaging element 4203 by the driving of the shutter driving unit 4202 and the imaging element driving unit 4204. The image data to which the processing is applied is compressed in the image compression/decompression unit 4210 according to a specified format under control of the imaging controller 4225b, and is recorded in the recording medium 4219 through the bus 4224 and a memory I/F 4220. Further, when a release signal of capturing a moving image is input through the moving image switch 4211e, the imaging controller 4225b performs control of starting an operation of capturing a moving image in the imaging apparatus 4000.

The display controller 4225c controls the display mode of the built-in display unit 4215a and the back display unit 4217. To be specific, the display controller 4225c causes the built-in display unit 4215a or the back display unit 4217 to display an image corresponding to the image data generated by the imaging element 4203.

The body unit 4200 having the above configuration may be provided with an audio input/output function, a flash function, and a communication function capable of bidirectionally communicating with an outside.

Next, the lens unit 4300 will be described. The lens unit 4300 includes a zoom optical system 4301, a zoom driving unit 4302, a zoom position detection unit 4303, a diaphragm 4304, a diaphragm driving unit 4305, a diaphragm value detection unit 4306, a focus optical system 4307, a focus driving unit 4308, a focus position detection unit 4309, a lens operation unit 4310, a lens flash memory 4311, a lens communication unit 4312, and a lens controller 4313. Note that, in the eleventh embodiment, the lens unit 4300 functions as an imaging optical system.

The zoom optical system 4301 is configured from one or a plurality of lenses, and changes the magnification (the angle of view) of the optical zoom of the lens unit 4300 by moving along the optical axis O1 of the lens unit 4300. For example, the zoom optical system 4301 can change the focal distance from 12 mm to 600 mm.

The zoom driving unit 4302 changes the optical zoom of the imaging apparatus 4000 by moving the zoom optical system 4301 along the optical axis O1, under control of the lens controller 4313. The zoom driving unit 4302 is configured from a DC motor, a stepping motor, or the like.

The zoom position detection unit 4303 detects the position of the zoom optical system 4301 on the optical axis O1, and outputs this detection result to the lens controller 4313. The zoom position detection unit 4303 is configured from a photo interpreter, and the like.

The diaphragm 4304 adjusts the exposure by limiting the incident among of the light collected by the zoom optical system 4301.

The diaphragm driving unit 4305 changes the diaphragm value (f value) of the imaging apparatus 4000 by driving the diaphragm 4304 under control of the lens controller 4313. The diaphragm driving unit 4305 is configured from a stepping motor and the like.

The diaphragm value detection unit 4306 detects a diaphragm value from the current state of the diaphragm 4304, and outputs this detection result to the lens controller 4313. The diaphragm value detection unit 4306 is configured from a photo interpreter, and the like.

The focus optical system 4307 is configured from one or a plurality of lenses, and changes a pint position of the lens unit 4300 by moving on the optical axis O1 of the lens unit 4300.

The focus driving unit 4308 adjusts the pint position of the lens unit 4300 by moving the focus optical system 4307 along the optical axis O1, under control of the lens controller 4313. The focus driving unit 4308 is configured from a DC motor, a stepping motor, or the like.

The focus position detection unit 4309 detects the position of the focus optical system 4307 on the optical axis O1, and outputs this detection result to the lens controller 4313. The focus position detection unit 4309 is configured from a photo interpreter, and the like.

The lens operation unit 4310 is an operation ring provided around a lens barrel of the lens unit 4300, and receives an input of an instruction signal that instructs a change of the optical zoom in the lens unit 4300 and an input of an instruction signal that instructs adjustment of the pint information in the lens unit 4300. Note that the lens operation unit 4310 may be a push type switch, a lever type switch, or the like.

The lens flash memory 4311 records control programs for determining the positions and the movements of the zoom optical system 4301, the diaphragm 4304, and the focus optical system 4307, lens characteristics of the lens unit 4300, and various parameters. Here, the lens characteristic includes the aberration, brightness information (f value), and focal distance information (for example, 12 mm to 600 mm) of the lens unit 4300.

The lens communication unit 4312 is a communication interface for performing communication with the body communication unit 4223 of the body unit 4200 when the lens unit 4300 is mounted to the body unit 4200. The lens communication unit 4312 includes an electric contact with the body unit 4200.

The lens controller 4313 is configured from a CPU, and the like. The lens controller 4313 controls the operation of the lens unit 4300 in response to an instruction signal from the lens operation unit 4310 or an instruction signal from the body unit 4200. To be specific, the lens controller 4313 adjusts a pint by the focus optical system 4307 by driving the focus driving unit 4308 and changes the zoom magnification of the optical zoom of the zoom optical system 4301 by driving the zoom driving unit 4302, in response to an instruction signal from the lens operation unit 4310. Note that the lens controller 4313 may periodically transmit the lens characteristic of the lens unit 4300 and identification information for identifying the lens unit 4300 to the body unit 4200 when the lens unit 4300 is mounted to the body unit 4200. Further, the lens controller 4313 may transmit the lens information to the body unit 4200 in synchronization with a frame rate at which the imaging element 4203 generates the image data.

Figure 42:
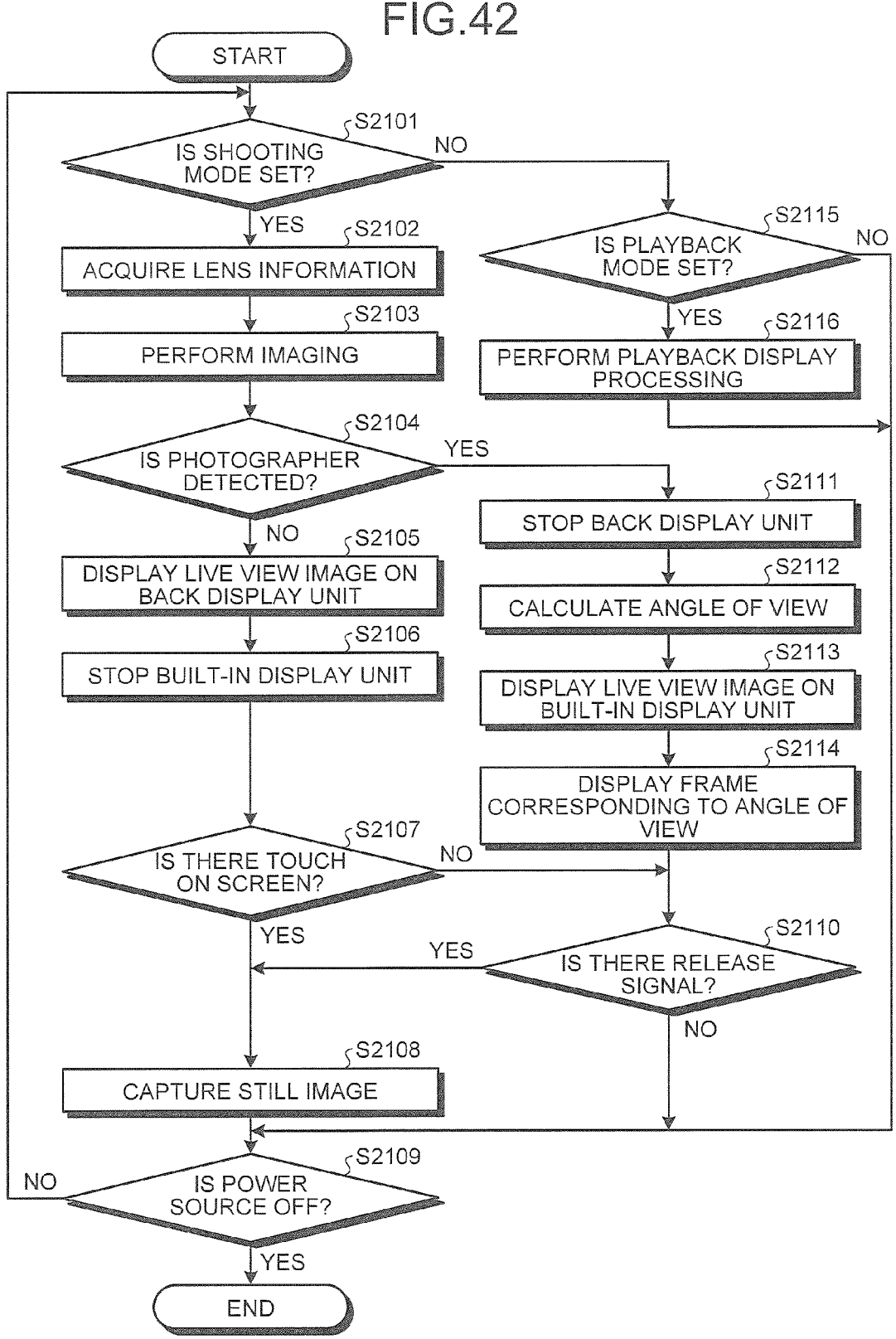
FIG. 42 is a flowchart illustrating an outline of processing executed by the imaging apparatus according to the eleventh embodiment of the present invention.

Processing executed by the imaging apparatus 4000 having the above configuration will be described. FIG. 42 is a flowchart illustrating an outline of the processing executed by the imaging apparatus 4000.

As illustrated in FIG. 42, when the imaging apparatus 4000 is set to a shooting mode (step S2101: Yes), the body controller 4225 acquires lens information of the lens unit 4300 through the bus 4224, the body communication unit 4223, the lens communication unit 4312, and the lens controller 4313 (step S2102). Here, the lens information includes at least current focal distance information of the lens unit 4300.

Next, the imaging controller 4225b drives the imaging element driving unit 4204, and causes the imaging element 4203 to perform imaging (step S2103).

Following that, when the eye sensor 4216 detects the photographer (step S2104: Yes), the imaging apparatus 4000 proceeds to step S2111 described below. In contrast, when the eye sensor 4216 does not detect the photographer (step S2104: No), the imaging apparatus 4000 proceeds to step S2105 described below.

In step S2105, the display controller 4225c causes the back display unit 4217 to display a live view image corresponding to the image data generated by the imaging element 4203.

Figure 43A:
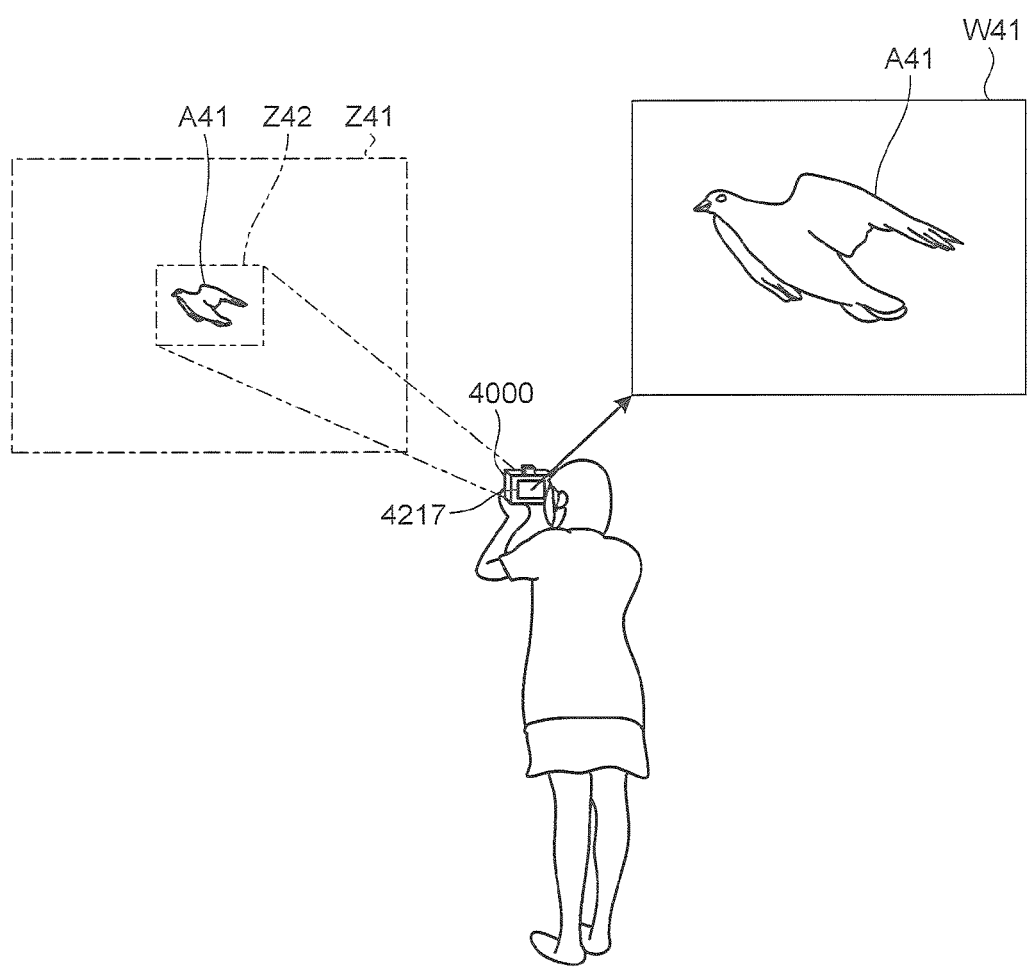
FIG. 43A is a diagram schematically illustrating a state when performing framing of an object while viewing a live view image displayed by a back display unit of the imaging apparatus according to the eleventh embodiment of the present invention.
Figure 43B:
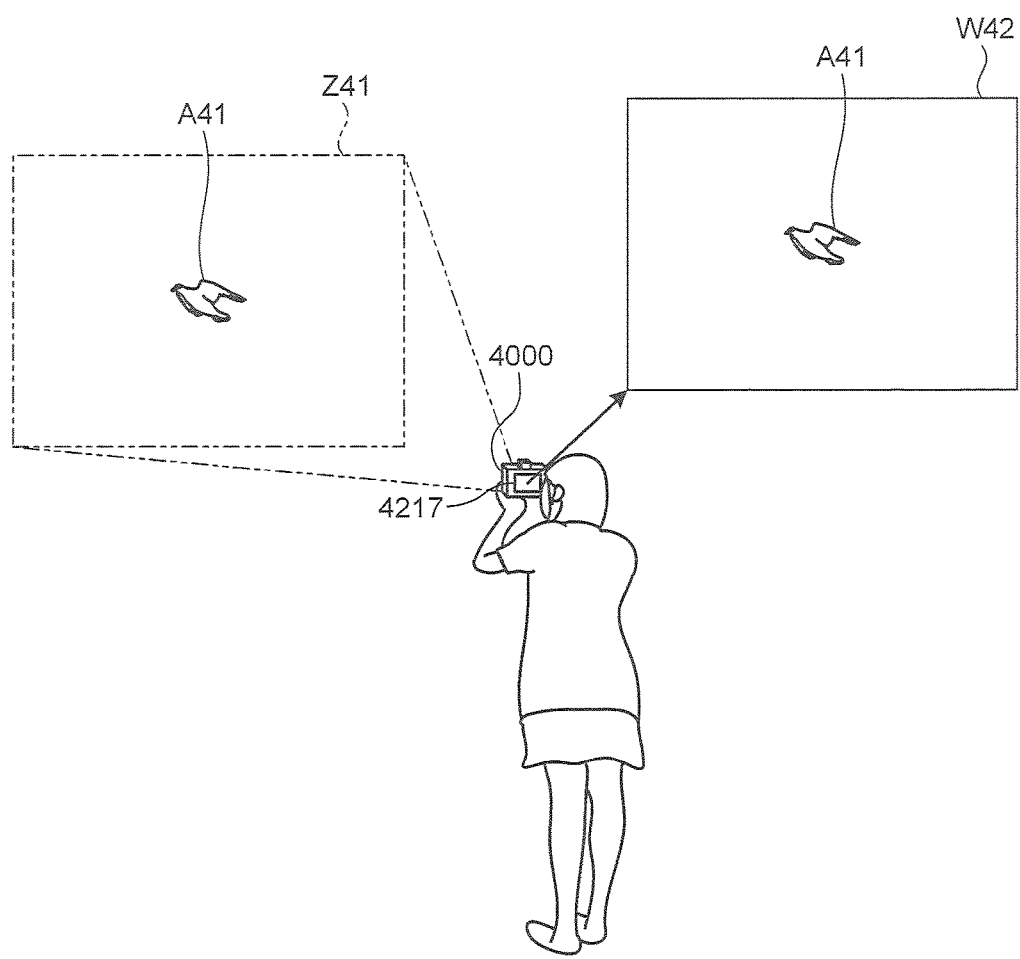
FIG. 43B is a diagram schematically illustrating a state when performing framing of an object at a wide angle while viewing a live view image displayed by the back display unit of the imaging apparatus according to the eleventh embodiment of the present invention.
Figure 43C:
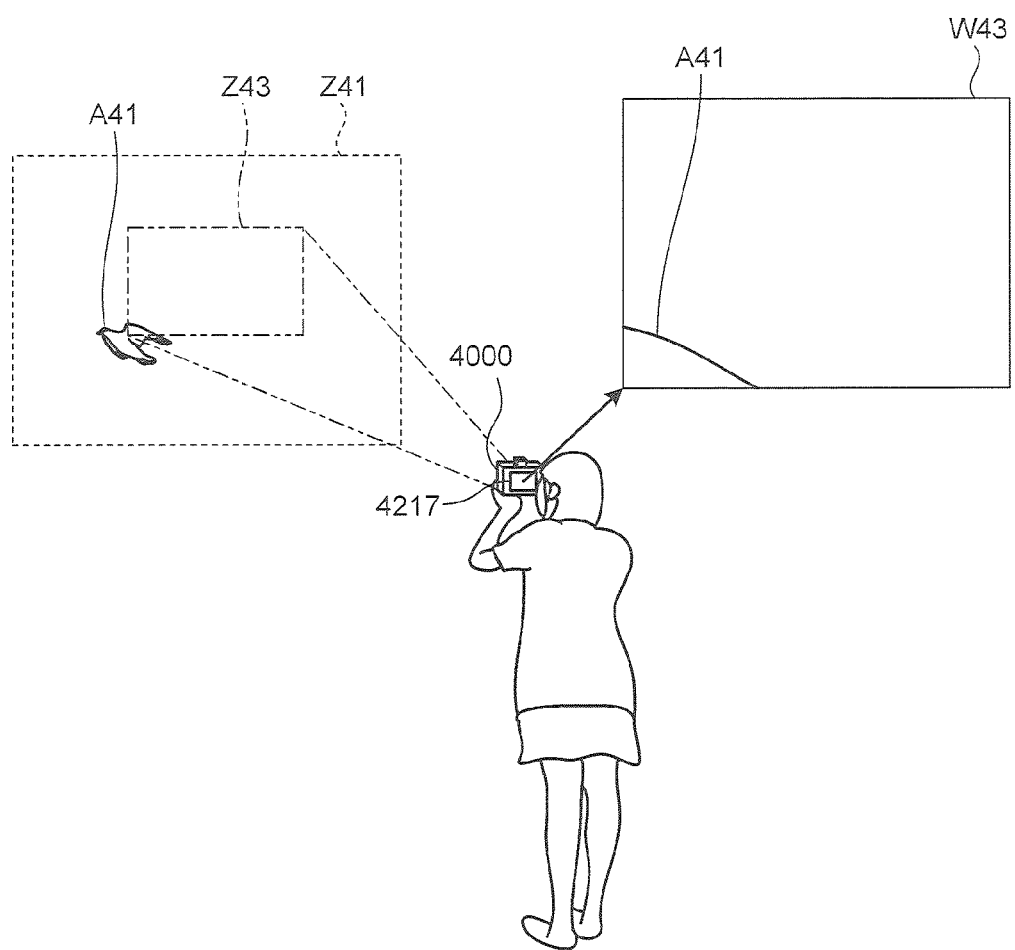
FIG. 43C is a diagram schematically illustrating a state when capturing an image of an object while viewing a live view image displayed by the back display unit of the imaging apparatus according to the eleventh embodiment of the present invention.

FIG. 43A is a diagram schematically illustrating a state when performing framing of the object while viewing the live view image displayed on the back display unit 4217 of the imaging apparatus 4000. FIG. 43B is a diagram schematically illustrating a state when performing framing of the object at a wide angle side of the lens unit 4300 while viewing the live view image displayed by the back display unit 4217 of the imaging apparatus 4000. FIG. 43C is a diagram schematically illustrating a state when capturing an image of the object while viewing the live view image displayed by the back display unit 4217 of the imaging apparatus 4000. Note that, in FIG. 43A, an area Z41 indicates the maximum angle of view that can be captured by the lens unit 4300, and an area Z42 indicates a current angle of view of the lens unit 4300.

When the photographer intends to capture an object A41 such as a bird in the imaging apparatus 4000 with the composition like an image W41 as illustrated in FIG. 43A, first, the photographer operates the lens operation unit 4310 to change the angle of view of the lens unit 4300 to the wide angle side, moves the imaging direction of the imaging apparatus 4000 while viewing the live view image W42 so that the object A41 enters the angle of view of the lens unit 4300, gradually narrows the angle of view of the lens unit 4300 to the telephoto side, and determines the composition of the object A41 and capture the image as illustrated in FIG. 43B. In this case, the photographer tries to capture an image while having the angle of view of the lens unit 4300 and the imaging direction of the imaging apparatus 4000 in conformity with the flying course or a traveling speed of the object A41. However, when the flying course of the object A41 is random, and the traveling speed of the object A41 is fast, it is difficult to adjust the angle of view of the lens unit 4300 to the object. Therefore, the object A41 goes out of the angle of view of the lens unit 4300. As a result, only unsatisfactory capturing is performed like the image W43 illustrated in FIG. 43C, or in the worst case, the object A41 is lost. The live view image displayed in the back display unit 4217 is displayed with the current angle of view (imaging angle of view Z43) of the lens unit 4300, and there is a time lag from when the imaging element 4203 generates the image data to when the image is displayed in the back display unit 4217, or a time lag from the operation of the photographer to when the operation is reflected in the imaging apparatus 4000.

In step S2106, the display controller 4225c stops display of the built-in display unit 4215a. Accordingly, when the photographer performs framing of an object while viewing the live view image displayed by the back display unit 4217, the power consumption by the built-in display unit 4215a can be suppressed.

Following that, when the screen of the back display unit 4217 is touched through the touch panel 4211g (step S2107: Yes), the imaging controller 4225b causes the imaging apparatus 4000 to capture a still image (step S2108). At this time, the imaging controller 4225b records the position information detected by the position information detector 4212, azimuth information detected by the azimuth detector 4213, and the date and time information input from the clock 4218 in the recording medium 4219 in association with the image data.

Next, when the power source switch 4211a is operated, and the power source of the imaging apparatus 4000 is turned OFF (step S2109: Yes), the imaging apparatus 4000 terminates the present processing. In contrast, when the power source switch 4211a is not operated, and the power source of the imaging apparatus 4000 is not turned OFF (step S2109: No), the imaging apparatus 4000 returns to step S2101.

In step S2107, when the screen of the back display unit 4217 is not touched through the touch panel 4211g (step S2107: No), when the release signal is input from the release switch 4211b (step S2110: Yes), the imaging apparatus 4000 proceeds to step S2108.

In step S2107, when the screen of the back display unit 4217 is not touched through the touch panel 4211g (step S2107: No), when the release signal is not input from the release switch 4211b (step S2110: No), the imaging apparatus 4000 proceeds to step S2109.

In step S2111, the display controller 4225c stops the back display unit 4217. Accordingly, when the photographer performs framing of the object through the eyepiece display unit 4215, the power consumption by the back display unit 4217 can be suppressed.

Next, the angle of view calculation unit 4225a calculates the current angle of view of the lens unit 4300 based on the lens information of the lens unit 4300 (step S2112).

Following that, the display controller 4225c causes the built-in display unit 4215a to display a live view image corresponding to the image data generated by the imaging element 4203 (step S2113), and superimposes a frame corresponding to the angle of view calculated by the angle of view calculation unit 4225*a* on the live view image, and causes the built-in display unit 4215*a* to display the frame (step S2114). After step S2114 of FIG. 42, the imaging apparatus 4000 proceeds to step S2110.

Figure 45:
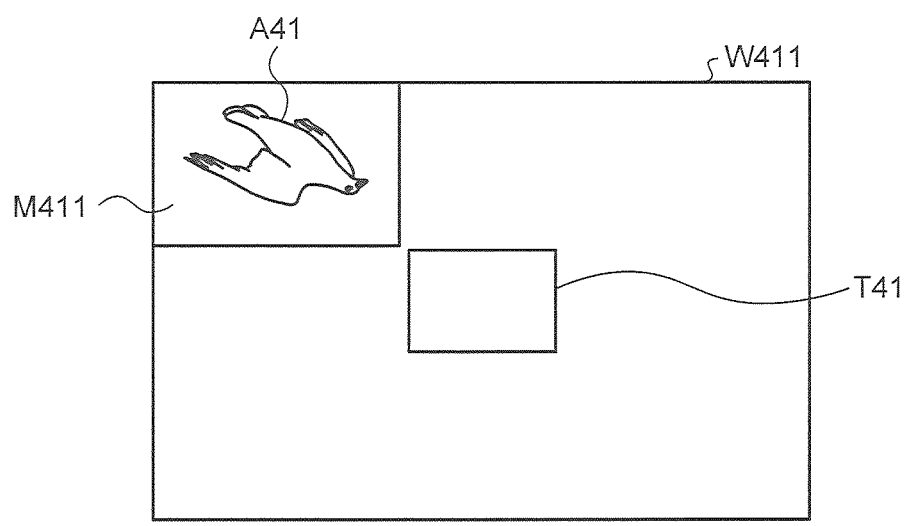
FIG. 45 is a diagram illustrating an example of an image displayed by a built-in display unit of the imaging apparatus according to the eleventh embodiment of the present invention.
Figure 46:
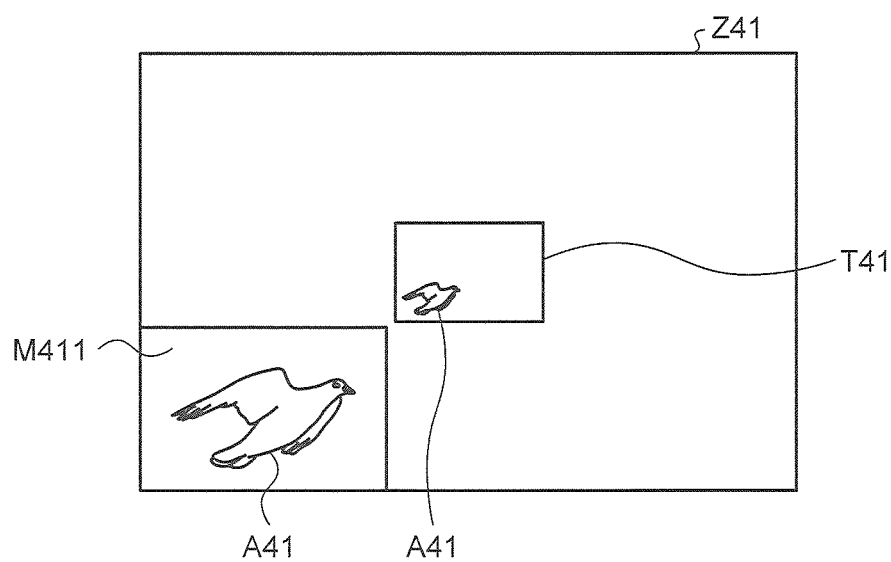
FIG. 46 is a diagram illustrating an example of an image visually recognized by the photographer through an eyepiece display unit.

FIG. 44 is a diagram schematically illustrating a state when capturing an image of an object while confirming framing of the object by the eyepiece display unit 4215 of the imaging apparatus 4000. FIG. 45 is a diagram illustrating an example of an image displayed by the built-in display unit 4215*a*. FIG. 46 is a diagram illustrating an example of an image visually recognized by the photographer through the eyepiece display unit 4215.

Here, a detailed configuration of the eyepiece display unit 4215 will be described. The eyepiece display unit 4215 includes a built-in display unit 4215*a*, an optical element 4215*b*, an eyepiece part 4215*c* of the positive lens group, and a shading part (also referred to as mechanical shutter) 4215*d*. The built-in display unit 4215*a* and the light source unit 821 (for example, a semiconductor laser LD is 650 nm red LED) are arranged in an imaging position of the optical element 4215*b*. The built-in display unit 4215*a* and the light source unit 821 are arranged in a conjugate position. A polarization beam splitter 4215*f* (a polarization-dependent optical element in which P polarization 100% transmits, and S polarization is 100% reflected) is arranged. The luminous flux from the light source unit 821 transmits a first polarization plate 4215*e*, and is caused to be the luminous flux perpendicular to the paper surface only. The divergent light reflected at the polarization beam splitter 4215*f* is incident on the optical element 4215*b*.

The optical element 4215*b* is, for example, a toric surface reflecting mirror, an aspherical surface concave mirror, or a toric surface concave mirror. When the distance from a point light source position (a light emitting point of the sight) to a reflection surface of the concave mirror and the focal distance of the concave mirror are made equal, the reflection luminous flux from the concave mirror becomes collimated light. The concave mirror is a cemented negative lens group configured from positive and negative meniscus lenses, and a dielectric multilayer film, in which S polarization of the sighted luminous flux is 50% reflected, P polarization 100% transmits, and the luminous flux from the object transmits with no polarization, is applied to the reflection surface of the optical element 4215*b* closest to the image plane. Collimated light reflected at the optical element 4215*b* transmits the eyepiece part 4215*c* and a protection glass 4215*h*, and the user can view the image. Similarly, the luminous flux of the built-in display unit 4215*a* transmits a second polarization plate 4215*g*, and the luminous flux parallel with the paper surface transmits the polarization beam splitter 4215*f*. The luminous flux reflected at the optical element 4215*b* (concave mirror) transmits the eyepiece part 4215*c* and the protection glass 4215*h*, and the user can view the image displayed on the built-in display unit 4215*a*. A user operation superimposes luminous flux to be sighted on the screen displayed in the built-in display unit 4215*a*. Alternatively, display of the built-in display unit 4215*a* is turned OFF, and the light source unit 821 may be operated. The object can be targeted with the sighting luminous flux in the finder. As a result, capturing of an image can be performed without viewing the live view display (live view image). Note that it is more preferable to provide tilt and shift movement in the up and down direction with respect to the finder frame in the light source unit 821.

As illustrated in FIG. 44, the photographer can visually recognize the visual field area of the imaging apparatus 4000 through the optical element 4215*b*. In this case, as illustrated in FIG. 45, the display controller 4225*c* causes the built-in display unit 4215*a* to display a reduced image M411 that is a reduced live view image corresponding to the image data generated by the imaging element 4203 in a display area W411 corresponding to the shading part 4215*d*, and causes the built-in display unit 4215*a* to display a frame T41 corresponding to the angle of view calculated by the angle of view calculation unit 4225*a*. At this time, a display image of the built-in display unit 4215*a* is projected to the optical element 4215*b*, and thus the display image displayed in the built-in display unit 4215*a* can produce a virtual image of the frame T41 in the visual field area of the imaging apparatus 4000 or in the vicinity of the visual field area. Accordingly, desired framing can be performed with respect to the object A41 that is the luminous flux from the object illustrated in FIG. 46 by setting sights on the desired object A41 with the frame T41. Further, as illustrated in FIG. 46, the photographer can confirm the composition of the reduced image M411 that can be actually captured while setting sights on the object A41 with the frame T41, while confirming the object with a wide field of view of the visual field area through the eyepiece part 4215*c* and the optical element 4215*b*. Accordingly, even if the imaging apparatus 4000 performs telephoto capturing, the photographer can perform framing with respect to the object A41 while setting sights on the desired object A41.

In this case, the built-in display unit 4215*a* represents the eyepiece display unit 4215 used for an electronic finder (EVF). To be specific, the eyepiece display unit 4215, a tri-color LED, or a white LED joined to the light guiding plate is used as the light source unit 821 of the backlight. The light source unit 821 is the built-in display unit 4215*a* in which the polarization plate (P or S polarization) 4215*e* that transmits the light only in one direction and the transmission type display element with color filter (liquid crystal display) are joined through a frame-shaped (picture frame) support member (fixed to the body unit) having an opening part. When the built-in display unit 4215*a* is driven, the display image can be observed through the eyepiece part 4215*c* and the protection glass 4215*h*.

Here, when the reflection type display element (liquid crystal display) is used, the light amount may be reduced because the polarized light from the light source unit 821 passes through the color filters twice, and the large built-in display unit 4215*a* may be required because the polarization beam splitter 4215*f* intervenes.

As described above, the transmission type display element (liquid crystal display) is used for the built-in display unit 4215*a*, and the user can switch an electronic finder (EVF) and an optical finder (OVF) according to the use, and therefore, the convenience can be enhanced. The built-in display unit 4215*a* goes close to the eyepiece part 4215*c*, and the reflection surface of the optical element 4215*b* is formed into a free-form surface or a toric surface, whereby downsizing of the built-in display unit 4215*a* become possible.

Referring back to FIG. 42, description is continued.

In step S2101, when the imaging apparatus 4000 is not set to a shooting mode (step S2101: No), when the imaging apparatus 4000 is set to the playback mode (step S2115: Yes), the imaging apparatus 4000 execute playback display processing of play backing the image data recorded in the recording medium 4219 (step S2116). After step S2116, the imaging apparatus 4000 proceeds to step S2109.

In step S2101, when the imaging apparatus 4000 is not set to the shooting mode (step S2101: No), when the imaging apparatus 4000 is not set to the playback mode (step S2115: No), the imaging apparatus 4000 proceeds to step S2109.

According to the eleventh embodiment of the present invention described above, the optical element 4215b transmits the light from the visual field area of the imaging apparatus 4000, and reflects the information displayed by the built-in display unit 4215a toward the back side opposite to the front of the imaging apparatus 4000. Therefore, a virtual image of the information displayed by the built-in display unit 4215a is produced in the visual field area of the imaging apparatus 4000. Therefore, a desired object can be sighted on at telephoto shooting.

Further, according to the eleventh embodiment of the present invention, the display controller 4225c causes the built-in display unit 4215a to display the frame according to the angle of view of the lens unit 4300, the photographer can capture an image while confirming framing of the object with the eyepiece display unit 4215.

Further, according to the eleventh embodiment of the present invention, the display controller 4225c causes the built-in display unit 4215a to display the live view image corresponding to the image data generated by the imaging element 4203. Therefore, framing to the object can be intuitively recognized.

Further, according to the eleventh embodiment of the present invention, the display controller 4225c causes the built-in display unit 4215a to display the reduced live view image in the display area corresponding to the area of the shading part 4215d that shades a part of the optical element 4215b. Therefore, the photographer can capture a desired object while confirming the composition of the object to be actually captured through the optical element 4215b even at telephoto capturing.

Note that, in the eleventh embodiment of the present invention, the display controller 4225c may correct the shape of the image to be displayed in the built-in display unit 4215a based on curved surface of the optical element 4215b. In this case, the display controller 4225c applies trapezoidal correction processing to the image to be displayed in the built-in display unit 4215a, and causes the built-in display unit 4215a to display the image. Further, the display controller 4225c may apply aberration correction to correct an aberration to the image to be displayed in the built-in display unit 4215a based on the parallax between the optical axis O1 of the lens unit 4300 and the optical axis O2 of the eyepiece display unit 4215, and causes the built-in display unit 4215a to display the image.

Twelfth Embodiment

Next, a twelfth embodiment of the present invention will be described. An imaging apparatus according to the twelfth embodiment has a different configuration from the configuration of the eyepiece display unit of the imaging apparatus according to the eleventh embodiment and different processing from the processing executed by the imaging apparatus. Therefore, hereinafter, a configuration of an eyepiece display unit of an imaging apparatus according to the twelfth embodiment will described, and then, processing executed by the imaging apparatus according to the twelfth embodiment will be described. Note that the same configuration as the imaging apparatus 4000 of the eleventh embodiment will be denoted with the same reference sign, and description is omitted.

Figure 47:
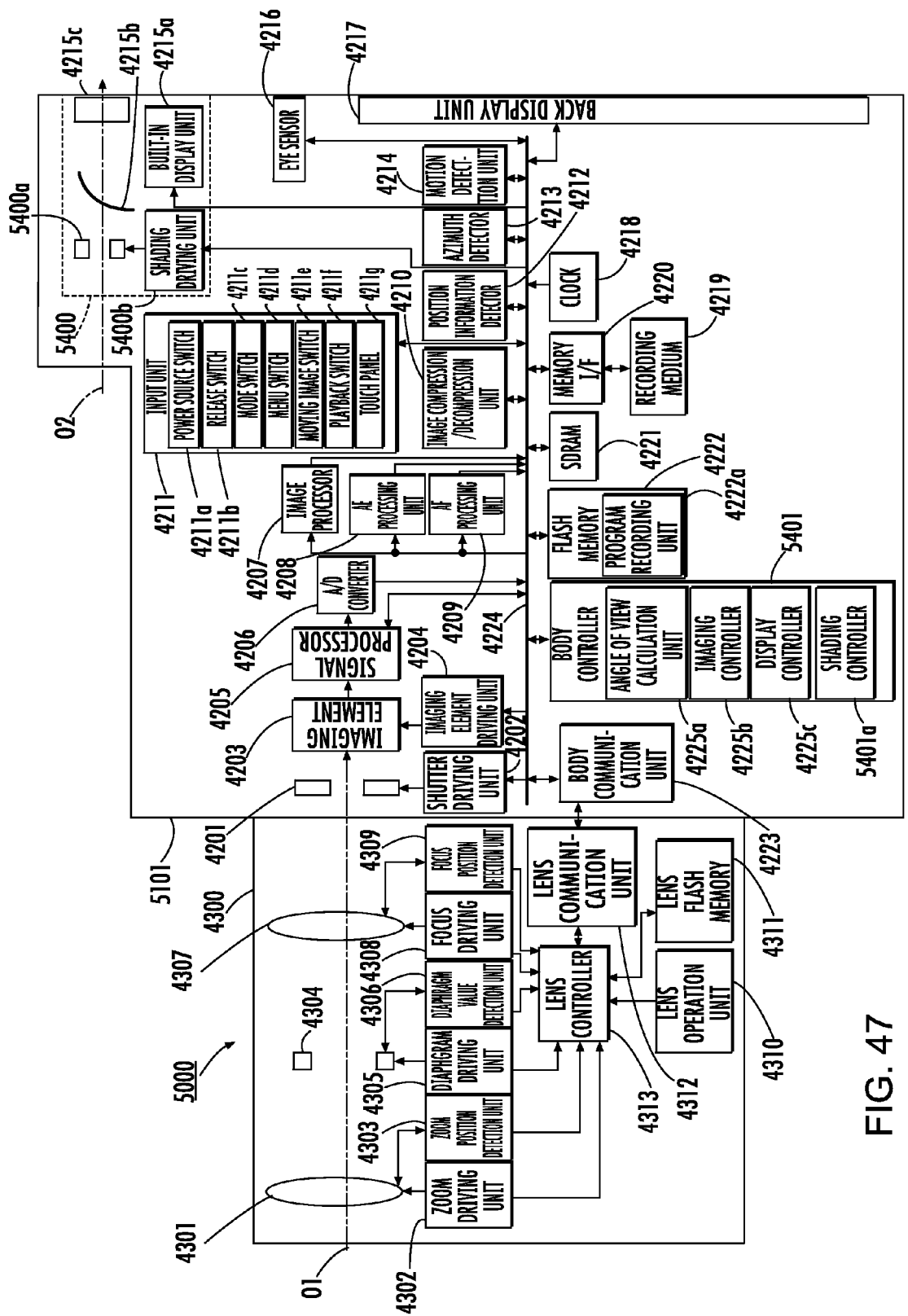
FIG. 47 is a block diagram illustrating a function configuration of an imaging apparatus according to a twelfth embodiment of the present invention.

FIG. 47 is a block illustrating a function configuration according to the twelfth embodiment of the present invention. An imaging apparatus 5000 illustrated in FIG. 47 includes a body unit 5101 and a lens unit 4300.

The body unit 5101 includes a shutter 4201, a shutter driving unit 4202, an imaging element 4203, an imaging element driving unit 4204, a signal processor 4205, an A/D converter 4206, an image processor 4207, an AE processing unit 4208, an AF processing unit 4209, an image compression/decompression unit 4210, an input unit 4211, a position information detector 4212, an azimuth detector 4213, a motion detection unit 4214, an eye sensor 4216, a back display unit 4217, a clock 4218, a recording medium 4219, a memory I/F 4220, an SDRAM 4221, a flash memory 4222, a body communication unit 4223, a bus 4224, an eyepiece display unit 5400, and a body controller 5401.

The eyepiece display unit 5400 includes a built-in display unit 4215a, an optical element 215b, an eyepiece part 4215c, a shading unit 5400a, and a shading driving unit 5400b.

The shading unit 5400a is provided on an optical axis O2 of the eyepiece display unit 5400, and at the front of the optical element 215b. The shading unit 5400a is retractably provided on the optical axis O2, and switches the optical element 215b into a light-shading state and a state where the light from the visual field area of the imaging apparatus 5000 is transmittable. The shading unit 5400a is configured from a mechanical shutter a liquid crystal shutter, or the like.

The shading driving unit 5400b moves the shading unit 5400a on the optical axis O2 of the eyepiece display unit 5400 under control of the body controller 5401. The shading driving unit 5400b is configured from a stepping motor, a DC motor, and the like.

The body controller 5401 centrally controls the operation of the imaging apparatus 5000 by transferring instructions and data to respective units that configure the imaging apparatus 5000. The body controller 5401 is configured from a CPU and the like. The body controller 5401 includes an angle of view calculation unit 4225a, an imaging controller 2425b, a display controller 4225c, and a shading controller 5401a.

When an instruction signal to shade light from the visual field area of the imaging apparatus 5000 is input from the input unit 211, the shading controller 5401a drives the shading driving unit 5400b, and causes the shading unit 5400a to shade the light from the visual field area of the imaging apparatus 5000.

Figure 48:
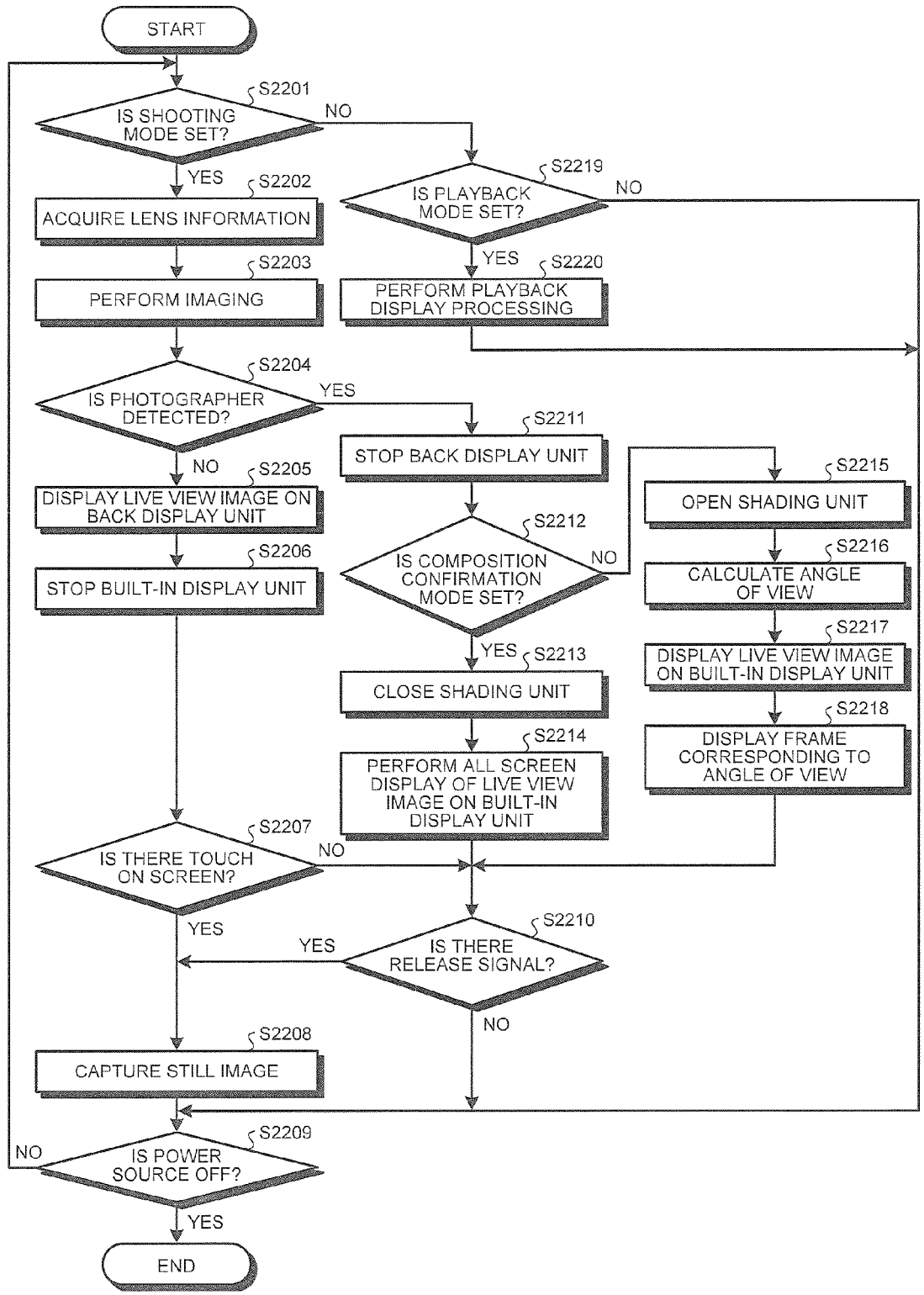
FIG. 48 is a flowchart illustrating an outline of processing executed by the imaging apparatus according to the twelfth embodiment of the present invention.

Processing executed by the imaging apparatus 5000 having the above configuration will be described. FIG. 48 is a flowchart illustrating an outline of the processing executed by the imaging apparatus 5000.

As illustrated in FIG. 48, steps S2201 to S2211 respectively correspond to steps S2101 to S2111 of FIG. 42.

In step S2212, the body controller 5401 determines whether a composition confirmation mode is set to the imaging apparatus 5000. To be specific, when the eye sensor 4216 detects the photographer, the body controller 5401 determines whether an instruction signal is input from the lens operation unit 4310, or a selection instruction signal to select an icon displayed by the back display unit 4217 through the touch panel 4211g is input. When the body controller 5401 determines that the composition confirmation mode is set to the imaging apparatus 5000 (step S2212: Yes), the imaging apparatus 5000 proceeds to step S2213 described below. In contrast, when the body controller 5401 determines that the composition confirmation mode is not set to the imaging apparatus 5000 (step S2212: No), the imaging apparatus 5000 proceeds to step S2215 described below.

Figure 49:
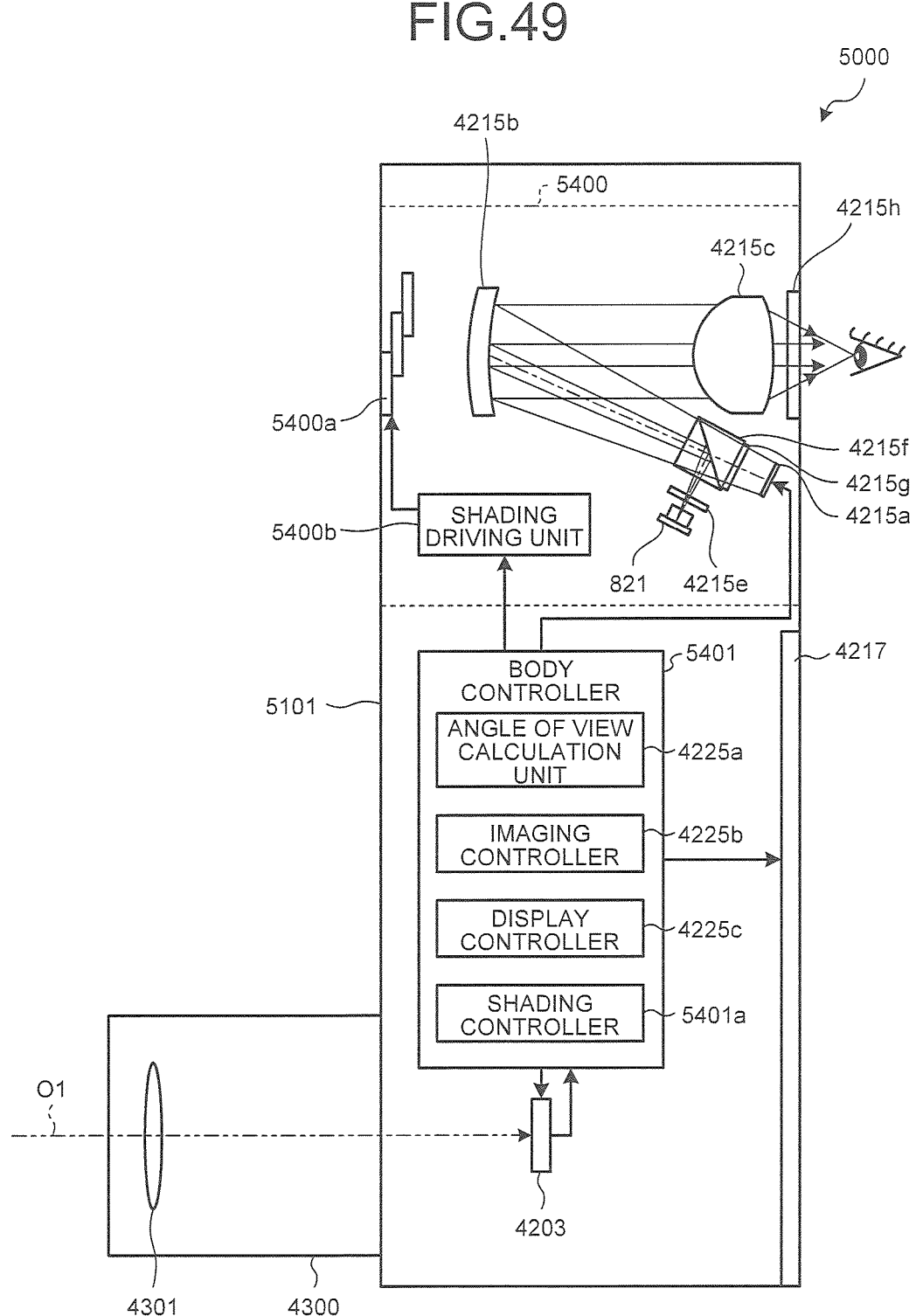
FIG. 49 is diagram schematically illustrating a state when capturing an image of an object while confirming framing of the object by an eyepiece display unit of the imaging apparatus according to the twelfth embodiment of the present invention.

In step S2213, the shading controller 5401a causes the shading unit 5400a (see FIG. 49) to be closed by driving the shading driving unit 5400b. Accordingly, the photographer cannot visually recognize the visual field area of the imaging apparatus 5000 through the optical element 4215b.

Figure 50:
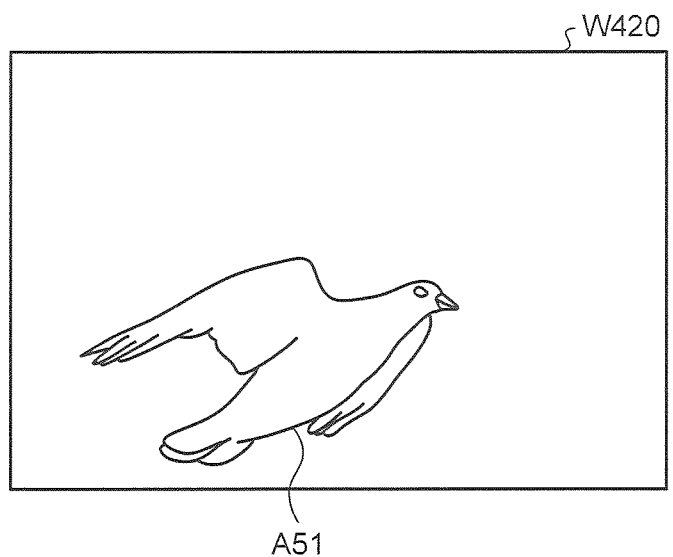
FIG. 50 is a diagram illustrating an example of an image visually recognized by the photographer through the eyepiece unit under a state illustrated in FIG. 49.

Next, the display controller 4225c causes the built-in display unit 4215a to perform full screen display of the live view image corresponding to the image data generated by the imaging element 4203 (step S2214). To be specific, as illustrated in FIG. 50, the display controller 4225c causes the built-in display unit 4215a to display the live view image W420 corresponding to the image data generate by the imaging element 4203. This enables the photographer to confirm the composition of an object A51 through the eyepiece display unit 5400. After step S2214, the imaging apparatus 5000 proceeds to step S2210.

Figure 51:
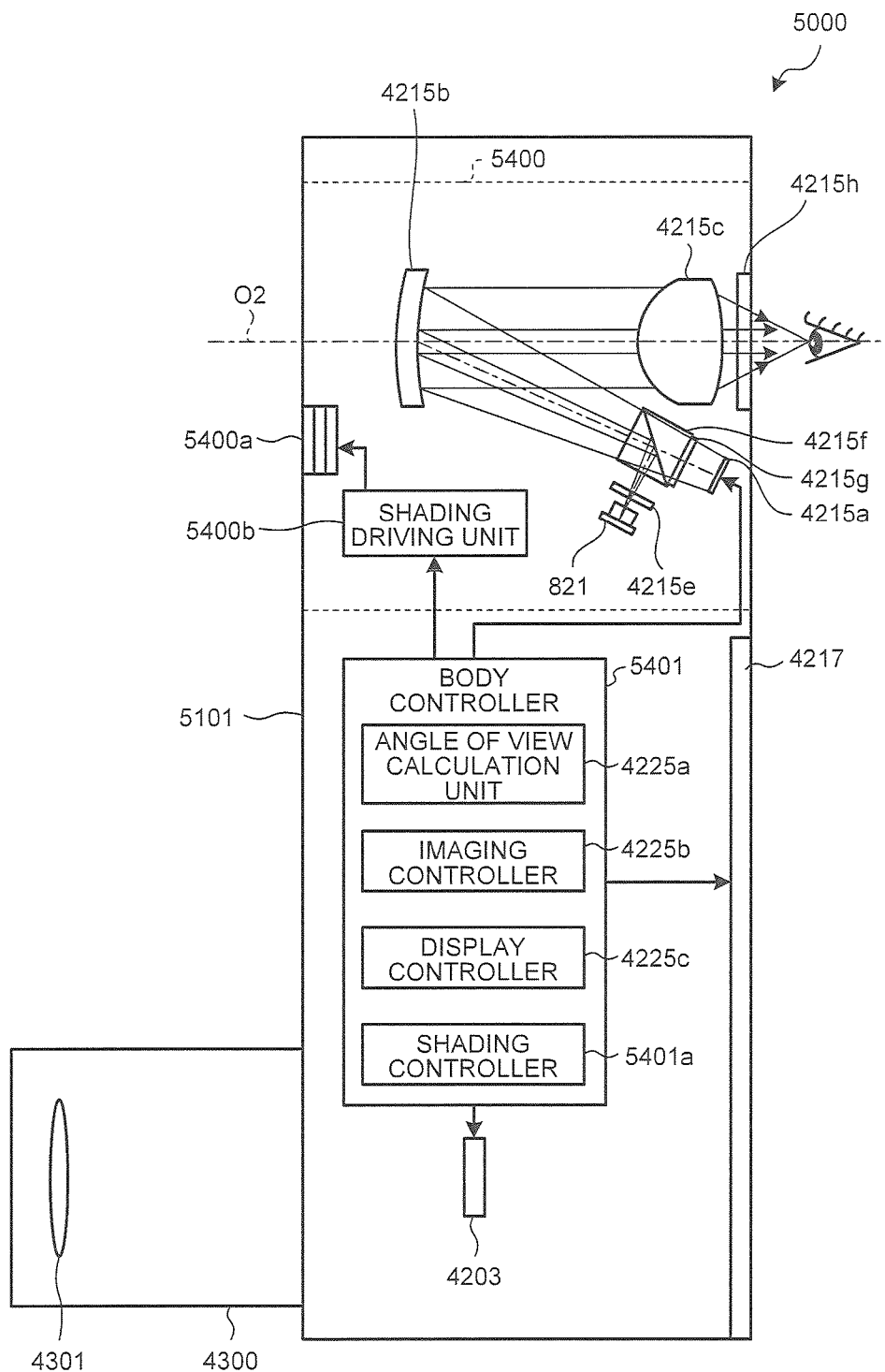
FIG. 51 is a diagram schematically illustrating a state when capturing an image of an object while confirming framing of the object by the eyepiece display unit of the imaging apparatus according to the twelfth embodiment of the present invention.
Figure 52:
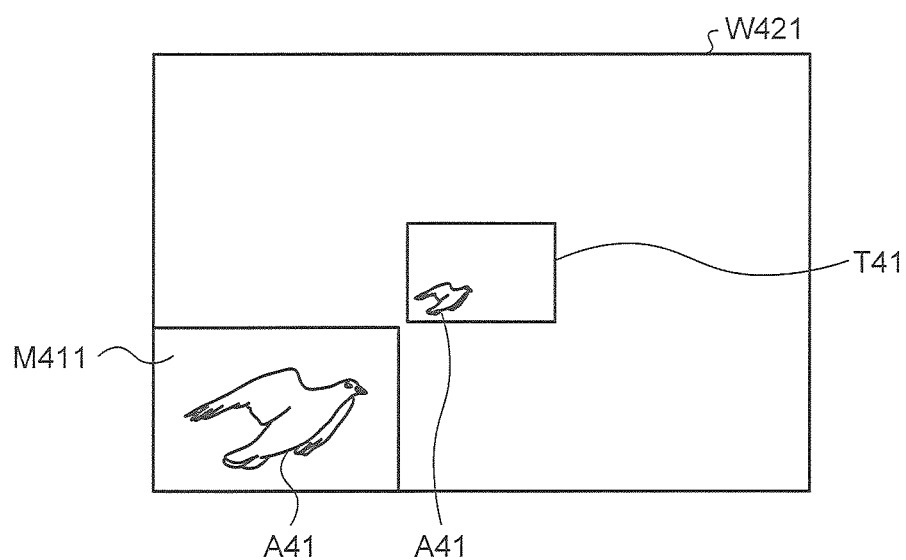
FIG. 52 is a diagram illustrating an example of an image visually recognized by the photographer through the eyepiece display unit under the state illustrated in FIG. 51.

In step S2215, the shading controller 5401a causes the shading unit 5400a to open by driving the shading driving unit 5400b (see FIG. 51). This enables the photographer to sets sights on a desired object A41 using a frame T41 corresponding to the angle of view of the lens unit 4300 while confirming the object A41 in the visual field area of the imaging apparatus 5000 through the optical element 4215b, as illustrated in FIG. 52.

Steps S2216 to S2220 respectively correspond to steps S2112 to S2116 of FIG. 42.

According to the twelfth embodiment of the present invention, the display controller 4225c causes the built-in display unit 4215a to display a frame according to the angle of view of the lens unit 4300, whereby the photographer can capture an image while confirming framing of the object with the eyepiece display unit 5400.

Thirteenth Embodiment

Next, a thirteenth embodiment of the present invention will be described. An imaging apparatus according to the thirteenth embodiment has different configurations to the configurations of the flash memory and the body controller of the imaging apparatus 5000 of the twelfth embodiment, and different processing from the processing executed by the imaging apparatus 5000. Therefore, hereinafter, configurations of a flash memory and a body controller according to the thirteenth embodiment will be described first, and then, processing executed by the imaging apparatus according to the thirteenth embodiment will be described. Note that the same configuration as the imaging apparatus 5000 of the eleventh embodiment is denoted with the same reference sign, and description is omitted.

Figure 53:
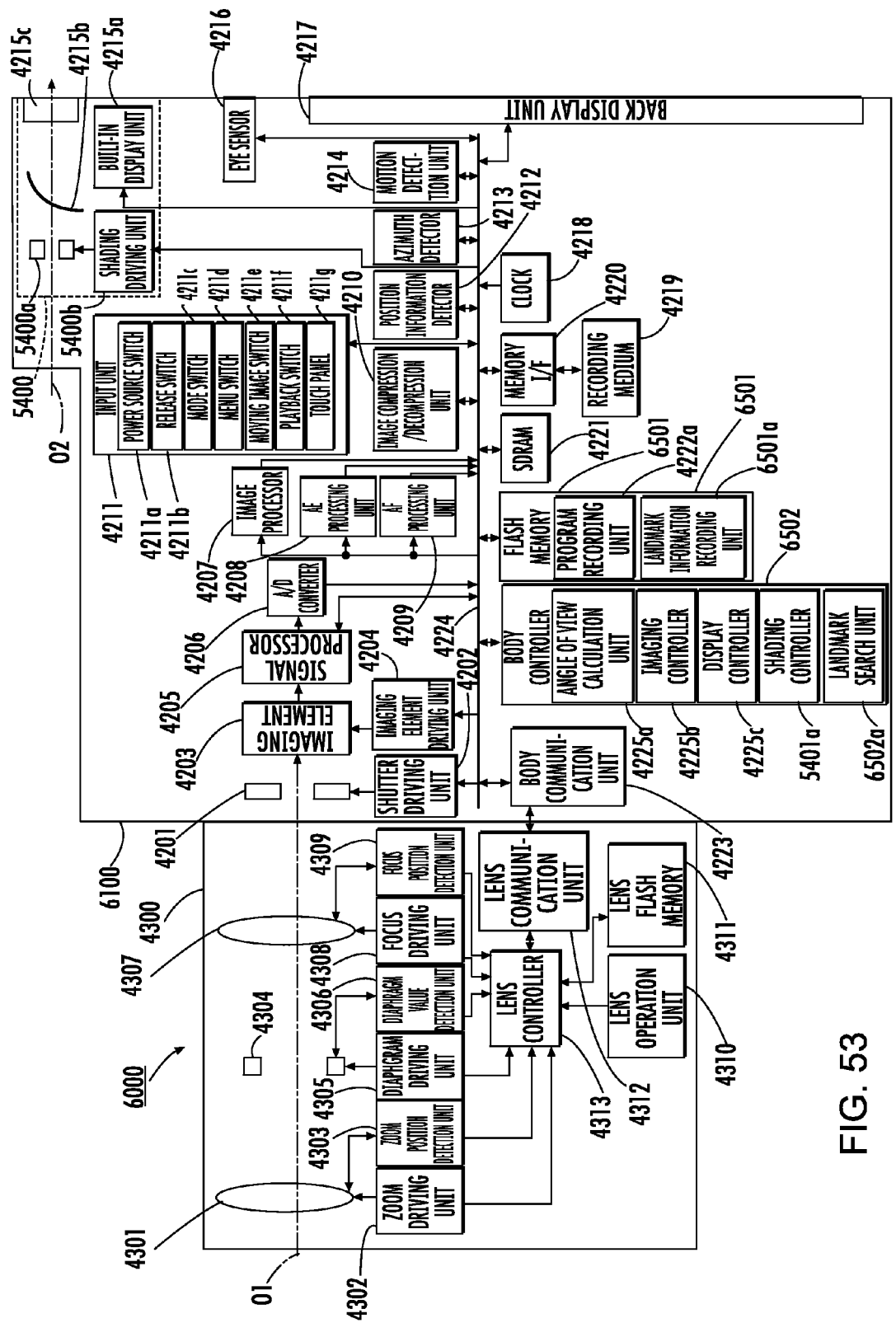
FIG. 53 is a block diagram illustrating a function configuration of an imaging apparatus according to a thirteenth embodiment of the present invention.

FIG. 53 is a block diagram illustrating a function configuration of an imaging apparatus according to the thirteenth embodiment of the present invention. An imaging apparatus 6000 illustrated in FIG. 53 includes a body unit 6100 and a lens unit 4300.

The body unit 6100 includes a shutter 4201, a shutter driving unit 4202, an imaging element 4203, an imaging element driving unit 4204, a signal processor 4205, an A/D converter 4206, an image processor 4207, an AE processing unit 4208, an AF processing unit 4209, an image compression/decompression unit 4210, an input unit 4211, a position information detector 4212, an azimuth detector 4213, a motion detection unit 4214, an eye sensor 4216, a back display unit 4217, a clock 4218, a recording medium 4219, a memory I/F 4220, an SDRAM 4221, a body communication unit 4223, a bus 4224, an eyepiece display unit 5400, a flash memory 6501, and a body controller 6502.

The flash memory 6501 includes a program recording unit 4222a, and a landmark information recording unit 6501a. The landmark information recording unit 6501a records position information, azimuth information, names, elevation, and the like of a plurality of landmarks, and landmark image data in association with each other. Here, the landmark image data is any of image data that captures a landmark, thumbnail image data, a deformation image, a letter, and a photograph. Further, the azimuth information is an azimuth of a landmark as viewed from a specified capturing position, for example, north, south, and the like. Further, the position information is the longitude and latitude of a landmark.

The body controller 6502 centrally controls the operation of the imaging apparatus 6000 by transferring instructions and data to respective units that configure the imaging apparatus 6000. The body controller 6502 is configured from a CPU, and the like. The body controller 6502 includes an angle of view calculation unit 4225a, a shading controller 5401a, an imaging controller 4225b, a display controller 4225c, and a landmark search unit 6502a.

The landmark search unit 6502a detects landmark information of a landmark appearing in the image corresponding to the image data generated by the imaging element 4203 based on the position information acquired by the position information detector 4212 and the azimuth information detected by the azimuth detector 4213.

Processing executed by the imaging apparatus 6000 having the above configuration will be described. FIG. 54 is a flowchart illustrating an outline of the processing executed by the imaging apparatus 6000.

As illustrated in FIG. 54, steps S2301 to S2315 respectively correspond to steps S2201 to S2215 of FIG. 48.

In step S2316, the landmark search unit 6502a acquires the position information detected by the position information detector 4212, the azimuth information detected by the azimuth detector 4213, and an elevation angle detected by the motion detection unit 4214.

Next, the angle of view calculation unit 4225a calculates an angle of view of the current lens unit 4300 based on the lens information acquired from the lens unit 4300 (step S2317).

Following that, the landmark search unit 6502a determined a landmark in the maximum angle of view (wide end) of the lens unit 4300 (step S2318), and acquires landmark information of the determined landmark from the landmark information recording unit 6501a (step S2319).

Next, the display controller 4225c displays the landmark information acquired by the landmark search unit 6502a from the landmark information recording unit 6501a in the built-in display unit 4215a (step S2320), and displays a frame corresponding to the current angle of view of the lens unit 4300 calculated by the angle of view calculation unit 4225a in the built-in display unit 4215a (step S2321).

Figure 55A:
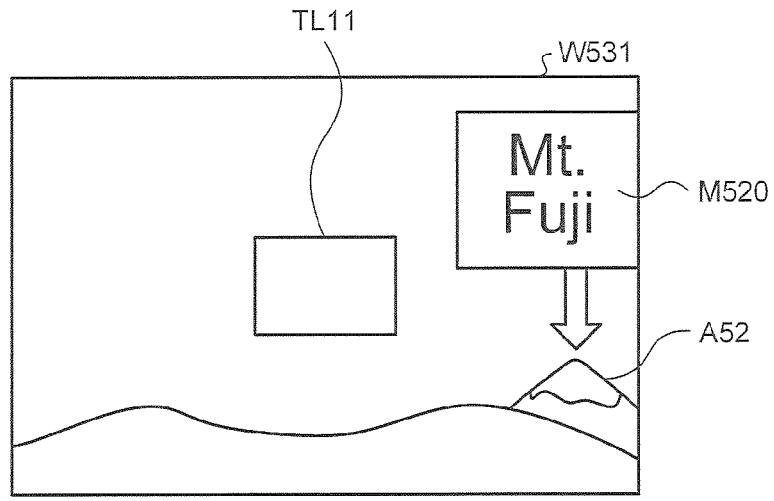
FIG. 55A is a diagram illustrating an example of an image visually recognized by the photographer through an eyepiece display unit.
Figure 55B:
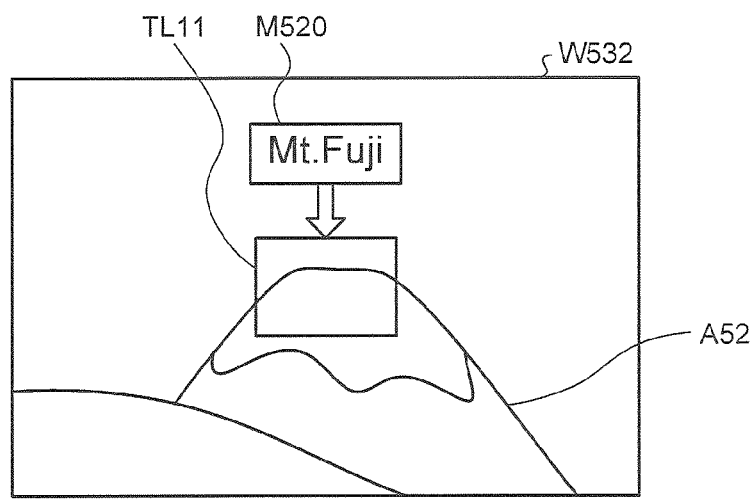
FIG. 55B is a diagram illustrating an example of an image visually recognized by the photographer through an eyepiece display unit.
Figure 55C:
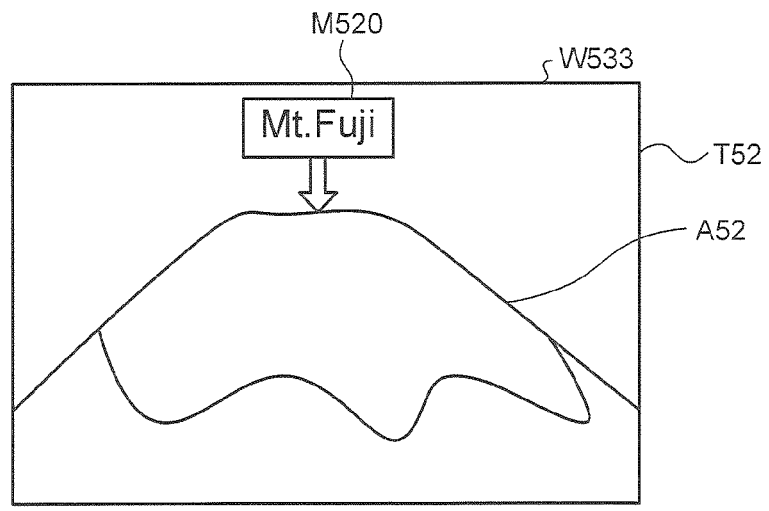
FIG. 55C is a diagram illustrating an example of an image visually recognized by the photographer through an eyepiece display unit.

FIGS. 55A to 55C are diagrams illustrating examples of images visually recognized by the photographer through the eyepiece display unit 5400. As illustrated in FIG. 55A, the display controller 4225c causes the built-in display unit 4215a to display the landmark information M520 acquired by the landmark search unit 6502a and a frame T11 corresponding to the angle of view of the lens unit 4300. In this case, the display controller 4225c causes the built-in display unit 4215a to display the landmark information M520 in the display area in the vicinity of the object A52 as a landmark based on the position information detected by the position information detector 4212, the azimuth information detected by the azimuth detector 4213, and the elevation angle detected by the motion detection unit 4214. This enables the photographer to intuitively recognize the landmark in the visual field area of the imaging apparatus 6000 through the eyepiece display unit 5400.

Further, the photographer can capture the object A52 using desired framing (image W531→image W532→image W533) by moving the imaging direction of the imaging apparatus 6000 to adjust the frame T4 to the object A52, and operating the lens operation unit 4310 to change the angle of view of the lens unit 4300 (FIG. 55A→FIG. 55B→FIG. 55C). In this case, the display controller 4225c may cause the built-in display unit 4215a to display only the landmark information according to an instruction signal output from the input unit 4211.

Further, the display controller 4225c may select a landmark in the visual field area of the imaging apparatus 6000 and cause the built-in display unit 4215a to display the landmark information based on the type of the landmark and the distance from the landmark to the imaging apparatus 6000. For example, in a case of a 3000 m-high mountain, the display controller 4225c may select the area up to 100 km, and causes the built-in display unit 4215a to display the mountain, and in a case of a 1000 m-high mountain, the display controller 4225c may select the area up to 50 km, and causes the built-in display unit 4215a to display the mountain. After step S2321, the imaging apparatus 6000 proceeds to step S2310.

Steps S2323 and S2324 respectively correspond to steps S2219 and S2220 of FIG. 48.

According to the thirteenth embodiment of the present invention, the display controller 4225c causes the built-in display unit 4215a to display a frame according to the angle of view of the lens unit 4300. Therefore, the photographer can capture an image while confirming framing of an object with the eyepiece display unit 5400.

Further, according to the thirteenth embodiment of the present invention, the display controller 4225c causes the built-in display unit 4215a to display the landmark information searched by the landmark search unit 6502a from the landmark information recording unit 6501a. Therefore, the photographer can intuitively recognize the landmark appearing in the angle of view of the lens unit 4300 while confirming framing of the object with the eyepiece display unit 5400.

Note that, in the thirteenth embodiment of the present invention, the display controller 4225c may adjust the brightness of the built-in display unit 4215a and the size of the frame based on the brightness of the visual field area. Accordingly, the object can be sighted with optimum brightness for the environment of the imaging apparatus 6000.

Further, in the thirteenth embodiment of the present invention, the display controller 4225c may change the position of the frame corresponding to the angle of view of the lens unit 4300 according to the instruction signal input from the input unit 4211. Accordingly, the parallax between the optical axis O1 of the lens unit 4300 and the optical axis of the eyepiece display unit 4215 can be corrected.

Further, in the thirteenth embodiment of the present invention, the display controller 4225c may change the color or the shape of the frame corresponding to the angle of view for each the type of object, for example, for each face or animal, and causes the built-in display unit 4215a to display the image.

Further, in the in the thirteenth embodiment of the present invention, the display controller 4225c may cause the built-in display unit 4215a to display the luminous flux according to the angle of view of the lens unit 4300 in an AF region of the imaging apparatus 6000.

In the thirteenth embodiment of the present invention, a half mirror is used as the optical element 4215b. However, for example, a light guiding plate configured from a holographic element in which a dielectric multilayer film is provided, a prism, and the like may be combined to configure the optical element 4215b.

Other Embodiment

Further, the imaging apparatus according to the present embodiment can be applied to a digital single lens reflex camera, the lens of which is detachable, a digital video camera, and electronic devise such as a mobile phone having an imaging function, and a tablet type mobile device, other than the display-body integrated type digital camera.

Further, the imaging apparatus according to the present embodiment does not necessarily need to have a lens unit in which a flash light emitting unit and an optical sight unit are integrated, and the flash light emitting unit and the optical sight unit can be applied when they have a mechanism of individually popping up.

Further, in the present embodiment, a slit may be provided between a light source unit and a reflecting optical element, and a sighting mark by which the luminous flux emitted by an optical sight unit can be visually recognized may be formed by the shape of the slit.

Further, in the present embodiment, the light source unit may be configured from a laser light source that emits five laser lights (multi beam) capable of displaying cross and the like. In this case, when an optical system in which four light beams having a cylindrical effect and a circular light beam are combined is further provided, this optical system is complicated and the cost is increased. Therefore, an optical filter that projects a reticle pattern may just be formed as a part of the reflection surface of the transparent substrate of the light guiding unit. Further, a reticle (angle of view scale) including sighting marks made of a cross and the like is provided. Laser light is used to illuminate the reticle, and illumination light therefrom is concentrated on the center of a dot pattern. Accordingly, the sighting light emitted from the light source unit can be displayed by four types: saturn, master cross, dot, and cross.

Further, the imaging apparatus according to the present embodiment can be applied to a digital camera, a digital single lens reflex camera, a digital video camera, and the like, the display unit of which is rotatable with respect to the back of the body unit, other than the display-body integrated type digital camera.

Further, the programs executed by the imaging apparatus according to the present embodiment can be recorded in a computer-readable recording medium such as a CD-ROM, a flexible disk (FD), a CD-R, a digital versatile disk (DVD), a USB medium, a flash memory, and the like by an installable format or executable file data, and is provided Further, the programs executed by the imaging apparatus according to the present embodiment may be recorded in a flash memory, a recording medium, and the like by being downloaded through a network. Further, the programs executed by the imaging apparatus according to the present invention may be provided or distributed through a network such as the internet.

Note that, in the description of the flowcharts in the present specification, the context of the processing among the steps is clearly indicated using the description such as "first", "following that", and "next". However, the order of the processing necessary for implementing the present invention is not uniquely determined by these expressions. Further effects and modifications can be easily arrived at by a person skilled in the art. Therefore, broader embodiments of the present invention are not limited by specific details or representative embodiments as expressed and described above. Therefore, various modifications can be made without departing from the spirit and the scope of the invention as a whole defined by the attached claims and its equivalents.

[Note 1]

A display device including an imaging optical system provided at a front side facing an object, the display device including:

a display unit configured to display information on the imaging optical system; and an optical element configured to allow light from a visual field area collected by the imaging optical system to transmit, and to produce a virtual image of the information in an area where the light from the visual field area transmits.

[Note 2]

The display device according to Note 1, wherein the imaging optical system includes a zoom optical system capable of changing an angle of view, and the information includes at least angle of view information related to the angle of view of the imaging optical system.

[Note 3]

An imaging apparatus including: the display device according to Note 1;

an imaging unit configured to generate image data by receiving light collected from the visual field area by the imaging optical system, and performing photoelectric conversion; and a display controller configured to cause the display unit to display an image corresponding to the image data generated by the imaging unit.

[Note 4]

The imaging apparatus according to Note 3, wherein the display controller reduces the image and causes the display unit to display the image.

[Note 5]

The imaging apparatus according to Note 3, further including:

a shading, unit provided at a front side of the optical element and configured to shade a part of the light from the visual field area, wherein the display controller reduces the image and displays the image in a display area of the display unit corresponding to an area where the shading unit is provided.

[Note 6]

The imaging apparatus according to Note 3, further including:

a shading unit provided at a front side of the optical element and configured to switch between a light-shading state that shades light from the visual field area and a transmitting state that transmit light from the visual field area;

a shading driving unit configured to drive the shading unit;

an input unit configured to receive an input of an instruction signal to shade the light from the visual field area; and a shading controller configured to drive the shading driving unit and to cause the shading unit to shade the light from the visual field area, when the instruction signal is input from the input unit, wherein the display controller causes the display unit to perform full screen display to display the image when the shading unit shades the light from the visual field area.

[Note 7]

The imaging apparatus according to Note 3, further including:

an angle of view calculation unit configured to calculate an angle of view of the imaging optical system, wherein the display controller causes the display unit to display the information with a size corresponding to the angle of view calculated by the angle of view calculation unit.

[Note 8]

The imaging apparatus according to Note 3, further including:

a landmark information recording unit configured to record landmark information including names, position information, and azimuth information of a plurality of landmarks;

a position information detector configured to detect position information of the imaging apparatus;

an azimuth detector configured to detect azimuth information of the imaging apparatus where a direction that an optical axis of the imaging optical system faces the visual field area is a reference azimuth, when the optical axis of the imaging optical system is approximately horizontal;

a landmark search unit configured to search the landmark recording unit for a landmark in the visual field area based on the position information detected by the position information detector and the azimuth information detected by the azimuth detector, wherein the display controller causes the display unit to display the landmark information on the landmark detected by the landmark search unit.

[Note 9]

The imaging apparatus according to Note 3, further including:

a back display unit configured to display an image corresponding to the image data generated by the imaging unit; and a detection unit configured to detect proximity of a photographer to the imaging apparatus, wherein when the detection unit detects the proximity of the photographer, the display controller causes the display unit to display the image, and when the detection unit does not detect the proximity of the photographer, the display controller causes the back display unit to display the image.

[Note 10]

An imaging apparatus including:

an electronic finder for observing luminous flux of an object through an objective lens and an eyepiece lens;

a shading member configured to control transmission and shading of the luminous flux of the object guided to eyes of an observer; and a built-in display unit including a transmission type liquid crystal display element, wherein the imaging apparatus is configured to control the shading member to shade the luminous flux of the object when observing an image displayed on the built-in display unit, the objective lens is a reflection type concave mirror, and when observing the luminous flux of the object, the imaging apparatus controls the shading member to allow the luminous flux of the object to transmit, and causes a light source of an optical sight to emit light, and direct the luminous flux of the object and the luminous flux of the light source to the eyes of the observer.

[Note 11]

The imaging apparatus according to Note 10, wherein emission of the light source is operated when a focal distance of an imaging lens is a specified value or more (under telephoto state).

[Note 12]

The imaging apparatus according to Note 10, further including a polarization beam splitter arranged between the built-in display unit and the reflection type concave mirror, wherein the luminous flux from the light source of the optical sight and the luminous flux from the built-in display unit are guided to the reflection type concave mirror.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imager that receives light collected from an object area through an imaging optical system provided at a front side facing an object, and to generate image data;
    a body including the imager and a shaft;
    an optical sight including a light source for emitting luminous flux, and an optical reflector that allows light from the object area to transmit and reflect the luminous flux emitted by the light source toward a back side opposite to the front, the optical sight produces a virtual image of the luminous flux emitted by the light source in the object area or near the object area;
    a flash light emitter that irradiates the object area with illumination light;
    a leg that is pivotally supported on the body and holds the flash light emitter and the optical sight such that the leg is rotatable around the shaft in a direction away from the body and in a direction perpendicular to an optical axis of the imaging optical system, at startup of the optical sight; and
    a pair of position detectors that detect a position of the imaging apparatus, the position detectors being provided in the leg and at positions symmetrical to the optical axis of the imaging optical system.

2. The imaging apparatus according to claim 1, further comprising a vibrator provided in the leg to add a vibration to the optical reflector.

3. The imaging apparatus according to claim 1, further comprising a display rotatably provided to the body from a back side of the imaging apparatus to a front side of the imaging apparatus to display an image corresponding to the image data generated by the body.

4. An imaging apparatus comprising:
    an imager that receives light collected from an object area through an imaging optical system provided at a front side facing an object, and to generate image data;
    a body including the imager and a shaft;
    an optical sight including a light source for emitting luminous flux, and an optical reflector that allows light from the object area to transmit and reflect the luminous flux emitted by the light source toward a back side opposite to the front, the optical sight produces a virtual image of the luminous flux emitted by the light source in the object area;
    a flash light emitter that irradiates the object area with illumination light;
    a leg that is pivotally supported on the body and holds the flash light emitter and the optical sight such that the leg is rotatable around the shaft in a direction away from the body and in a direction perpendicular to an optical axis of the imaging optical system, at startup of the optical sight;
    an object detector that detects the object in an image corresponding to the image data generated by the imager;
    an angle of view determinator that determines whether the object detected by the object detector is in an angle of view of the imaging optical system while the optical sight is producing the virtual image; and
    an output that outputs a warning indicating that the object falls outside the angle of view when the angle of view determinator determines that the object is not in the angle of view.

5. The imaging apparatus according to claim 4, further comprising:
    a focal distance detector that detects a focal distance of the imaging optical system; and
    a sight controller configured to control driving of the optical sight according to a detection result detected by the focal distance detector.

6. The imaging apparatus according to claim 4, further comprising an input that receives an input of an instruction signal for setting the object in the image, wherein
    the object detector detects the object according to the instruction signal received by the input.

7. The imaging apparatus according to claim 4, wherein the output displays an image corresponding to the image data, and superimpose and display the warning on the image.

8. The imaging apparatus according to claim 4, wherein a characteristic of an image corresponding to the image data of the object satisfies a specific position condition.

9. The imaging apparatus according to claim 4, wherein the light source outputs the warning by intermittently emitting the luminous flux, or changing brightness of the luminous flux.

10. An imaging method comprising:
    providing an imaging apparatus comprising:
        an imager that receives light collected from an object area through an imaging optical system provided at a front side facing an object, and to generate image data;
        a body including the imager and a shaft;
        an optical sight including a light source for emitting luminous flux, and an optical reflector that allows light from the object area to transmit and reflect the luminous flux emitted by the light source toward a back side opposite to the front, the optical sight produces a virtual image of the luminous flux emitted by the light source in the object area or near the object area;
        a flash light emitter that irradiates the object area with illumination light; and
        a leg that is pivotally supported on the body and holds the flash light emitter and the optical sight such that the leg is rotatable around the shaft in a direction away from the body and in a direction perpendicular to an optical axis of the imaging optical system, at startup of the optical sight;
    receiving light collected from the object area through the imaging optical system provided at the front side facing the object to generate image data by the imager;

using the optical sight including the light source for emitting luminous flux, and the optical reflector for allowing light from the object area to transmit and reflect the luminous flux emitted by the light source toward the back side opposite to the front side to produce the virtual image of the luminous flux emitted by the light source in the object area or near the object area;

moving at least the optical reflector in a direction away from the body and in a direction perpendicular to the optical axis of the imaging optical system, at startup of the optical sight;

producing the virtual image of the luminous flux in the object area;

detecting the object in an image corresponding to the image data generated by the imager;

determining whether the object is in an angle of view of the imaging optical system while producing the virtual image; and outputting a warning indicating that the object falls outside the angle of view when the object is not in the angle of view.

11. A non-transitory computer-readable recording medium in which an executable program is recorded, the program causing a processor included in an imaging apparatus to perform an imaging process, comprising:

providing an imaging apparatus comprising:

an imager that receives light collected from an object area through an imaging optical system provided at a front side facing an object, and to generate image data;

a body including the imager and a shaft;

an optical sight including a light source for emitting luminous flux, and an optical reflector that allows light from the object area to transmit and reflect the luminous flux emitted by the light source toward a back side opposite to the front, the optical sight produces a virtual image of the luminous flux emitted by the light source in the object area or near the object area;

a flash light emitter that irradiates the object area with illumination light; and a leg that is pivotally supported on the body and holds the flash light emitter and the optical sight such that the leg is rotatable around the shaft in a direction away from the body and in a direction perpendicular to an optical axis of the imaging optical system, at startup of the optical sight;

producing the virtual image of the luminous flux in the visual field area;

detecting the object in an image corresponding to the image data generated by the imager;

determining whether all of the object are in an angle of view of the imaging optical system while producing the virtual image; and outputting a warning indicating that the object falls outside the angle of view when all of the object are not in the angle of view.

* * * * *